(12) United States Patent
Catoen et al.

(10) Patent No.: US 8,280,544 B2
(45) Date of Patent: Oct. 2, 2012

(54) SYSTEM FOR USE IN PERFORMANCE OF INJECTION MOLDING OPERATIONS

(75) Inventors: Bruce Catoen, Georgetown (CA); Louis Gorgenyi, Oakville (CA)

(73) Assignee: Mold Masters (2007) Limited (CA)

( * ) Notice: Subject to any disclaimer, the term of this patent is extended or adjusted under 35 U.S.C. 154(b) by 284 days.

(21) Appl. No.: 12/611,033

(22) Filed: Nov. 2, 2009

(65) Prior Publication Data
US 2011/0106288 A1 May 5, 2011

(51) Int. Cl.
*G06F 19/00* (2011.01)
*G06F 17/40* (2006.01)
*G08B 5/22* (2006.01)
*G08B 25/00* (2006.01)
*G08G 1/123* (2006.01)

(52) U.S. Cl. ...... 700/204; 340/8.1; 340/990; 340/995.1; 702/187

(58) Field of Classification Search .................. 700/197, 700/200, 201, 204, 245–247, 250, 253, 254, 700/257, 259–262; 701/200, 207, 208; 702/182, 702/184, 187, 188; 340/1.1, 6.1, 8.1, 286.01, 340/988–990, 995.1
See application file for complete search history.

(56) References Cited

U.S. PATENT DOCUMENTS

| | | | |
|---|---|---|---|
| 4,279,582 A | 7/1981 | Osuna-Diaz | |
| 4,559,991 A | 12/1985 | Motomura et al. | |
| 4,835,730 A * | 5/1989 | Shimano et al. | 700/257 |
| 4,911,629 A | 3/1990 | Fujita | |
| 5,062,784 A | 11/1991 | Inaba et al. | |
| 5,119,104 A | 6/1992 | Heller et al. | |
| 5,216,617 A | 6/1993 | Kamiguchi et al. | |
| 5,222,026 A | 6/1993 | Nakamoto | |
| 5,301,120 A | 4/1994 | Magario | |
| 5,309,369 A | 5/1994 | Kamiguchi et al. | |
| 5,331,549 A | 7/1994 | Crawford, Jr. | |
| 5,400,244 A * | 3/1995 | Watanabe et al. | 701/28 |
| 5,411,686 A | 5/1995 | Hata | |
| 5,419,858 A | 5/1995 | Hata et al. | |
| 5,461,570 A | 10/1995 | Wang et al. | |
| 5,474,439 A | 12/1995 | McGrevy | |
| 5,475,797 A * | 12/1995 | Glaspy et al. | 700/247 |
| 5,478,230 A | 12/1995 | McGrevy | |

(Continued)

FOREIGN PATENT DOCUMENTS

DE 10224414 A1 8/2003

(Continued)

OTHER PUBLICATIONS

"Totally PC-Based Control" *Application Report*, Dec. 2000, 5 pages.

(Continued)

*Primary Examiner* — Crystal J Barnes-Bullock
(74) *Attorney, Agent, or Firm* — Heslin Rothenberg Farley & Mesiti P.C.

(57) ABSTRACT

There is provided a system for use in performance of injection molding operations, wherein the system can include a plurality of injection molding assembly components. In one embodiment, the system can be operative so that various information respecting components of the system can be recorded within a component database. The component database can be a computer implemented database and in one embodiment can be utilized to output information that indicates past and/or present conditions prevailing within the system.

9 Claims, 20 Drawing Sheets

| COMPONENT ID | LOCATION ID | TIMESTAMP | | | |
|---|---|---|---|---|---|
| MLD_Q412 | CELL_2 | 21 | NOV | 15:49:37 | GMT |
| MLD_H610 | CELL_3 | 21 | NOV | 15:49:55 | GMT |
| MLD_A410 | STO_1 | 21 | NOV | 15:50:10 | GMT |
| CHI_P882 | CELL_2 | 21 | NOV | 15:55:19 | GMT |
| DRY_5190 | CELL_1 | 21 | NOV | 15:55:20 | GMT |
| ROB_A242 | STO_1 | 21 | NOV | 15:55:55 | GMT |
| ROB_B116 | CELL_2 | 21 | NOV | 16:02:10 | GMT |
| MLD_H610 | CELL_1 | 21 | NOV | 16:58:50 | GMT |
| CHI_X918 | CELL_3 | 21 | NOV | 17:01:05 | GMT |

U.S. PATENT DOCUMENTS

| | | |
|---|---|---|
| 5,513,976 A | 5/1996 | McGrevy |
| 5,518,389 A | 5/1996 | Nonomura et al. |
| 5,539,650 A | 7/1996 | Hehl |
| 5,539,857 A | 7/1996 | McGrevy |
| 5,571,539 A | 11/1996 | Starkey |
| 5,635,671 A | 6/1997 | Freyman et al. |
| 5,716,651 A | 2/1998 | McGrevy |
| 5,736,171 A | 4/1998 | McGrevy |
| 5,795,511 A | 8/1998 | Kalantzis et al. |
| 5,804,228 A | 9/1998 | Kofsman et al. |
| 5,898,591 A | 4/1999 | Hettinga et al. |
| 6,000,831 A | 12/1999 | Triplett |
| 6,045,742 A | 4/2000 | McGrevy |
| 6,073,059 A | 6/2000 | Hayashi et al. |
| 6,099,292 A | 8/2000 | McGrevy |
| 6,145,022 A | 11/2000 | Takizawa et al. |
| 6,192,325 B1 | 2/2001 | Piety et al. |
| 6,305,923 B1 | 10/2001 | Godwin et al. |
| 6,311,101 B1 | 10/2001 | Kastner |
| 6,377,649 B1 | 4/2002 | Stuart |
| 6,386,849 B1 | 5/2002 | Kroeger et al. |
| 6,421,577 B1 | 7/2002 | Triplett |
| 6,529,796 B1 | 3/2003 | Kroeger et al. |
| 6,614,349 B1 | 9/2003 | Proctor et al. |
| 6,652,262 B2 | 11/2003 | Kroeger |
| 6,668,253 B1 | 12/2003 | Thompson et al. |
| 6,675,055 B1 | 1/2004 | Fischer |
| 6,738,748 B2 | 5/2004 | Wetzer |
| 6,744,011 B1 | 6/2004 | Hu et al. |
| 6,775,588 B1 | 8/2004 | Peck |
| 6,821,100 B2 | 11/2004 | Kroeger et al. |
| 6,825,763 B2 | 11/2004 | Ulrich et al. |
| 6,843,415 B2 | 1/2005 | Vogler |
| 6,862,486 B2 | 3/2005 | Cocco et al. |
| 6,901,304 B2 | 5/2005 | Swan et al. |
| 6,904,333 B2 | 6/2005 | Morimura |
| 6,912,386 B1 | 6/2005 | Himberg et al. |
| 6,934,540 B2 | 8/2005 | Twitchell, Jr. |
| 6,935,958 B2 | 8/2005 | Nelson |
| 6,937,921 B1 | 8/2005 | Mazumder |
| 6,948,133 B2 | 9/2005 | Haley |
| 6,954,737 B2 | 10/2005 | Kalantar et al. |
| 7,072,735 B2 | 7/2006 | Smith |
| 7,117,050 B2 | 10/2006 | Sasaki et al. |
| 7,127,743 B1 | 10/2006 | Khanolkar et al. |
| 7,128,548 B2 | 10/2006 | Manner |
| 7,146,231 B2 | 12/2006 | Schleiss et al. |
| 7,181,311 B2 | 2/2007 | Dachs et al. |
| 7,206,646 B2 | 4/2007 | Nixon et al. |
| 7,212,829 B1 | 5/2007 | Lau et al. |
| 7,236,841 B2 | 6/2007 | Fischer et al. |
| 7,242,306 B2 | 7/2007 | Wildman et al. |
| 7,248,933 B2 | 7/2007 | Wildman |
| 7,254,483 B2 | 8/2007 | Squires et al. |
| 7,256,681 B1 | 8/2007 | Moody et al. |
| 7,261,539 B2 | 8/2007 | Pitscheneder et al. |
| 7,269,479 B2* | 9/2007 | Okamoto et al. ............ 700/245 |
| 7,272,456 B2* | 9/2007 | Farchmin et al. ............. 700/66 |
| 7,292,223 B2 | 11/2007 | Suprun et al. |
| 7,298,275 B2 | 11/2007 | Brandt et al. |
| 7,311,136 B2 | 12/2007 | Manner |
| 7,313,499 B2 | 12/2007 | Battiste |
| 7,323,991 B1 | 1/2008 | Eckert et al. |
| 7,380,213 B2 | 5/2008 | Pokorny et al. |
| 7,403,972 B1 | 7/2008 | Lau et al. |
| 7,412,301 B1 | 8/2008 | Manda |
| 7,440,848 B2 | 10/2008 | Anderson |
| 7,450,024 B2 | 11/2008 | Wildman et al. |
| 7,480,542 B2 | 1/2009 | Kroeger et al. |
| 7,496,427 B2 | 2/2009 | Konishi |
| 7,518,502 B2 | 4/2009 | Austin et al. |
| 7,545,266 B2 | 6/2009 | Brosius |
| 7,580,771 B2 | 8/2009 | Quail et al. |
| 2002/0031567 A1 | 3/2002 | Magario |
| 2002/0032552 A1 | 3/2002 | Nishiyama et al. |
| 2002/0183979 A1 | 12/2002 | Wildman |
| 2003/0032438 A1 | 2/2003 | Maurilio |
| 2003/0085483 A1 | 5/2003 | Kroeger |
| 2003/0235172 A1 | 12/2003 | Wood |
| 2004/0093114 A1 | 5/2004 | Magario et al. |
| 2004/0148039 A1 | 7/2004 | Farchmin et al. |
| 2004/0148136 A1 | 7/2004 | Sasaki et al. |
| 2004/0203874 A1 | 10/2004 | Brandt et al. |
| 2004/0203930 A1 | 10/2004 | Farchmin et al. |
| 2004/0258787 A1 | 12/2004 | Olaru et al. |
| 2005/0001814 A1 | 1/2005 | Anton et al. |
| 2005/0002380 A1 | 1/2005 | Miller et al. |
| 2005/0143850 A1 | 6/2005 | Pavlik et al. |
| 2005/0177492 A1 | 8/2005 | Camping |
| 2005/0256840 A1 | 11/2005 | Hirosumi et al. |
| 2006/0028338 A1 | 2/2006 | Krishan et al. |
| 2006/0082009 A1 | 4/2006 | Quail et al. |
| 2006/0122944 A1 | 6/2006 | Ryan et al. |
| 2006/0171538 A1* | 8/2006 | Larson et al. ............... 380/270 |
| 2006/0192709 A1 | 8/2006 | Schantz et al. |
| 2006/0202817 A1 | 9/2006 | Mackenzie et al. |
| 2006/0271378 A1 | 11/2006 | Day |
| 2006/0282302 A1 | 12/2006 | Hussain |
| 2007/0021100 A1 | 1/2007 | Haave et al. |
| 2007/0046459 A1 | 3/2007 | Silverman et al. |
| 2007/0054004 A1 | 3/2007 | Manner |
| 2007/0061033 A1 | 3/2007 | Lucas et al. |
| 2007/0095906 A1 | 5/2007 | Camilleri et al. |
| 2007/0247316 A1 | 10/2007 | Wildman et al. |
| 2007/0262861 A1 | 11/2007 | Anderson et al. |
| 2007/0293977 A1* | 12/2007 | Galt et al. .................... 700/204 |
| 2007/0294040 A1 | 12/2007 | Galt |
| 2008/0078827 A1 | 4/2008 | Geiss |
| 2008/0084334 A1 | 4/2008 | Ballew |
| 2008/0085334 A1 | 4/2008 | Barnett |
| 2008/0086321 A1 | 4/2008 | Walton |
| 2008/0086428 A1 | 4/2008 | Wallace |
| 2008/0086497 A1 | 4/2008 | Wallace et al. |
| 2008/0086509 A1 | 4/2008 | Wallace |
| 2008/0086685 A1 | 4/2008 | Janky et al. |
| 2008/0097626 A1 | 4/2008 | Reed et al. |
| 2008/0097642 A1 | 4/2008 | Zwicker |
| 2008/0098401 A1 | 4/2008 | Weatherhead et al. |
| 2008/0103944 A1 | 5/2008 | Hagemann et al. |
| 2008/0109099 A1 | 5/2008 | Moshier |
| 2008/0111264 A1 | 5/2008 | Esser |
| 2008/0150678 A1 | 6/2008 | Giobbi et al. |
| 2008/0172312 A1 | 7/2008 | Synesiou et al. |
| 2008/0180322 A1 | 7/2008 | Islam et al. |
| 2008/0184114 A1 | 7/2008 | Hano |
| 2008/0188975 A1 | 8/2008 | Bazzo |
| 2008/0193584 A1 | 8/2008 | Cooke |
| 2008/0195245 A1 | 8/2008 | Manda |
| 2008/0198001 A1 | 8/2008 | Sarma et al. |
| 2008/0224854 A1 | 9/2008 | Furey et al. |
| 2008/0252413 A1 | 10/2008 | Ikeda |
| 2008/0252431 A1 | 10/2008 | Nigam |
| 2008/0279974 A1 | 11/2008 | Saggese et al. |
| 2008/0290541 A1 | 11/2008 | Baumann |
| 2008/0319567 A1 | 12/2008 | Farchmin et al. |
| 2009/0019201 A1 | 1/2009 | Chainer et al. |
| 2009/0088969 A1 | 4/2009 | Oota |
| 2009/0089697 A1 | 4/2009 | Loucks |
| 2009/0112882 A1 | 4/2009 | Maresh et al. |
| 2009/0189767 A1 | 7/2009 | Primm et al. |
| 2009/0192835 A1 | 7/2009 | Baumann et al. |
| 2009/0198371 A1 | 8/2009 | Emanuel et al. |
| 2009/0202112 A1 | 8/2009 | Nielsen et al. |
| 2009/0204614 A1 | 8/2009 | Nielsen et al. |
| 2009/0216438 A1 | 8/2009 | Shafer |
| 2010/0138031 A1 | 6/2010 | Werfeli et al. |
| 2011/0029402 A1 | 2/2011 | Irwin |
| 2011/0037565 A1* | 2/2011 | Skirble et al. ................. 340/8.1 |

FOREIGN PATENT DOCUMENTS

| | | |
|---|---|---|
| JP | S58158229 | 9/1983 |
| JP | 60058826 | 4/1985 |
| JP | 63135224 | 6/1988 |
| JP | 4184502 A | 7/1992 |
| JP | 2004184502 | 7/1992 |
| JP | 2008013491 | 5/1994 |
| JP | 2007161745 | 6/1995 |

| | | | |
|---|---|---|---|
| JP | 2008114403 A | 5/2008 | |
| WO | WO-9901806 | 1/1999 | |
| WO | WO-2007069520 A1 | 6/2007 | |
| WO | WO-2010031159 A1 | 3/2010 | |
| WO | WO-2010074897 A1 | 7/2010 | |

OTHER PUBLICATIONS

"Making workcells work" *PET Report* May 2005, 2 pages.

"Husky Builds Flexible Network with OPC." *Automation World* May 1, 2006, 4 pages.

"Let the Mold Think for Itself." *Plastics Technology* Dec. 1, 1999, 1 page.

Patent Cooperation Treaty, Notification of Transmittal of the International Search Report and the Written Opinion of the International Searching Authority, or the Declaration, International Patent Application No. PCT/CA2010/00170, dated Feb. 9, 2011 (11 pages).

PMA, Hot-Runner control System HRC 800, http:/www.pma-online.de, Edition 0007, published at least as early as May 2, 2007 (4 pages).

Caco Pacific Corporation, Caco Standard Products, http://www.cacopacific.com/controller.htm, dated Sep. 30, 2009, (2 pages).

U.S. Appl. No. 12/610,992, filed Nov. 2, 2009 (89 pages).

U.S. Appl. No. 12/611,017, filed Nov. 2, 2009 (89 pages).

www.cacopacific.com/controller.htm, Caco Pacific Corporation—Caco Standard Products, Controller—IPM, Sep. 30, 2009.

Feb. 16, 2012 Restriction Requirement in U.S. Appl. No. 12/610,992.

Mar. 13, 2012 Restriction Requirement in U.S. Appl. No. 12/611,017.

May 3, 2012 Office Action in U.S. Appl. No. 12/611,017.

May 16, 2012 Office Action in U.S. Appl. No. 12/610,992.

\* cited by examiner

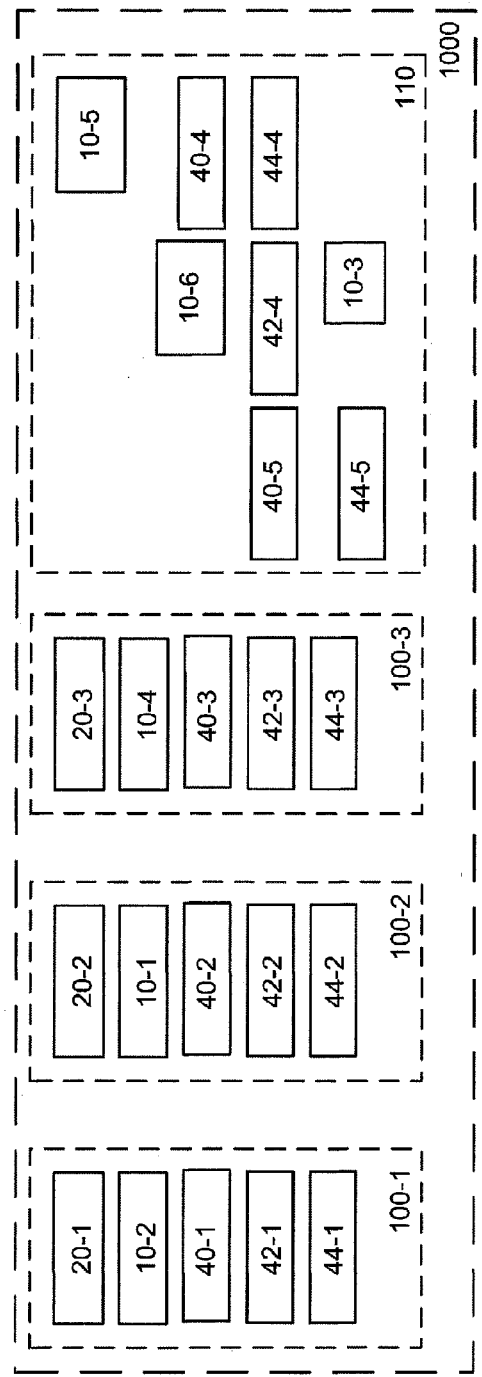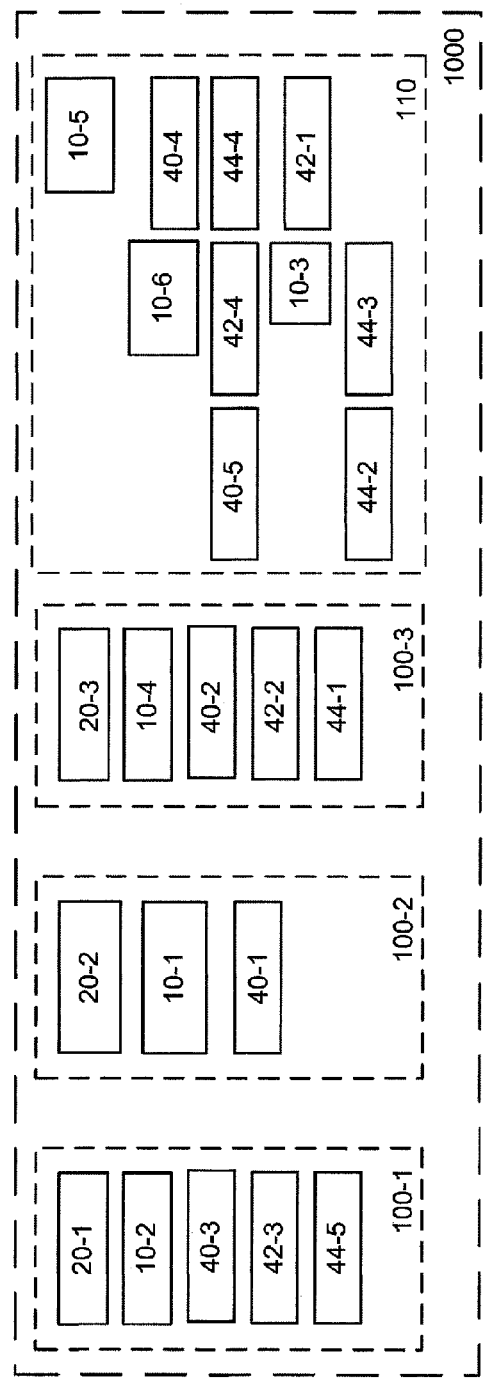

| Reg. ID No. | Mold | | Injection Molding Machine | | Dryer | | Chiller | | Robot | | |
|---|---|---|---|---|---|---|---|---|---|---|---|
| . . . | . . . | . . . | . . . | . . . | . . . | . . . | . . . | . . . | . . . | . . . | . . . |
| 0056 | MLD_0014 | (code reference) | IMM_T_04_006 | (code reference) | DRY_B_01_002 | (code reference) | CHI_D_05_006 | (code reference) | ROB_B_09_010 | (code reference) | . . . |
| 0057 | MLD_0090 | (code reference) | IMM_K_01_001 | (code reference) | DRY_G_06_016 | (code reference) | CHI_T_14_064 | (code reference) | ROB_A_03_022 | (code reference) | . . . |
| 0058 | MLD_0011 | (code reference) | IMM_N_01_005 | (code reference) | DRY_Z_04_014 | (code reference) | CHI_D_05_019 | (code reference) | ROB_A_03_002 | (code reference) | . . . |
| 0059 | MLD_0090 | (code reference) | IMM_K_01_001 | (code reference) | DRY_H_02_005 | (code reference) | CHI_A_04_080 | (code reference) | ROB_A_03_022 | (code reference) | . . . |
| 0060 | MLD_0043 | (code reference) | IMM_K_01_001 | (code reference) | DRY_G_06_016 | (code reference) | CHI_T_14_064 | (code reference) | ROB_A_03_022 | (code reference) | . . . |
| 0061 | MLD_0040 | (code reference) | IMM_K_01_001 | (code reference) | DRY_H_02_005 | (code reference) | CHI_A_04_084 | (code reference) | ROB_A_03_022 | (code reference) | . . . |
| 0062 | MLD_0015 | (code reference) | IMM_D_02_016 | (code reference) | DRY_B_06_019 | (code reference) | CHI_D_05_024 | (code reference) | ROB_A_03_011 | (code reference) | . . . |
| 0063 | MLD_0090 | (code reference) | IMM_K_01_001 | (code reference) | DRY_H_03_082 | (code reference) | CHI_A_04_080 | (code reference) | ROB_A_03_022 | (code reference) | . . . |
| 0064 | MLD_0006 | (code reference) | IMM_P_01_001 | (code reference) | DRY_X_01_001 | (code reference) | CHI_T_14_066 | (code reference) | ROB_A_03_002 | (code reference) | . . . |
| 0065 | MLD_0312 | (code reference) | IMM_T_02_006 | (code reference) | DRY_B_02_004 | (code reference) | CHI_T_13_001 | (code reference) | ROB_A_03_001 | (code reference) | . . . |
| 0066 | MLD_0510 | (code reference) | IMM_L_01_001 | (code reference) | DRY_B_04_011 | (code reference) | CHI_T_13_006 | (code reference) | ROB_A_03_004 | (code reference) | . . . |
| 0067 | MLD_0010 | (code reference) | IMM_K_01_001 | (code reference) | DRY_H_03_082 | (code reference) | CHI_H_03_082 | (code reference) | ROB_A_03_022 | (code reference) | . . . |
| | . | | . | | . | | . | | . | | . |

FIG. 6

| Indentifier | Type | Manufacturer | Manufacture Date | Model | Part | Rating | Associated Component Requirements |
|---|---|---|---|---|---|---|---|
| ... | ... | ... | ... | ... | ... | ... | ... |
| MLD_7842 | MLD | | Feb 2001 | 78 | 42 | Array | Array |
| MLD_7880 | MLD | | Feb 2001 | 78 | 80 | Array | Array |
| MLD_8518 | MLD | | Mar 2001 | 85 | 18 | Array | Array |
| ... | ... | ... | ... | ... | ... | ... | ... |
| IMM_K_01_001 | IMM | K | Feb 1999 | 01 | 001 | Array | Array |
| IMM_K_01_002 | IMM | K | Feb 1999 | 01 | 002 | Array | Array |
| IMM_P_01_001 | IMM | P | July 1999 | 01 | 001 | Array | Array |
| ... | ... | ... | ... | ... | ... | ... | ... |
| DRY_G_06_016 | DRY | G | Jan 2000 | 06 | 016 | Array | Array |
| DRY_H_01_001 | DRY | H | Jan 2000 | 01 | 001 | Array | Array |
| DRY_H_001_002 | DRY | H | Feb 2000 | 01 | 002 | Array | Array |
| ... | ... | ... | ... | ... | ... | ... | ... |
| CHI_T_14_064 | CHI | T | Mar 2002 | 14 | 064 | Array | Array |
| CHI_T_16_002 | CHI | T | June 2002 | 16 | 002 | Array | Array |
| CHI_V_02_004 | CHI | V | June 2002 | 02 | 004 | Array | Array |
| ... | ... | ... | ... | ... | ... | ... | ... |
| ROB_A_03_022 | ROB | A | Jan 2002 | 03 | 022 | Array | Array |
| ROB_A_03_023 | ROB | A | Jan 2002 | 03 | 023 | Array | Array |
| ROB_A_03_025 | ROB | A | Jan 2002 | 03 | 025 | Array | Array |
| ... | ... | ... | ... | ... | ... | ... | ... |

FIG. 12

| Component ID | Path | Timestamp Updated | ... |
|---|---|---|---|
| Rob_2A_782 | C:\...\Mold_Process_Takeout_1 | 09 Jan, 10:16:10 GMT | ... |
| Rob_2A_782 | C:\...\Mold_Process_Takeout_2 | 09 Jan, 11:20:01 GMT | ... |
| Mold_78_42 | C:\...\Mold_Process_Setup_1 | 04 Feb, 09:10:10 GMT | ... |
| Mold_78_42 | C:\...\Mold_Process_Setup_2 | 21 Mar, 05:21:35 GMT | ... |
| . | . | . | ... |

| State | Location | Injection Molding Machine | Mold | Dryer | Chiller | Robot | Registration ID No. |
|---|---|---|---|---|---|---|---|
| 0 | CELL_001 | IMM_K_01_001 | | | | | |
| 1 | CELL_001 | IMM_K_01_001 | MLD_0043 | | | | |
| 2 | CELL_001 | IMM_K_01_001 | MLD_0043 | DRY_G_06_016 | | | |
| 3 | CELL_001 | IMM_K_01_001 | MLD_0043 | DRY_G_06_016 | CHI_P_02_072 | | |
| 4 | CELL_001 | IMM_K_01_001 | MLD_0043 | DRY_G_06_016 | CHI_T_14_064 | | |
| 5 | CELL_001 | IMM_K_01_001 | MLD_0043 | DRY_G_06_016 | CHI_T_14_064 | ROB_A_03_022 | |
| 6 | CELL_001 | IMM_K_01_001 | MLD_0043 | DRY_G_06_016 | CHI_T_14_064 | ROB_A_03_022 | 08016 |
| 7 | CELL_001 | IMM_K_01_001 | | DRY_G_06_016 | CHI_T_14_064 | ROB_A_03_022 | |
| 8 | CELL_001 | IMM_K_01_001 | MLD_0010 | DRY_G_06_016 | CHI_T_14_064 | ROB_A_03_022 | |
| 9 | CELL_001 | IMM_K_01_001 | MLD_0010 | | CHI_T_14_064 | ROB_A_03_022 | |
| 10 | CELL_001 | IMM_K_01_001 | MLD_0010 | DRY_H_02_005 | CHI_T_14_064 | ROB_A_03_022 | |
| 11 | CELL_001 | IMM_K_01_001 | MLD_0010 | DRY_H_02_005 | | ROB_A_03_022 | |
| 12 | CELL_001 | IMM_K_01_001 | MLD_0010 | DRY_H_02_005 | CHI_A_04_080 | ROB_A_03_022 | 08017 |
| 13 | CELL_001 | IMM_K_01_001 | MLD_0010 | | CHI_A_04_080 | ROB_A_03_022 | |
| 14 | CELL_001 | IMM_K_01_001 | MLD_0010 | DRY_H_03_082 | CHI_A_04_080 | ROB_A_03_022 | 08022 |
| ... | ... | ... | ... | ... | ... | ... | ... |

| Reg. ID No. | Mold | | Injection Molding Machine | | Dryer | | Chiller | | Robot | |
|---|---|---|---|---|---|---|---|---|---|---|
| . . . | . . . | . . . | . . . | . . . | . . . | . . . | . . . | . . . | . . . | . . . |
| 08014 | MLD_0014 | (code reference) | IMM_T_04_006 | (code reference) | DRY_B_01_002 | (code reference) | CHI_D_05_006 | (code reference) | ROB_B_09_010 | (code reference) |
| 08015 | MLD_0011 | (code reference) | IMM_N_01_005 | (code reference) | DRY_Z_04_014 | (code reference) | CHI_D_05_019 | (code reference) | ROB_A_03_002 | (code reference) |
| 08016 | MLD_0043 | (code reference) | IMM_K_01_001 | (code reference) | DRY_G_06_016 | (code reference) | CHI_T_14_064 | (code reference) | ROB_A_03_022 | (code reference) |
| 08017 | MLD_0040 | (code reference) | IMM_K_01_001 | (code reference) | DRY_H_02_005 | (code reference) | CHI_A_04_084 | (code reference) | ROB_A_03_022 | (code reference) |
| 08018 | MLD_0015 | (code reference) | IMM_D_02_016 | (code reference) | DRY_B_06_019 | (code reference) | CHI_D_05_024 | (code reference) | ROB_A_03_011 | (code reference) |
| 08019 | MLD_0006 | (code reference) | IMM_P_01_001 | (code reference) | DRY_X_01_001 | (code reference) | CHI_T_14_066 | (code reference) | ROB_A_03_002 | (code reference) |
| 08020 | MLD_0312 | (code reference) | IMM_T_02_006 | (code reference) | DRY_B_02_004 | (code reference) | CHI_T_13_001 | (code reference) | ROB_A_03_001 | (code reference) |
| 08021 | MLD_0510 | (code reference) | IMM_L_01_001 | (code reference) | DRY_B_04_011 | (code reference) | CHI_T_13_006 | (code reference) | ROB_A_03_004 | (code reference) |
| 08022 | MLD_0010 | (code reference) | IMM_K_01_001 | (code reference) | DRY_H_03_082 | (code reference) | CHI_H_03_082 | . . | ROB_A_03_022 | . . |
| . . . | . . . | . . . | . . . | . . . | . . . | . . . | . . . | . . . | . . . | . . . |

SYSTEM FOR USE IN PERFORMANCE OF INJECTION MOLDING OPERATIONS

CROSS REFERENCE TO RELATED APPLICATIONS

The present application is related to application Ser. No. 12/610,992 entitled "System For Use In Performance Of Injection Molding Operations" filed on the date of filing of the present application and to application Ser. No. 12/611,017 entitled "System For Use In Performance Of Injection Molding Operations" also filed on the date of filing of the present application. Each of the above applications is incorporated herein by reference in its entirety.

FIELD OF THE INVENTION

The invention relates to injection molding operations and specifically to a system for use in performance of injection molding operations.

BACKGROUND OF THE INVENTION

Injection molding facilities typically include one or more work cells, each comprising an injection molding machine, a mold (typically including a mold cavity and hot runner system), and one or more auxiliary components, e.g., a dryer, a chiller, a robot. Injection molding facilities are in constant change. For example, molds are often moved from work cell to work cell. When production requirements for a particular mold are lowered, it is common to move the mold to a different work cell having an associated injection molding machine with lower capacity. Also, new molds are often introduced into a facility. An existing mold at a particular work cell may be replaced with a new mold. In addition, auxiliary components for a work cell can be changed. Dryers can be moved from work cell to work cell. A new chiller can be introduced into a facility and can be associated with a particular work cell.

Considerable costs are typically associated with a component change in an injection molding facility. If a mold of a work cell is changed, or another component, significant time and effort are often required to make the injection molding assembly disposed in the current work cell operational. In addition, a change to a work cell component, if made in error, can cause damage to a component and/or failure of a production run.

SUMMARY OF THE INVENTION

There is provided a system for use in performance of injection molding operations, wherein the system can include a plurality of injection molding assembly components. In one embodiment, the system can be operative so that various information respecting components of the system can be recorded within a component database. The component database can be a computer implemented database and in one embodiment can be utilized to output information that indicates past and/or present conditions prevailing within the system.

BRIEF DESCRIPTION OF THE DRAWINGS

Features described herein can be better understood with reference to the drawings described below. The drawings are not necessarily to scale, emphasis instead generally being placed upon illustrating the principles of the invention. In the drawings, like numerals are used to indicate like parts throughout the various views.

FIG. 2 is a schematic diagram illustrating system components as shown in FIG. 1 after undergoing a state change characterizing movement of components between locations of the injection molding facility;

FIG. 3 is a schematic diagram illustrating system components as shown in FIG. 2 after undergoing a further state change;

FIG. 6 is an exemplary partial view of a registration table for registration of operational injection molding assembly configurations;

FIG. 12 is a representation of component specification table in one embodiment;

FIG. 13 is a representation of a software logging table in one embodiment;

FIG. 14 is a table returned by querying a location logging table by location ID;

FIG. 15 is a table returned by querying an enhanced location logging table by registration ID;

DETAILED DESCRIPTION OF THE INVENTION

Figure 1:
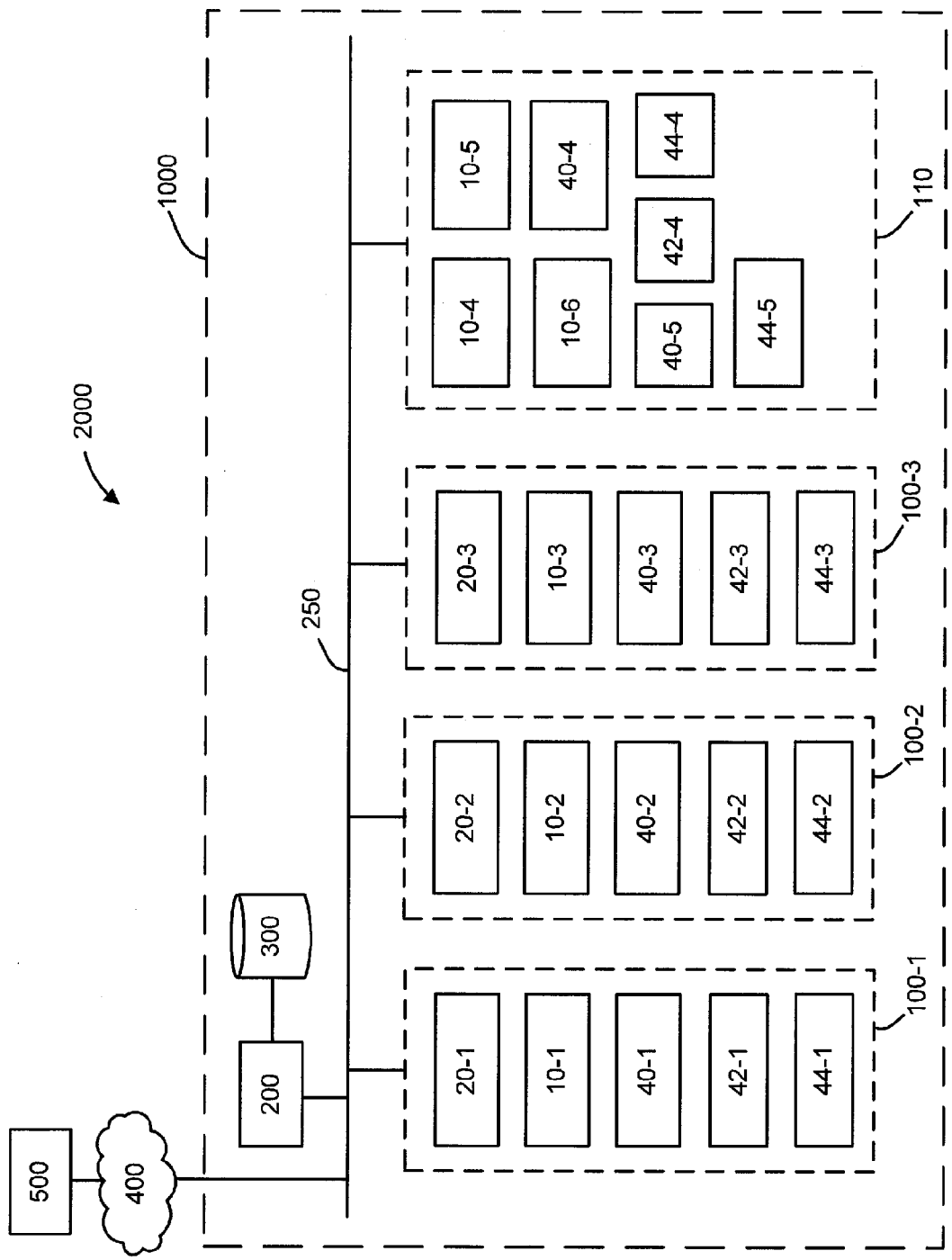
FIG. 1 is a schematic diagram of a system for use in performance of injection molding operations wherein a plurality of injection molding assembly components are disposed in an injection molding facility.

There is provided a system for use in performance of injection molding operations, wherein the system can include a plurality of injection molding assembly components. In one embodiment, the system can be operative so that various information respecting components of the system can be recorded within a component database. In one embodiment, information that indicates operational injection molding assembly configurations can be recorded within the component database. As part of a functioning of the system, identification information for one or more injection molding components within a work cell can be determined and can be utilized by e.g., display of information indicating an identification of the one or more components, transmitting of communications to the one or more components and/or recording information indicating an identification of the one or more components. In one embodiment, location information for injection molding assembly components can be recorded to provide component location information within the component database. In one embodiment, operational injection molding assembly configuration information can be recorded along with location information within a component database. The component database can be a computer implemented database and in one embodiment can be utilized to output information that indicates past and/or present conditions prevailing within the system. The output information can be, e.g., used by an application program interface and/or can be output for visual observation for indicating one or more of past and/or presently prevailing conditions of the system.

In development of system 2000 it was determined that long delays are commonly associated with setup of an injection molding assembly. An injection molding assembly typically includes an injection molding machine which controls the flow of molding material, and a mold which temporarily retains the material in the making of the finished product. An injection molding assembly can also include one or more auxiliary components, e.g., a dryer, a chiller, or a robot.

When a new mold is introduced for association to an injection molding assembly, it is often the case that auxiliary components presently associated to the injection molding machine are not compatible with the requirements of the newly introduced mold. Also, a current programming of the injection molding assembly and/or a current programming of auxiliary components presently associated to the injection molding assembly are not compatible with the requirements of the new mold. Operators have been observed to spend considerable time retrieving compatible auxiliary components, e.g., from facility storage or from work cells of a facility other than the present work cell. Operators have also been observed to spend considerable time in reprogramming the injection molding machine and/or auxiliary components for operation with the newly introduced mold. In performance of such operations (moving components for association, and reprogramming) an operator typically relies on human memory and experience respecting locations of components and past programming strategies for programming various injection molding assembly components. Reprogramming can be particularly time consuming in reference to the iterative nature of program development and the likelihood of debugging procedures. System 2000 can be provided with features significantly improving the speed with which an injection molding assembly can be set up.

For example, in one embodiment system 2000 can be operative to record information respecting past one or more operational injection molding assembly configuration which information can be queried and utilized in the setting up of a current injection molding assembly within a work cell. Associated with recording injection molding assembly configuration information can be programming data (e.g., setup parameters, executable script code, executable binary code, source code corresponding to executable binary code) associated with various components of various recorded operational injection molding assembly configurations. Such programming data can be utilized for setup of an injection molding assembly with a current work cell. In another embodiment, system 2000 is operative to record location information respecting various components of system 2000. Such information can be queried for returning information indicating a migration of components over time, and/or for reporting a current location of a given component at a current time. Operational configuration information can be utilized in combination with location information.

In FIG. 1 there is shown a schematic diagram of a system 2000 having various components for use in performance of injection molding operations. In the exemplary embodiment of FIG. 1, system 2000 can include a plurality of injection molding work cells 100-1, 100-2, 100-3, each work cell 100-1, 100-2, 100-3 at a different physical location of facility 1000. Each work cell can include a number of injection molding assembly components for use in performing injection molding processes. Each work cell 100-1, 100-2, 100-3 can include an injection molding machine, a mold, and one or more auxiliary injection molding assembly components. A mold can include a number of subcomponents such as a mold cavity, a hot runner subsystem (which can include a manifold and one or more nozzles), and a hot runner controller. The auxiliary injection molding assembly components can include such components as a dryer, a chiller, and/or a robot and possibly additional auxiliary components. In the state as shown in FIG. 1, work cell 100-1 includes injection molding machine 20-1, mold 10-1, dryer 40-1, chiller 42-1, and robot 44-1. Work cell 100-2 includes injection molding machine 20-2, mold 10-2, dryer 40-2, chiller 42-2, and robot 44-2. Work cell 100-3 includes injection molding machine 20-3, mold 10-3, dryer 40-3, chiller 42-3, and robot 44-3. Additional injection molding assembly components 10-4, 10-5, 10-6, 40-4, 40-5, 42-4, 44-4, 44-5 that are not currently associated to a particular work cell 100-1, 100-2, 100-3 can be located in storage location 110 of facility 1000. Storage location 110 can refer to a particular location of facility 1000. Alternatively, storage location 110 can refer to all areas of facility 1000 other than cells 100-1, 100-2, 100-3.

Components within an injection molding facility 1000 can be subject to repeated location changes as components are switched between work cells or moved into or out of operation. In the example of the facility state as shown in FIG. 2 relative to the facility state as shown in FIG. 1, the mold 10-1 previously in work cell 100-1 has been moved to work cell 100-2, the mold 10-2, previously of work cell 100-2 is moved to work cell 100-1, mold 10-4, previously located at storage location 110 is removed from storage location 110 and moved into work cell 100-3, and component 10-3, previously located at work cell 100-3 is moved to storage location 110. In the example of FIG. 3, the locations of auxiliary injection molding assembly components 40-3, 42-3, 40-1, 40-2, 42-2, 44-1 are changed between work cells, auxiliary components 42-1, 44-2, 44-3 are taken out of operation and located in storage location 110, and robot auxiliary component 44-5 is moved from storage location 110 into work cell 100-1.

In one embodiment, each of the noted injection molding assembly components can be configured as a component for communication with an external component. For configuring an injection molding assembly component as a component operative for communication with one or more external components, the component can include the elements within dashed in border 3000 described in connection with FIG. 4 including a CPU 3002, a memory 3004, and an I/O device 3006 connected via system bus 3008. Memory 3004 that is in communication to CPU 3002 via system bus 3008 can be provided by one or more of a volatile semiconductor memory devices (e.g., DRAM) or a non-volatile semiconductor memory device (e.g., a flash memory or a non-semiconductor bulk storage device such as a hard drive, or a magnetic storage device. I/O device 3006 can be provided by any combination of one or more, e.g., radio frequency network interface device, wireline network interface device or peripheral device communication interface device facilitating communication with an external component, e.g., IEEE 802.11 interface, Bluetooth interface, Ethernet interface, USB interface. An injection molding assembly component configured as a component operative for communication can also include a display 3014 and keyboard 3016 and sensor 3018 for sensing an operational state of a component of an injection molding assembly. Keyboard 3016 can be co-located with display 3014 as in a touch screen (e.g., see workstation computer 70, FIG. 7). Display 3014 and keyboard 3016 and sensor 3018 can be in communication with CPU 3002 via system bus 3008. For configuring an injection molding assembly component as a component operative for communication, the component can include an encoded information reader unit such as RFID reader unit 3010 for reading RFID tags of external injection molding assembly components. Where RFID tag reading functionality is incorporated into a network interface device which can be included as part of I/O interface device 3006, RFID reader unit 3010 can be collocated with I/O interface device 3006. An injection molding assembly component configured as a component operative for communication can also include an RFID tag 3020 that can be read by an RFID reader unit. RFID tag 3020 can include interface circuit 3022 and memory 3024 for storage of RFID tag data. An injection molding assembly component configured as a component operative for communication can also include a memory drive unit 3030 including interface circuit 3032 and memory 3034. In one embodiment memory drive unit 3030 can be provided by a USB flash drive, wherein interface circuit 3032 includes a mass storage controller and wherein memory 3034 is provided by a NAND flash memory device. Where a certain component of system 2000 includes a USB flash drive, an external component external to the certain component can be provided with a peripheral device communication interface device in the form of a USB interface for providing communication between the certain component and the external component. Where I/O interface device 3006 bus coupled to CPU 3002 is provided on a first component operative for communication, and memory drive unit 3030 is provided on a second component for communication, and wherein interface device 3006 is compatible with interface circuit 3032, I/O interface device 3006 can be in communication with memory drive unit 3030 via, e.g., a wireline connector.

Figure 4:
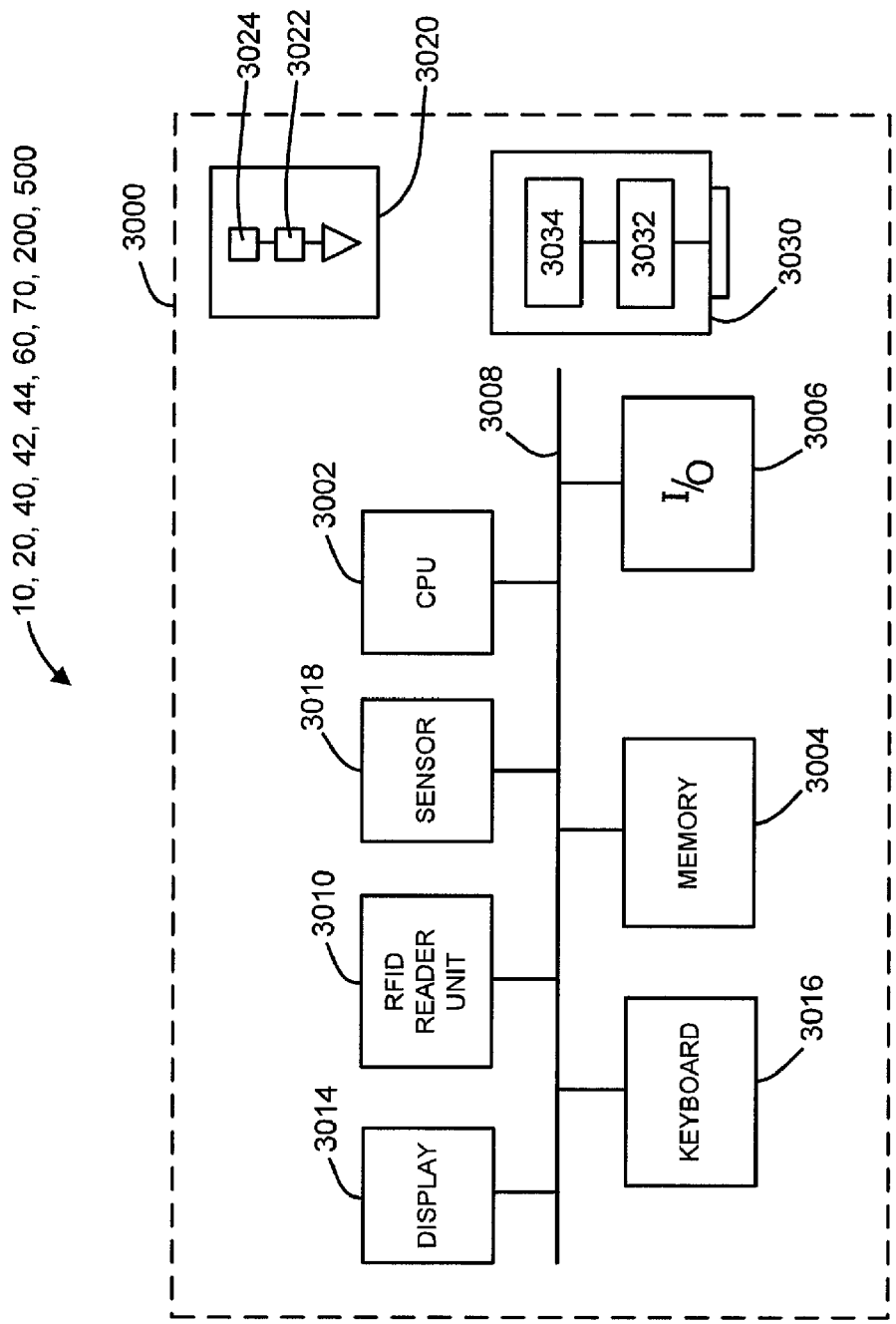
FIG. 4 is a block diagram for an injection molding assembly component in the form of an injection molding machine, mold, or auxiliary component, or system workstation configured as a component operative for communication.
Figure 5:
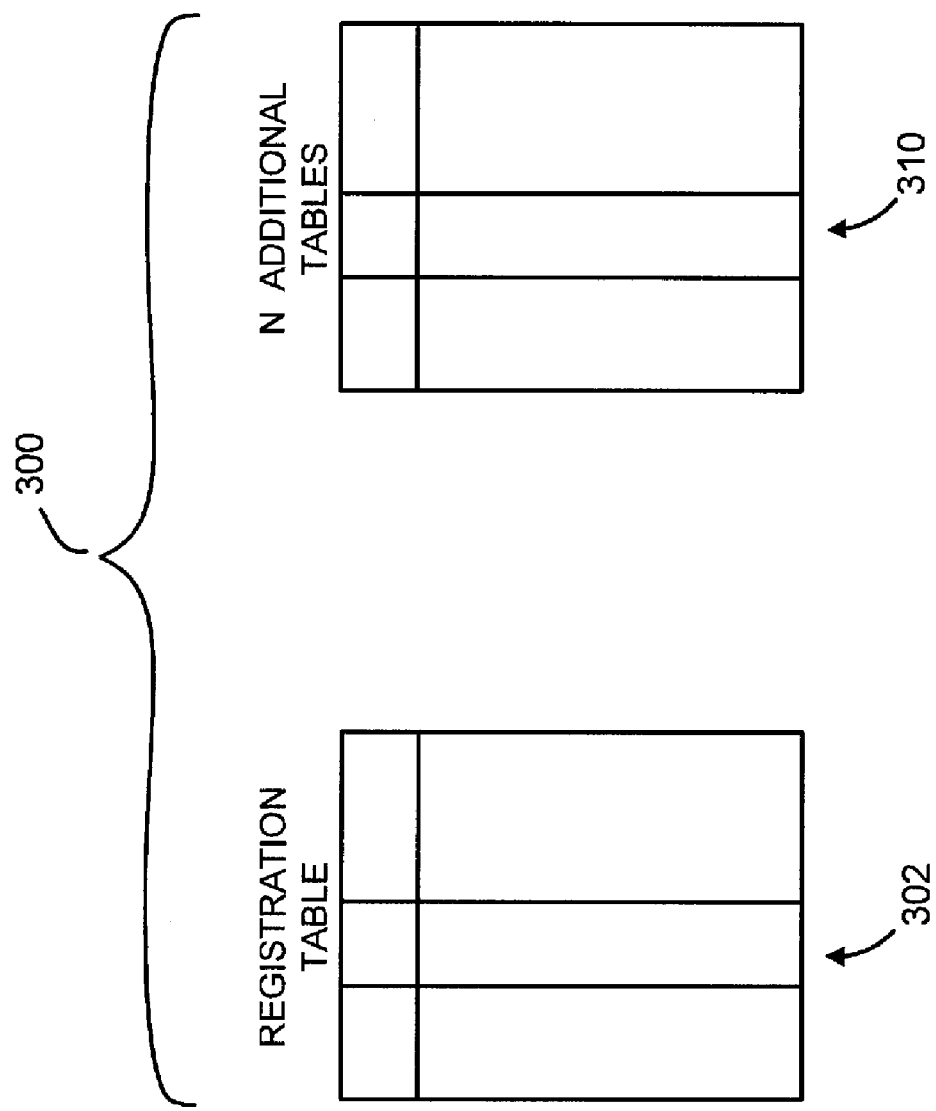
FIG. 5 is a schematic diagram of an exemplary component database.

In some embodiments, an injection molding assembly component configured as a component operative for communication can have a subset of the elements described in connection with FIG. 4. In one example, an injection molding assembly component configured as a component operative for communication can have only RFID tag 3020 out of the elements of FIG. 4. RFID tag 3020 can be configured to be responsive to an interrogation signal. In one embodiment, a component operative for communication can have only memory drive unit 3030 out of the components of FIG. 4. Of course, a component operative for communication can be provided without one or more of a display 3014, keyboard 3016, and sensor 3018. For configuring an injection molding assembly component as a component operative for communication, the elements as described in connection with FIG. 4 (or a subset of the elements) can be supported by and be physically associated to the injection molding assembly component (e.g., disposed in a housing thereof or included in a separate housing which attaches to a housing of a component) or logically associated with the component without physical association.

Components of system 2000 configured as described in connection with FIG. 4 can include components other than injection molding assembly components configured as components operative for communication. For example, system 1000 can include facility server 200, including at least one CPU communicatively coupled to a memory, network 400 including one or more CPU and memory equipped components, and server system 500, including one or more CPU and memory equipped components. Referring ahead to the physical form view of FIG. 7, there can also be included in system 2000 a plurality of components operative for communication in the form of workstation computers, e.g., personal computers 60 (including mobile laptops) and/or mobile hand held workstation computer 70 (e.g., microprocessor based mobile phones) that can be in network communication with each other component of system 2000.

Injection molding assembly components configured as components operative for communication can be in communication with a facility server 200. A variety of technologies can be utilized for establishing network communication between server 200 and the various injection molding assembly components. In one non-limiting example, a facility server 200 can be connected to injection molding machines 20-1, 20-2, 20-3 at each work cell 100-1, 100-2, 100-3 via Ethernet backbone 250. In one example, components operative for communication within each work cell can be in communication with each one via a discrete wireless or wireline OSI Layer 2 local area network (LAN) logically correlated to the work cell 100-1, 100-2, 100-3. In another example, server 200 can be established as part of a common OSI Layer 2 network including one or more or each work cell component of facility 1000. In another example, server 200 is deleted and a function described as being carried out by server 200 is carried out by a designated work cell component configured as a component operative for communication.

In another aspect, server 200 can be in communication with a remote server system 500 via network 400. In another aspect, system 2000 can include a component database 300. Component database 300 can be conveniently located at a file directory of server 200 but in principle can be co-located at any component of system 2000, and can be distributed among a plurality of components operative for communication. Database 300 can reside in one or more file directories of or accessible with use of one or more CPU and/or controller equipped components of system 2000 and accordingly can be regarded as being a computer-implemented database. In the exemplary network schematic diagram of FIG. 1, there is depicted a one to many relationship between server 200 and work cells 100-1, 100-2, 100-3, and between database 300 and work cells 100-1, 100-2, 100-3. However, in principle, neither server 200 nor database 300 need to be associated to a plurality of work cells as is indicated in the embodiment of FIG. 1. For example, each of server 200 and database 300 in one embodiment can be logically associated to a single work cell, and each of several work cells can include one dedicated central server and an associated database for recording component information relative to that work cell.

In one embodiment each component of system 2000, including server 200 can run the TCP/IP suite of communication protocols or similar higher OSI Layer communication protocol so that each component of the system 2000 is capable of addressing each other component even where system 2000 includes a plurality of OSI Layer 2 networks of differing technologies. In such embodiment, each component of system 2000 can be regarded as being part of a common OSI Layer 3 network, e.g., an Internet Protocol (IP) based network. Of course, communication between various components of system 2000 can be facilitated with use of communication protocols other than the suite of TCP/IP protocols. For example, propriety industrial communication protocols can be utilized. Also, components can be in communication via OSI Layer 2 communication protocols without being in communication via OSI Layer 3 communication protocols. Further as noted, certain components of system 2000 can be in communication without use of network protocols. For example, an RFID tag can adapt a component for communication of data. Also, a component can be made operative for communication with use of memory drive unit 3030 in which case an external communication may be in communication with the component via a system hardware communication protocol peripheral device communication protocol without use of a networking communication protocol (though a networking communication protocol can be used in place of or in addition to a peripheral device communication protocol). Where components of system 2000 are provided in network communication or in communication via a system hardware communication protocol peripheral device protocol, information can be communicated between any two components of system 2000. Such information can include, e.g., programming data, often in the form of a file, commands including database query commands, and database data returned as a result of a database query.

Referring now to FIGS. 5-9, an embodiment is described wherein system 2000 is operative to record information respecting operational injection molding assembly configurations. In one embodiment component database 300 can include component registration table 302 and possibly N additional tables 310. System 2000 can be operative so that table 302 is updated with a new row of information defining an operational injection molding assembly configuration responsively to a determination that an injection molding assembly configuration is operational. While database 300 is depicted as being implemented with use of relational database logic, alternative programming logic can be employed for organization of and access to data of database 300.

A representation of an exemplary table 302 is shown in FIG. 6. When an injection molding assembly configuration is determined to be operational, component identifiers corresponding to each component of the configuration can be recorded in table 302 together with a registration identifier, e.g., a registration ID which can be allocated serially for each newly registered configuration. Table 302 includes a plurality of row entries. Each row entry corresponds to a different injection molding assembly configuration determined to be operational.

Figure 7:
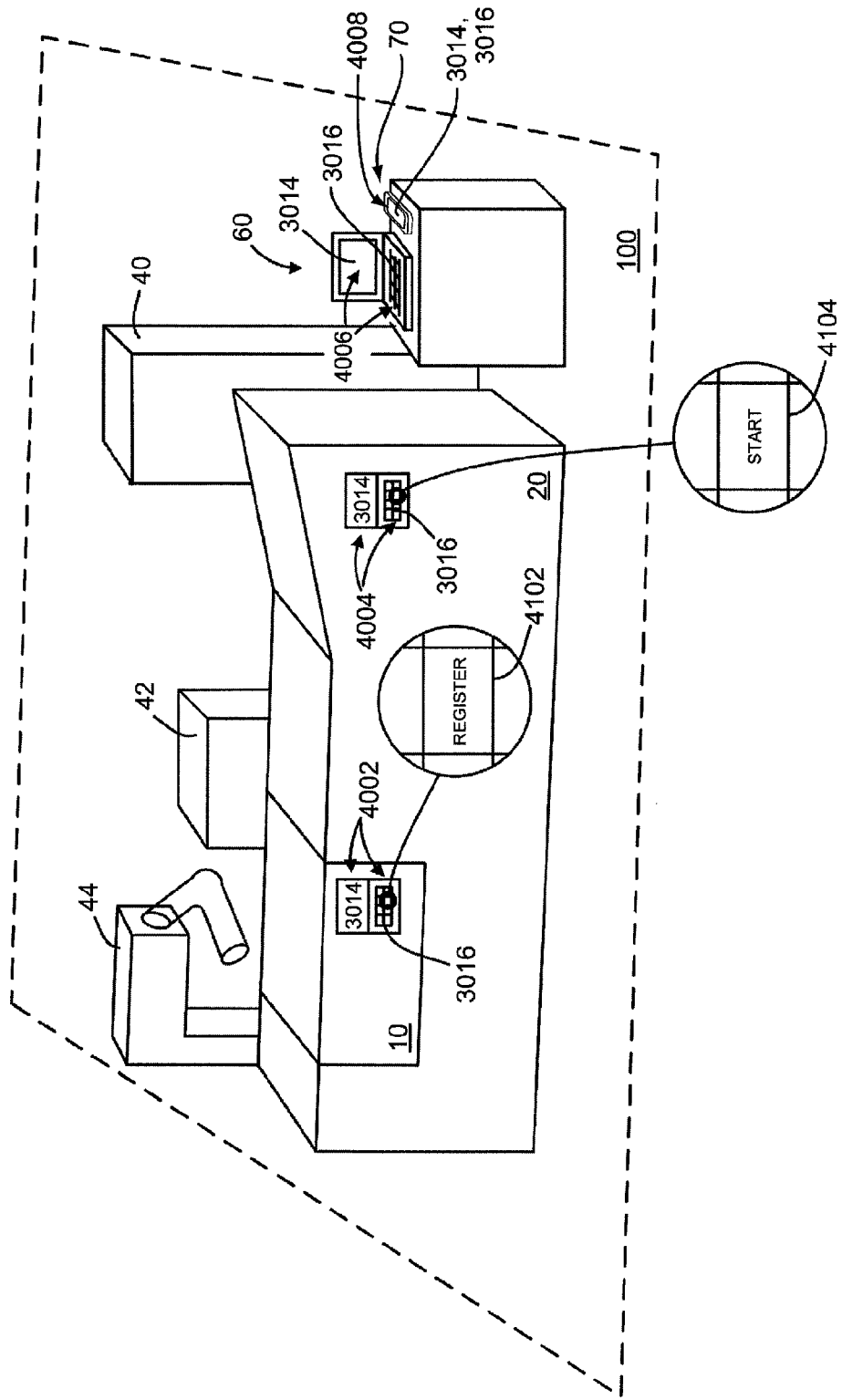
FIG. 7 is a physical form view illuminating a current injection molding assembly within a current work cell.

A variety of methods can be employed for registering new registered configurations in database 300. A physical representation of an injection molding assembly within a current work cell is shown in FIG. 7. The work cell having various components shown in FIG. 7 can be a work cell currently being subject to setup. In the example of FIG. 7, the work cell 100 being subject to setup can include mold 10, injection molding machine 20, dryer 40, chiller 42, robot 44, workstation computer 60, and workstation computer 70. Various components of a current injection molding assembly currently located within a work cell can include one or more user interfaces. In the example shown, mold 10 can include user interface 4002 and injection molding machine 20 can include user interface 4004. There can also be one or more standalone workstation computer components 60, 70, e.g., in the form of a personal computer 60, a mobile laptop computer as shown associated to the current work cell having an associated user interface 4006, and/or a mobile hand held CPU based computer 70. In one embodiment, CPU based hand held workstation component 70 can be provided by a BLACKBERRY STORM mobile telephone of the type available from Research In Motion Limited of Waterloo, Ontario. Referring to the view of FIG. 7, workstation computer 60 and workstation computer 70 can be mobile workstation computers that are adapted to be transported between work cells, e.g., work cells 100-1, 100-2, 100-3, as shown in FIG. 1 and between different ones of facilities 1000.

In one embodiment, system 2000 can be operative so that an injection molding assembly configuration is recorded as an operational injection molding assembly configuration in response to an actuation of a user interface component by an operator, e.g., where an operator determines that an injection molding assembly within a current work cell is operational. For example, as shown in FIG. 7 user interface 4002 can have registration actuator 4102. System 2000 can be operative so that when registration actuator 4102 is actuated the configuration of the current work cell assembly of the current work cell in which the mold is located is registered in database 300 as being operational. An actuator for use in registering a current configuration can, in addition or in the alternative, be associated on any component of system 2000 operative for communication, e.g., can be incorporated in user interface 4004 of an injection molding machine 20, a user interface 4006 of workstation computer 60, and/or user interface 4008 of workstation computer 70, a user interface associated to server 200, or server system 500 (as shown in FIG. 1). In one example, user interface configuration 5002 described herein relative to FIG. 9 can include registration actuator 5052 which when actuated results in registration of a current injection molding assembly configuration.

In one embodiment, system 2000 can be operative so that an injection molding assembly configuration is recorded as being operational in response to a result of a process run by system 2000. For example, system 2000 can be operative to run a program that monitors the performance of one or more cycles of a production run by each current injection molding assembly configuration at a certain work cell. System 2000 can be operative so that if performance criteria indicative of an operational injection molding assembly running an injection molding process, as determined by running of a monitoring process, are satisfied for a current injection molding assembly, the current injection molding assembly is registered as an operational injection molding assembly configuration. Such program can be conveniently run by a CPU of an injection molding machine of a current work cell. Criteria that can be used to determine whether a cycle of a production run has been successful can include, e.g., cycle time within a certain threshold, a shot size related criteria, e.g., shot size repeatability. For determining whether a shot size criteria has been satisfied, a weighing mechanism can be disposed in association with a mold to weigh finished parts. For determining cycle time, a sensor 3018 coupled to system bus 3008 of injection molding machine 20 can comprise a strain gauge disposed to sense injection molding machine clamping pressure in combination with a timer. In one embodiment, an injection molding assembly can be determined to be operational if a predetermined number of successive finished parts are within a predetermined weight range. For determining whether a cycle time criteria has been satisfied, a time to complete a cycle can be monitored. In one embodiment, an injection molding assembly configuration can be determined to be operational if a predetermined number of successive cycles are completed within a predetermined time.

System 2000 can be operative so that registered configurations herein can be deregistered through a de-registration process. A de-registration process can be initiated, e.g., responsively to an operator initiated command entered utilizing a user interface of system 2000, or initiated responsively to a running of a process. For example, system 2000 can be operative so that a registered configuration is de-registered responsively to an actuation of an actuator of a user interface of system 2000 or responsively to a running of a monitoring process in which a cycle of a production run is monitored. In another aspect, each registration of an operational injection molding assembly can include an associated time stamp recording the time of the registration. Server 200 can include a real time clock and can be utilized for performance of such time stamping.

With the injection molding assembly components of the current work cell 100 being in communication with one another, the collecting and reporting of component identification information in response to a determination that a configuration is operational (e.g., by operator designation, by a running of a process) can be accomplished in a variety of ways. For example, if a certain LAN identifier is associated to a particular work cell, a component of the LAN can command, as part of a registration reporting process, each component within the LAN to report its component identifier to database 300. If components within system 2000 are location aware, e.g., by incorporation of GPS or network based location detection functionality, system 2000 can be operative so that each injection molding assembly component within a geography (set of coordinates) designated as belonging to the current work cell, as part of a registration reporting process can report its component identifier to database 300. System 2000 can be operative so that on recording of an operational injection molding assembly configuration, system 2000 records programming data associated with the components of the injection molding assembly configuration determined to be operational as well as component identifiers.

It has been mentioned that system 2000 can monitor a cycle of a production run to determine whether an injection molding assembly is operational. In another aspect, system 2000 can be operative to increment a counter each time a cycle is determined to be complete. In one example, a registration identifier can be recorded in an array form with an associated counter. System 2000 can monitor whether a cycle has been complete by examining an output of a sensor 3018 operationally disposed to sense an opening of an injection molding machine clamp and mold can be regarded as an indication of a completion of a cycle. In one embodiment, sensor 3018 is coupled to system bus 3008 of mold 10 and includes a proximity sensor disposed to sense a mold opening. In one embodiment sensor 3018 is coupled to system bus 3008 of injection molding machine 20 and comprises one or more of a strain gauge disposed to sense clamping pressure of an injection molding machine clamp and an SPI EUROMAP interface, e.g., SPI EUROMAP 12, SPI EUROMAP 61. The SPI EUROMAP interface can output signals that can be processed to determine a clamp state. System 2000 can increment a count of the counter on each mold opening. It has been described that a registration identifier as a row entry item can associate each of several components of an injection molding assembly including, e.g., a mold, injection molding machine, dryer, chiller, and robot. Thus, while a cycle monitoring can be carried out by examining an operational aspect of a single component such as an injection molding machine or mold, the association to a registration identifier can result in a cycle count being maintained for each of several injection molding assembly components associated to the registration identifier.

There is set forth herein a method for recording a number of cycles participated in by an auxiliary injection molding assembly component, the auxiliary injection molding assembly component selected from the group consisting of a dryer, chiller, and robot, the method including the steps of assigning an identifier to an operational injection molding assembly that includes a mold, an injection molding machine and the auxiliary injection molding assembly component; monitoring an output of the mold; incrementing a counter associated with the identifier each time the monitoring indicates a completion of a cycle.

There is also set forth herein a system for use in performance of injection molding operations including an injection molding assembly comprising an injection molding machine, a mold, and an auxiliary injection molding assembly component selected from the group consisting of a dryer, chiller, and a robot; wherein the system is operative to assign an identifier to the injection molding assembly responsively to a determination that injection molding assembly is operational; wherein the system is further operative for monitoring performance of the injection molding assembly; and wherein the system is further operative to update a counter associated to the identifier responsively a monitoring indicating that a cycle has been completed.

In another aspect, system 2000 can be operative so that certain important data messaging and/or recording steps can ensue responsively to an injection molding assembly configuration being registered as an operational injection molding assembly configuration. In the process of setting up an injection molding assembly prior to its registration as an operational injection molding assembly, an operator may have developed reconfigurable programming data for each of the various components of the injection molding assembly. Such reconfigurable programming data can comprise e.g., setup parameters, executable code, or a combination of setup parameters and executable code. In one embodiment, such reconfigurable programming data can be recorded in registration table 302 as will be described herein allowing the association of component software with a historical state of an injection molding assembly component.

Figure 8:
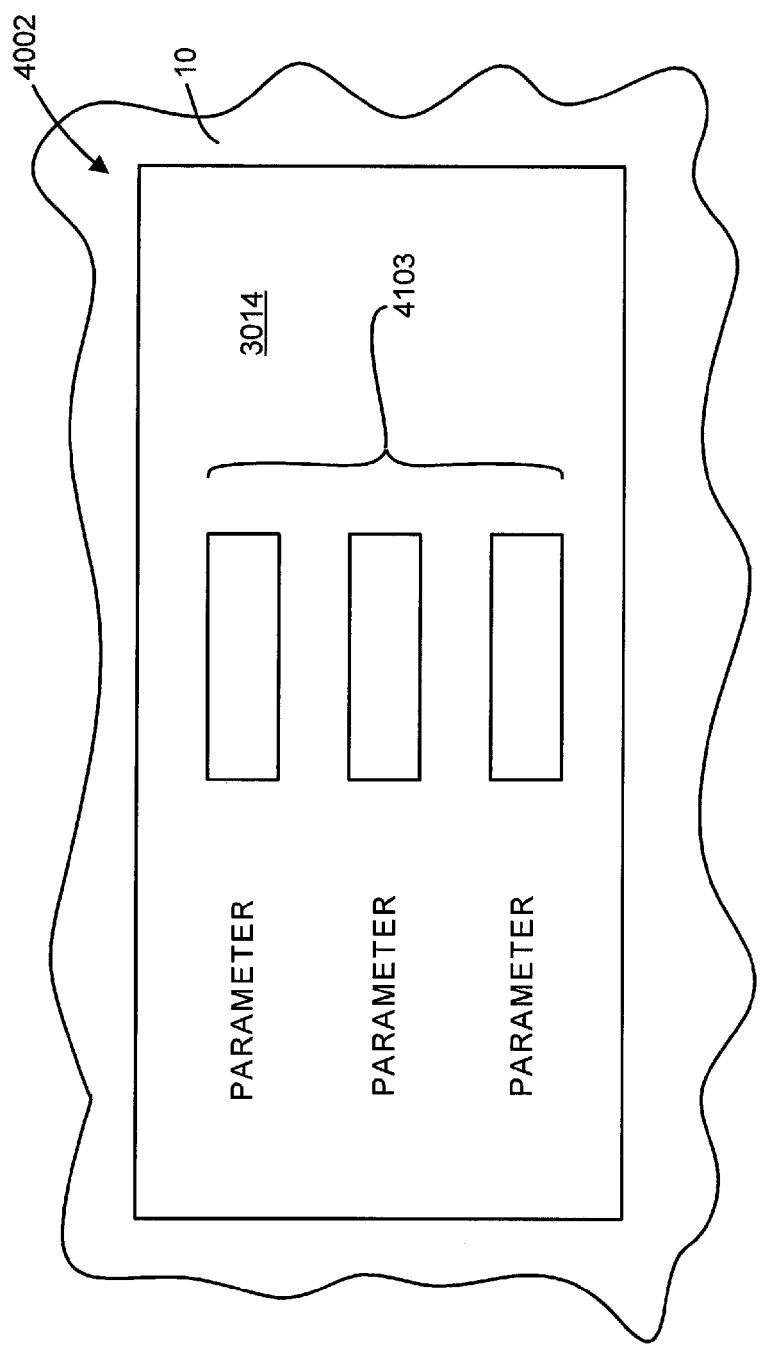
FIG. 8 is an exemplary user interface for an injection molding assembly component.

Some injection molding components are available with main program loops as part of the component firmware can be normally restricted from executing executable code not part of the firmware but nevertheless can be reconfigured by changing a number of setup parameters of the component with use of a user interface of a component. For example, injection molding machines, molds, dryers, and chillers are often available to operators in such configuration that allows an operator to change a setup parameter of the component. A representation of a user interface for a mold (including a mold cavity coupled with a hot runner controller) allowing operational parameters to be changed is shown in FIG. 8. An operator can reconfigure the current programming data associated with an injection molding assembly mold by entering new setup parameters for the mold using a user interface featurized as shown in FIG. 8 using in particular selection area 4103. Injection molding machines, dryers, and chillers can be provided with similar user interfaces for changing operational parameters. Thus, current reconfigurable programming data of an injection molding machine, mold, dryer, or chiller in one embodiment can consist of a set of setup parameters. A robot associated with an injection molding assembly can be reprogrammed by providing a set of executable code instructions controlling the timing and movement of the robot in association with an injection molding machine. Thus, programming data associated with a robot may include executable instructions. Reconfigurable programming data of injection molding machines, molds, dryers, and chillers can also include executable code in place of or in addition to setup parameters, and reconfigurable programming data of a robot component can include setup parameters in addition to or in place of executable code. Programming data of an injection molding assembly component can include a setup parameter, executable script, and an executable binary sequence. An executable binary sequence can be in the form of, e.g., a binary file or a stream of bits and can have corresponding source code that can be regarded as programming data.

For recording of reconfigurable programming data associated with registered injection molding assemblies determined to be operational, the reconfigurable programming data (and/or reference to such programming data) associated with each of several injection molding assemblies can be stored in a registration table 302 of database 300 as shown in FIG. 6, and can be indexed according to a registration number allocated to the registration so the programming data is easily recovered after its recording by keying using the registration ID number. Referring to the table of FIG. 6, a row of data recording each registered injection molding assembly determined to be operational can include a registration ID number, identifiers for each component of the configuration, and associated with each component a reference to the reconfigurable programming data of each component. Such reference can be in the form of a file reference referencing a directory path for a file including the component's programming data. Programming data in the form of setup parameters is conveniently recorded in the form of text based (e.g., XML or HTML) files. Programming data in the form of executable code is conveniently recorded using text based files or executable code files. Reconfigurable programming data is conveniently stored at a central location, e.g., at server 200.

System 2000 can be operative so that when a new registration request is made, (e.g., responsively to an operator input command or monitoring process), server 200 requests programming data from all of the injection molding components associated with the registration ("pull" request). System 2000 can also be operative so that when a registration request is made, e.g., responsively to an actuation of a user interface of an injection molding assembly component or responsively to a process, the components of the injection molding assembly to which the registration command is made transmit (i.e., "push") their current reconfigurable programming data at the time of registration to server 200 for storage in registered operational configurations table 308 of database 300. Programming data of an injection molding assembly component can be stored in a file format so that the programming data retains its content when transmitted between file directories of various memory equipped devices (e.g., injection molding assembly components and servers) of system 2000.

In development of a design for system 2000, it was determined that setup of a current injection molding assembly would benefit by the presentation of information relating to conditions prevailing within system 2000. Such information can include past prevailing conditions (e.g., information relating to past operational injection molding assembly configurations) and/or present prevailing conditions.

Figure 9:
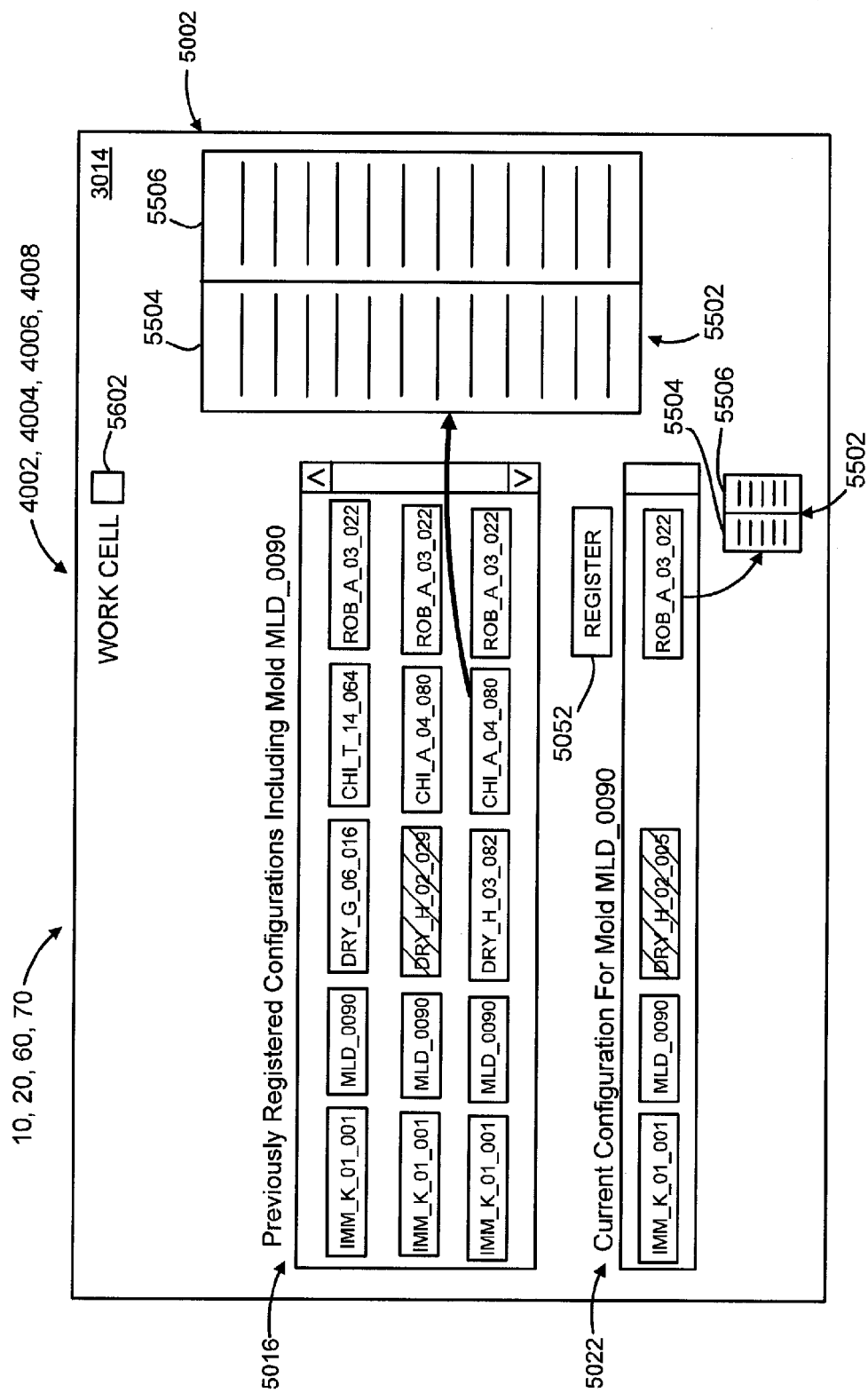
FIG. 9 is an exemplary user interface configuration for use in setting of an injection molding assembly.

An exemplary user interface configuration 5002 for use in setting up a current injection molding assembly in a current work cell is set forth in the example of FIG. 9. The user interface configuration of FIG. 9 can be conveniently incorporated into user interface 4006 of workstation computer 60 and displayed on display 3014 of standalone workstation computer 60 associated to a current work cell. User interface configuration 5002 can, in addition or alternatively, be incorporated into another user interface, e.g., user interface 4002 of mold, user interface 4004 of injection molding machine 20, and/or user interface 4008 of workstation computer 70 in portable hand held form. Referring to the user interface configuration 5002 of FIG. 9, there can be presented in area 5016 information indicating past operational injection molding configurations that have been determined to be operational and that include the mold currently within the current work cell. The operator is therefore provided a powerful representation as to "what has worked before" with the current mold. User interface configuration 5002 can be made active in response to an operator input command, made, e.g., a selection of an option from a set of menu options of a component of system 2000. There is set forth a system for use in performance of injection molding operations, the system comprising a mold that can be associated with different components to define a plurality of different injection molding assembly configurations, each of the plurality of different injection molding configurations being defined by an association of components with the mold at a given time; a computer implemented database 300, wherein the system is operative so that the computer implemented database records information respecting one or more operational injection molding assembly configuration that includes the mold; and wherein the system is operative to display information respecting a past operational injection molding assembly configuration that includes the mold.

While a mold identifier is selected for keying database queries in the described example other component identifiers can be selected for use in making database queries of database 300. Nevertheless, selecting a mold identifier for controlling database querying offers certain advantages. Specifically, a selection of components of an injection molding assembly and of programming data for such components is often dependant on requirements of a mold. Thus, if a mold was operational when supported by a certain set of components and associated programming data, one or more of those same components and items of programming data often will be useful for support of the mold when the mold is re-deployed as part of a new injection molding assembly.

System 2000 can be operative so that by default a current work cell for which there is displayed information in area 5022 is a work cell in which the computer presenting user interface configuration 5002 is currently located. However, in some instances a computer e.g., workstation computer 60 or workstation computer 70 presenting user interface configuration 5002 may not be located in any work cell. For example, a workstation computer 60 or 70 presenting user interface configuration 5002 may be located proximate server 200 or incorporated in server 200, e.g., incorporated in a workstation computer 60, 70 proximate a server of server system 500, or incorporation in a server or server system 500, or may be located remote from a facility. Also, where user interface configuration 5002 is located within a first work cell, it may be desirable to use that user interface configuration for setup of a second work cell. Also, system 2000 can be operative so that user interface 5002 can be active simultaneously for two different components which can commonly display information related to the same certain work cell in area 5022. A first computer can be disposed within the certain work cell and the second computer can be disposed externally to the certain work cell. In one embodiment, user interface configuration 5002 can include area 5602 allowing an operator to designate a current work cell for which user interface configuration 5002 will display information overriding the default state in which there is displayed information pertaining to the work cell in where the computer incorporating user interface configuration 5002 is currently located.

In area 5022 there can be presented information indicating identification of components of the current injection molding assembly configuration (i.e., components currently within the current work cell). For determining of identification information indicating identification of components of a current work cell, a number of methods can be implemented. For example, a component, e.g., workstation computer 60, injection molding machine 20, of the current work cell 100 where the work cell has a logically associated LAN can request each component within the LAN return to it an identifier, e.g., a component ID. Where system 2000 includes location aware components, system 2000 can be operative so that for display of information in area 5022, system 2000 is operative so that each component within a set of coordinates allocated to work cell 100 reports to the computer, e.g., CPU or controller equipped component, incorporating user interface configuration 5002 its identifier. The providing of area 5016 with area 5022 which can be simultaneously displayed allows an operator to easily compare the configuration of the current work cell with historical configurations determined to be operative that utilized the mold currently in the current work cell. System 2000 can be operative so that wherein system 2000 determines identification information for one or more components of a current work cell, system 2000 utilizes such identification information for performance of one more functions in addition to display of information respecting the one or more components. For example, as will be explained further herein, system 2000 can utilize the identification information for determining destinations of one or more communications transmitted by system 2000. In some instances, system 2000 will transmit communications to a select subset of components of system 2000, e.g., in one example, only to injection molding assembly components within a certain work cell. System 2000 can record current address listings correlating identification information of system 2000 components with network addresses of the components, e.g., system bus addresses, port addresses including network hardware port addresses (e.g., switch port addresses), Layer 2 addresses e.g., Ethernet, IEEE 802.11 addresses, and/or Layer 3 addresses, e.g., IP addresses. Thus, if system 2000 is to selectively send communications to, e.g., injection molding assembly components of a certain work cell, it can utilize the determined identification information in transmitting the communications, referencing one or more of such address lists. System 2000 can also be operative to utilize determined identification information for recording of information that indicates an identification of component into database 300. System 2000 in one embodiment can be operative to record an entry into location logging table 304 described herein responsively to use interface 5002 configuration 5002 being made active or at fixed time intervals when user interface configuration 5002 is active. Regarding area 5022, system 2000 can be operative so that actuation of a component identifier e.g., ROB_A_03_022 in the example of FIG. 9, therein returns window 5502 including specification and current programming data. For a certain component, system 2000 can further be operative to allow an operator editing of such displayed current programming data for the certain component.

For display of programming data in window 5502, system 2000 can request the certain component to return its programming data for return of the programming data. Alternatively, system 2000 can include a component specification table 306 and software logging table 308 as set forth herein and system 2000, e.g., by a communication transferred by the computer incorporating user interface configuration 5002, can query database 300 for specification information and programming data for the certain component. A system for use in performance of injection molding operations, the system comprising an injection molding assembly disposed in a work cell including a first injection molding assembly component and a second injection molding assembly component, the first and second injection molding assembly components being of different component types and each being of a type selected from the group consisting of a mold, an injection molding machine, a dryer, chiller and robot, wherein the system is operative to determine identifiers for the first and second injection molding assembly components; a user interface operative to display identifiers for each of the first and second injection molding assembly components and providing access to one or more of programming data and specification data for each of the first and second injection molding assembly components. There is set forth herein a system for use in performance of injection molding operations, the system comprising a plurality of components including first and second injection molding assembly components, the first and second injection molding assembly components being disposed in a common work cell, the first injection molding assembly component being selected from the group consisting of a mold and an injection molding machine, the second injection molding assembly component being an auxiliary injection molding assembly of an injection molding assembly type selected from the group consisting of a dryer, chiller, and robot, wherein the system is configured so that the first and second injection molding components assembly are operative for communication with one another. There is also set forth herein a system for use in performance of injection molding operations, the system comprising a plurality of components including first and second injection molding assembly components, the first and second injection molding assembly components being disposed in a common work cell, the first injection molding assembly component being selected from the group consisting of a mold and an injection molding machine, the second injection molding assembly component being an auxiliary injection molding assembly of an injection molding assembly type selected from the group consisting of a dryer, chiller, and robot; wherein the system is operative to determine identification information for the second injection molding assembly component; and wherein the system is operative to utilize the identification information for one or more of (a) display of information relating to the second injection molding assembly component on a user interface display, (b) transmission of a communication to the second injection molding assembly component, and (c) recordation of information identifying the second injection molding assembly component in a database.

Additional features can be incorporated into a user interface of system 2000. For example, system 2000 can be operative so that component identifiers displayed on a display can be configured as hot button actuators which when actuated result in additional information being displayed respecting the component identified by the identifiers. Referring to the user interface described with reference to FIG. 9, system 2000 can be operative so that actuation of a component identifier results in a window having the characteristics of window 5502 being displayed. In area 5504 window 5502 can include additional specification data respecting the component, and in area 5506 window 5502 can include programming data of the component. Recovery of additional specification data for a component can include a query of a component specification table 306 as will be described herein. Displayed specification data can include e.g., a manufacturer of a component, a manufacture date, model number, part number, and rating information for a component each of which can be returned by query of table 306. It is explained herein that system 2000 can be operative to determine a current location of one or more components of system 2000. In another aspect, displayed specification data displayed in area 5504 can include information indicating a current location of the component to which information currently being displayed by window 5502 relates. In another aspect, area 5504 can include an actuator 5402 as further described with reference to FIG. 20 for access to a facility map 5406. System 2000 can be operative so that responsively to actuation of actuator 5402 a facility map 5406 is displayed on display 3014 currently displaying window 5502. The facility map 5406 can highlight the current location of the component to which information currently being displayed by window 5502 relates. Accordingly, system 2000 can be operative to present detailed component specification information respecting specific components incorporated in past operational injection molding assembly configurations including the mold of the current work cell (or other selected component of a current work cell).

With a history of programming data for a particular component being recorded in database 300, various features can be incorporated into system 2000. In one embodiment, system 2000 can be operative so that an operator designated component of system 2000 can be subject to a programming data update to include past programming data of a system component responsively to an operator input command input using a user interface of system 2000. For example, system 2000 can be operative so that by (a) highlighting via operator input command an identifier of a particular component, e.g., DRY_H_02_029 of a past operational configuration, displayed according to user interface configuration 5002 in area 5016; and (b) highlighting via operator input command an identifier presented in area 5022 indicating a component of a current configuration, e.g., DRY_H_02_005, results in system 2000 attempting to transmit the past programming data of the component identified by first highlighted identifier DRY_H_02_029 into the component identified by the second highlighted identifier DRY_H_02_005. System 2000 can be operative so that the transmitting is executed conditionally on the condition that the system determines that the components are compatible. The component, e.g., in the referenced example to dryer DRY_H_02_005 can be operative to utilize the transmitted programming data, e.g., by execution of an operating program. Referring to area 5016 of the user interface configuration 5002 as shown in FIG. 9, an example is described for further description of certain available functionality of system 2000 in one embodiment. Referring to area 5016, identification information for three past operational injection molding configurations is shown, each of the past operational configurations has a common robot ROB_A_03_022. For each of the three configurations, programming data that is recorded for ROB_A_03_022 can be different, and can be programming data for determining operation of the robot ROB_A_03_022 at different times. Accordingly, it is seen that system 2000 can be operative to record first and second programming data for a component that determines operation of the component at first and second different times, and can allow operator access to the first and second programming data (e.g., for viewing or downloading to a certain component).

It will be understood that when an injection molding assembly component utilizes programming data recorded in database 300 that is transmitted from database 300 and which was previously recorded in a certain same or other injection molding assembly component of system 2000, the programming data that is each of transmitted from database 300 and utilized by the injection molding assembly may or may not comprise the entirety of programming data previously recorded in the certain same or other injection molding assembly component of system 2000. For example, after transmission of a set of programming data into an injection molding assembly component, a subset of the set of programming data may be subject to editing. Also, for example, database 300 can have recorded therein a set of programming data corresponding to and determining operations of a certain injection molding assembly at certain point in time of system 2000, and prior to transmission of programming data to an injection molding assembly component, a subset of the set of programming data can be subject to editing so that only a subset of programming data determining operation of the certain injection molding assembly component at that certain point in time is transmitted to an injection molding assembly component for utilization by the injection molding assembly component.

There is set forth herein a system for use in performance of injection molding operations, the system comprising an injection molding assembly component being of a type selected from the group consisting of a mold, an injection molding machine, a dryer, a chiller, and robot; a computer implemented database 300, wherein the system is operative so that the computer implemented database records programming data for the injection molding assembly component responsively to an occurrence of a predetermined event, wherein the system is operative so that the computer implemented database records first programming data and second programming data for the injection molding assembly component, the first programming data being programming data determining operation of the injection molding assembly component at a first time, the second programming data being programming data determining operation of the injection molding assembly at a second time different from the first time; wherein system is operative to allow access to the first programming data and the second programming data. There is also set forth herein a system for use in performance of injection molding operations, the system comprising a mold that can be associated with a plurality of different components to define a plurality of different injection molding assembly configurations, each of the plurality of different injection molding configurations being defined by an association of components with the mold at a given time; a computer implemented database 300, wherein the system is operative so that the computer implemented database 300 records information respecting a past operational injection molding assembly configuration that includes the mold, the past operational injection molding assembly including a first auxiliary component of the first type, and the information including certain programming data for the first auxiliary component; wherein the system is operative for execution of a cycle of a production run using a current injection molding assembly configuration that includes the mold and that includes a configuration other than the past operational injection molding assembly configuration, the current injection molding assembly configuration including a second auxiliary component of the first type; and wherein the system is operative for transmission of the certain programming data from the database to the second auxiliary component. There is further set forth herein a system for use in performance of injection molding operations, said system comprising a first component for use in an injection molding assembly selected from the group consisting of a mold, injection molding machine, dryer, chiller and robot; a computer implemented database 300, wherein the system is operative so that the computer implemented database 300 records first programming data for the first component and second programming data for the first component, the first programming data being programming data for determining operation of the first component during a first time, the second programming data being programming data for determining operation of the component during a second time subsequent to the second time; a second component being of a common component type relative to the first component; and a user interface, wherein the system is operative so that responsively to a command activated using the user interface, a selected one of the first programming data or second programming data is transmitted to the second component.

Referring now to additional aspects of system 2000, system 2000 can be operative so that a current location of each injection molding assembly component can be recorded at various times so that a record can be developed indicating a history of locations of each injection molding assembly component of system 2000 over time. Such information therefore indicates and can be regarded as a geographic migration history of a component. Although a variety of different configurations are available the location information is conveniently stored in a component database 300 collocated with facility server 200. There is set forth herein a system for use in performance of injection molding operations, the system comprising first and second injection molding assembly components, each of the first and second injection molding assembly components being selected from the group consisting of a mold, an injection molding machine, dryer, chiller, and robot; a computer implemented database 300; wherein the system is operative to determine information indicating a current location for the first injection molding assembly component; wherein the system is operative to determine information indicating a current location for the second injection molding assembly component; wherein the system is operative to record in the computer implemented database 300 information indicating a current location of the first component at a plurality of points in time so that the computer implemented database 300 records a history of locations of the first injection molding assembly component; wherein the system is further operative to record in the computer implemented database information indicating a current location of the second component at a plurality of points in time so that the computer implemented database records a history of locations of the first injection molding assembly component.

System 2000 can be operative for recording of location information of injection molding assembly components according to a variety of different configurations. In one embodiment server 200 can be operative to transmit a request communication, from time to time (e.g., pre-set time intervals) each injection molding assembly component of system 2000 requesting each component to report identification information for the component and a location information for the component. Responsively to such "pull" requests, the various components can responsively report identification information and location information to server 200. In another embodiment each injection molding assembly component in communication with server 200 can be operative to "push" identification information and location information to server 200. For example each injection molding assembly component on power up can be operative to transmit a communication to server 200 to report to server 200 for recording in database 300 identification information and location information of the component.

In another embodiment, one or more intermediary components of system 2000 can be operative to assemble identification information and location information from other components and push the location and identification information to server 200. For example, molds 10-1, 10-2, 10-3 of system 2000 in the state as shown in FIG. 1 can be designated as components of system 2000 which on power up determine identification information and location information for components in proximity with the respective mold and report the assembled identification information and location information (including identification and location information for itself) to server 200.

In one embodiment, identification information and location information that can be recorded by system 2000 can be time stamped. Time stamping can be conveniently accomplished with use of a real time clock of server 200. Identification information of a component of system 2000 in one embodiment can include identification information in the form of an identification ID which can be provided, e.g., by an alphanumeric text string. The identification information, e.g., in the form of an alphanumeric text string can include embedded "component type" information, e.g., designating the component is, e.g., a mold, injection molding machine, dryer, chiller, or robot. Such identification information for a certain component can be stored in a non-volatile memory of the certain injection molding assembly component. Such non-volatile memory can be included in system memory 3004 if present and/or a memory 3024 of RFID tag 3020 if present and/or a memory 3034 of memory drive unit 3030 if present. In another embodiment, identification information can be provided by specification parameters for the component stored in a non-volatile memory of the component. Location information that can be transmitted by a component of system 2000 can include or can be processable to determine a location ID. A location ID of system 2000 can be a work cell ID or a storage location ID corresponding to storage location 110.

A number of configurations are possible for use in generating location information for the various components of system 2000. In one example of system 2000 in which components of system 2000 incorporate location aware functionality, a discrete OSI Layer 2 network can be implemented in and be logically associated with each work cell 100-1, 100-2, 100-3 and storage location 110. Such an OSI Layer 2 network can be provided by e.g., an Ethernet network, a Bluetooth network, or an IEEE 802.11 network. Location indicating signature information corresponding to the OSI Layer 2 network derivable from the network can be accessed by components of the network operative for communication, can be transmitted to server 200 as location information, and server 200 can conveniently be configured to include a table correlating the LAN signature information with location identifiers, and can be operative to resolve location identifiers for various components utilizing the table and the signature identification information. An example of location indicating signature information for an OSI Layer 2 network can be e.g., an IP address of the external interface or a router connecting each OSI Layer 2 network to Ethernet backbone 250.

In another embodiment, a facility 1000 can incorporate a single radio based LAN having enhanced location aware functionality such that a coordinate location for each component of the LAN can be determined within a small error range (e.g., 1 to 3 meters). Such a radio based LAN can utilize triangulation methodologies to provide location information to mobile components of the LAN. Server 200 can be conveniently employed to maintain a facility map including coordinate locations corresponding to various work cell and storage locations and can utilize the map to determine work cell or storage location IDs for each component of system 2000 for which identification information and location information is received.

An injection molding assembly component need not have advanced networking communication capability for system 200 to determine a location ID for the component. For example, where a particular component configured to be operative for communication with an external component includes only an RFID tag 3020 but not a network interface included as part of I/O interface 3006, a certain component in read range of the RFID tag 3020 can read component identification information from the RFID tag 3020 and can conveniently transmit a communication utilizing a network interface of the certain component to server 200 including the accessed identification information associated with location information for the certain component so that server 200 can record the identification information for the particular component and location information in database 300, wherein the location information for the certain component can be utilized as the location information for the particular component.

In yet another embodiment, system 2000 can be operative so that location information for each of or a subset of injection molding assembly components includes information manually input by an operator. For example, each injection molding component of system 2000 can be operative to prompt an operator to input a location ID for the component, which ID can be transmitted to server 200 with associated component identification information. In such an embodiment, system 2000 can be operative so that an operator can be prompted to manually change the location identifier when a location of the component is changed. Configuring system 2000 so that system 2000 prompts an operator to enter location identification information reduces a risk of erroneous location determination by e.g., a component entering a connection range a LAN associated work cell or a coordinate range of a work cell other than a work cell to which it is associated.

In another embodiment, system 2000 can be operative so that location information for various injection molding assembly components is based on a component's association with a particular OSI Layer 2 wireline LAN. In one embodiment a different OSI Layer 2 wireline LAN, e.g., Ethernet network can be provided for each work cell of a facility and each component of each work cell when moved into the work cell can be wireline connected to the wireline network. System 2000 in such an embodiment can determine location information for each component based on LAN identification information of the wireline associated wireline LAN for each component.

In another embodiment where one or more injection molding assembly components incorporate wireless network communication capabilities, short range radio technologies, e.g., RFID reading technologies can be employed to resolve a current location of a component. For example, a pair of neighboring first and second work cells can be configured to include first and second IEEE 802.11 LANS. An injection molding assembly component may be located in a first work cell but may be in communication range of both of an access port of the first LAN and an access port of the second LAN. For resolution of a proper network association, and current location of the components, the component can be configured to include an RFID tag and a computer within each work cell, e.g., each work cell's access point or injection molding machine 20 can be configured to include an RFID reader unit 3010, a sensitivity of which is established so that only RFID tags within the work cell of the RFID reader unit are read.

Figure 10:
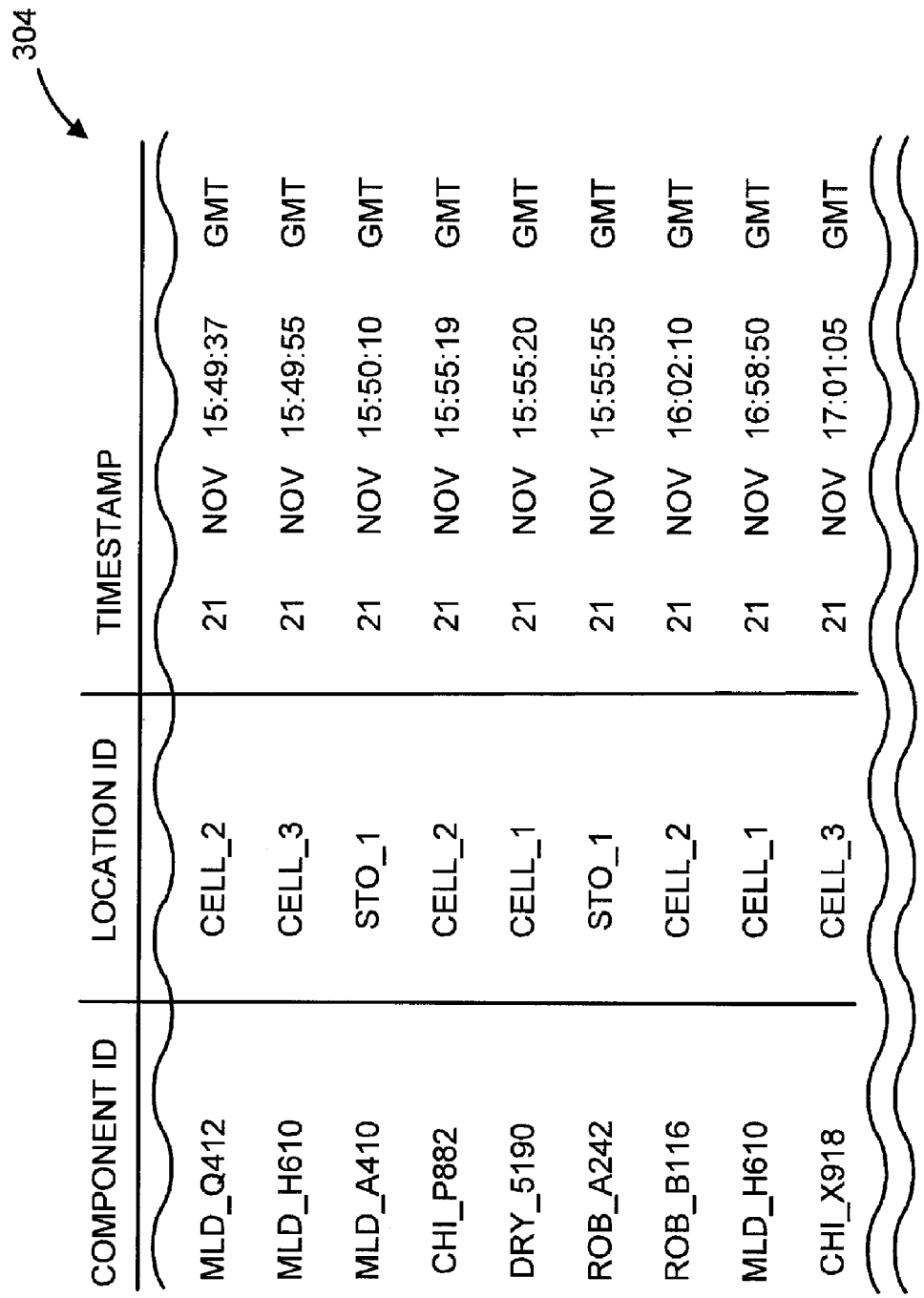
FIG. 10 is an exemplary partial view of a database table that correlates component identification information in the form of component identifiers with location information in the form of a location ID and with a time stamp.

A representation of an exemplary enhanced component on database 300 in an embodiment wherein database records location information of injection molding assembly components over time is shown in FIG. 10. In the embodiment of FIG. 10, there is recorded in location logging table 304 location information together with identification information in the form of a component identifier provided by component ID with a prefix e.g., MLD=MOLD; CHI=CHILLER allowing the component type to be determined from the component ID.

Figure 11:
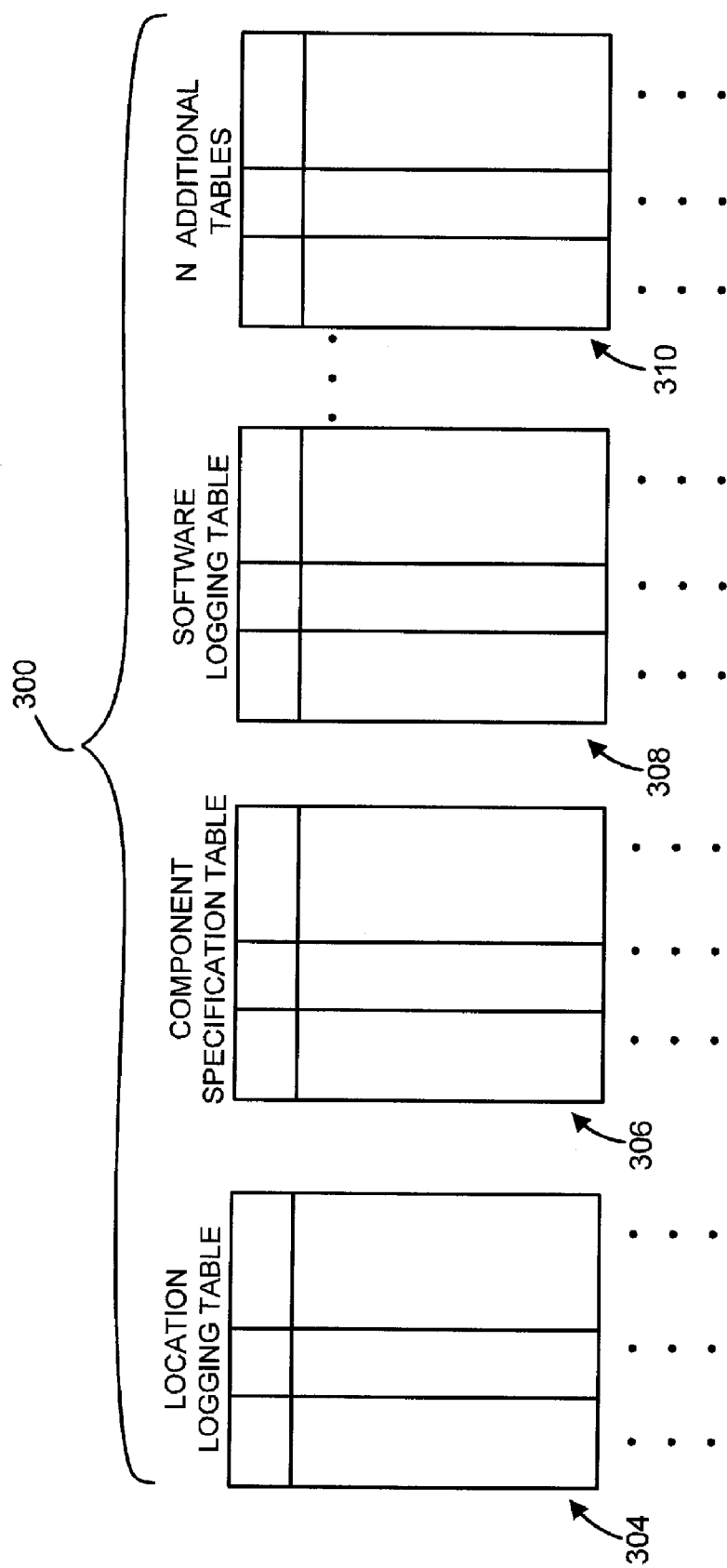
FIG. 11 is a representation of component database having a plurality of tables.

Database 300 can include a number of additional primary tables, e.g., location logging table 304, component specification table 306, software logging table 308, and N additional tables 310 as shown in the exemplary embodiment of FIG. 11. Included in the tables of N additional tables 310 can be a registration table 302 as described herein or else, if operational configuration recording information is recorded, information indicating that an injection molding assembly configuration has been determined to be operational can be appended to another table, e.g., location logging table 304. Identification information of a component could also include, e.g., specification parameters for the component from which a component ID can be derived. The component specification table 306 may be configured to record component specification data e.g., the make, model, part number, and manufacture date of the component referenced by the component ID as well as values of rating metrics (ratings) logically associated with the component such that this information is accessible by querying component database 300 with one or more component identifiers or keys. In one embodiment such ratings of a component may include the maximum rated value of a component specific rating, e.g., the lifting weight capacity in the case of a robot and the cooling power capacity in the case of a chiller. In one embodiment one or more ratings may each be logically associated within table 306 with a given key unique to a standard metric unit e.g., in an associative data structure or linked list, where the data structure format may be text based, i.e., <liftingCapacity="20" maxCurrent="30"> or a simply a combination of values in one or more columns of a row of table 306. A representation of component table 306 in one embodiment is shown in FIG. 12 in which ratings information can be recorded in array form in a "ratings" column.

In another aspect, component specification table 306 can include an "Associated Component Requirements" column which can record one or more requirements of one or more components which can be associated in a certain component for which information is recorded in table 306. For example, for a certain mold, e.g., a mold identified by mold MLD_7842 there can be recorded in the column "Associated Component Requirements" e.g., information indicating the requirement that the mold only be used with an injection molding machine or a certain rating range, or a dryer within a certain rating range. Illustrative examples are presented in greater detail herein. Information recorded in the Associated Component Requirements column can be recorded in array form.

Referring to software logging table 308, system 2000 can be operative so that when programming data is updated in a component of system 2000, a row of data indicating the prevailing condition of the update having occurred is recorded. Each component of system 2000 can be operative so that on completion of an update of programming data programming information relative to the update can be transmitted to database 300. In one example, system 2000 can be operative so that each component of system 2000 responsively to a program update for the component reports a component identifier along with an identifier of the programming data update is reported to software logging table 308. Reporting of programming information can also include a reporting of the programming data to database 300. Reporting of programming data to database 300 can be accomplished in a number of ways. For example, such reporting can be accomplished by transmitting the programming data from the component to a column of table 308. In another example of reporting of programming data information, a component can transmit a reference to the programming data (e.g., a directory location) to table 308, and can also transmit the programming data to the designated location, e.g., directory location which programming data can be regarded as part of the component database 300. A directory reference within table 308 can serve as the program update identifier. A storage location, e.g., storage location at server 200 can be designated for storage of programming data of components of system 2000 over time. A representation of software logging table 308 in one embodiment is shown in FIG. 13.

Where component database 300 includes identification information in the form of a component ID, the ID can be e.g., originally stored at the corresponding component or can be derived by system 2000 from other identification information. In the embodiment of location logging table 304 set forth in FIG. 10, location information is recorded in the form of location IDs. However, there could alternatively be recorded in table 304 of database 300 other location information (e.g., coordinate information) from which a location ID can be derived. It is seen that system 2000 can be configured to query component database 300 in a variety of ways that will return useful data respecting conditions within system 2000, e.g., a location of a particular component over time, a list of components at a certain work cell at a certain time e.g., the present time and/or specification parameters logically associated with one or more components.

With an application established that records location of various injection molding assembly components over time, the application can be enhanced for achieving additional functionalities. In one example of an application enhancement as will be described further herein, content of the recorded location information recorded in database 300 can be utilized for improved operation of an injection molding assembly when executing an injection molding process application.

It has been described that location logging table 304 can be operative to record time stamped locations of several injection molding assembly components of system 2000 over time as the components are moved into and out of and between different locations of an injection molding facility. With such recorded information available from database 300, queries can be developed for querying database 300 for returning results, e.g., for display on a user interface display which can be utilized for operator observation and/or for input into application program interfaces (APIs).

For illustration of certain aspects of database 300 in one embodiment, table 402 of FIG. 14 shows the result of a query of database 300 for component parts at a certain work cell (identified by CELL_001) over time (a query may be made to return results for each state of a work cell over time, with the states being differentiated by the introduction or removal of component into the work cell). It has been described with reference to registration table 302 that responsively to an operator or process initiated determination that a certain injection molding assembly configuration is operational, registration information can be associated to a set of component identifiers, indicating that the components identified are operational as an operational injection molding assembly. With reference to the exemplary table architecture as shown in FIG. 14, registration information can in one embodiment be appended to location logging table 304. Table 402 as shown in FIG. 14 includes a subset of location logging table 304. Referring to the example of the table 402 as shown in FIG. 14, a work cell in an initial state, state 0, may be an unpopulated work cell and may include only an injection molding machine having the identifier IMM_K_01_001. A first state change of the work cell may occur when a mold is introduced into the work cell. Thus, for the work cell state 1 in the described example, there can be included the mold having the identifier MLD_0043 associated to the work cell CELL_001. Additional auxiliary injection molding assembly components may then be associated to the work cell. With reference to state 2 the dryer, DRY_G_06_016 may be associated to the work cell. With reference to state 3, the chiller, CHI_P_02_072 may be associated to the work cell. With reference to states 4 and 5, the chiller, CHI_P_02_072 may be replaced with the chiller, CHI_T_14_064. Such replacement may occur, e.g., if analysis reveals that CHI_P_02_072 is not satisfactory for the current job, or e.g., that the CHI_P_02_072 is required for servicing or needed in another work cell. Referring to state 6, the robot, ROB_A_03_022 may be introduced into the current work cell. Injection molding machines, dryers, chillers, and robots identified in the table 402 as shown in FIG. 14 are identified using the character string format $C_1C_2C_3\_C_4\_C_5C_6\_C_7C_8C_9$ where $C_1C_2C_3$ form a component type identifier string, $C_4$ is a manufacturer identifier, $C_5C_6$ form a model number identifier string and $C_7C_8C_9$ form a character string providing a unique part identifier for distinguishing between like model numbered components.

Still referring to the table 402 as shown in FIG. 14, it will be observed that each work cell can be expected to undergo periodic state changes. With reference to state 7 and state 8 recorded in the table 402 as shown in FIG. 14, the mold identified by MLD_0043 might be replaced with the newly introduced mold having the identifier MLD_0010. Then, after introduction of the new mold, it may be determined that a new dryer and chiller may be desired for operation with the new mold. States 9 and 10 recorded in the table 402 as shown in FIG. 14 indicate a change in dryer and states 11 and 12 indicate the change in chiller. Eventually, an operator may determine that the newly configured injection molding assembly is operational for a new production run and at such time may choose to register the configuration as being operational. In addition to or alternatively, a monitoring process can determine that a particular configuration is operational, e.g., by monitoring performance of the configuration during a cycle of a production run. On determination that a particular injection molding assembly configuration is operational, registration information can be appended to a row of information to the configuration. Referring to the example of the table 402 as shown in FIG. 14, state 12 is recorded as a registered and operational injection molding assembly configuration, and a registration identifier is appended to the row of data for state 12. While not depicted in FIG. 14 specifically, each set of registration information can be recorded with an associated time stamp so that the time registration can be recorded via query of database 300. In the embodiment described with reference to FIG. 14, registration information can be appended to the data of location logging table 304. In another embodiment, registration information can be maintained in a separate table having the configuration of registration table 302.

Still referring to the table 402 as shown in FIG. 14, states 13 and 14 are presented in the example to illustrate the possibility that a current work cell assembly may be subject to an adjustment not involving replacement of a mold. For example, a dryer may be required to be subject to servicing. Referring to states 13 and 14, there are recorded the events of the dryer identified by DRY_H_02_005 being replaced with the dryer identified by DRY_H_03_082 and the new injection molding assembly configuration with dryer DRY_H_03_082 being registered as an operational injection molding assembly configuration with Registration ID 08022. It is seen that the registration for operational setups may not be sequential for a given work cell (that is there is a jump from Reg. ID No. ID=08017 to Reg. ID No. ID=08022) in the described example. In one example, the interceding registration numbers may have been allocated to registrations of operational injection molding assemblies at other facility work cells.

Referring again to the table 402 as shown in FIG. 14, it is seen that a work cell can have recorded for it a great number of configuration states but that only a subset of the recorded configuration states may be flagged in database 300 as being registered configuration states corresponding to injection molding assemblies determined to be operational for purposes of manufacture of injection molded articles. Further, it can be observed that a work cell can have either zero or one active registered injection molding assembly configuration. For example, referring to the example of the table 402 as shown in FIG. 14, the work cell identified by Cell_001 at the time state 13 is valid can be regarded as having zero active registered injection molding configurations. At the time state 14 is valid, however, the work cell identified as CELL_001 can be regarded as having one active registered configuration, the registered configuration identified by Registration ID No. 08022.

Referring to table 404 as shown in FIG. 15, table 404 is a table that can be returned by querying location logging table 304 where location logging table 304 includes enhanced programming data information and where location logging table 304 is keyed using a registration identifier. Table 404 can include a subset of the data of table 304, and in the specific example of FIG. 15 can include component identifiers for each of several registered injection molding assembly configurations determined to be operational as well as programming data information associated with each component identifier of each registered configuration.

Figure 16:
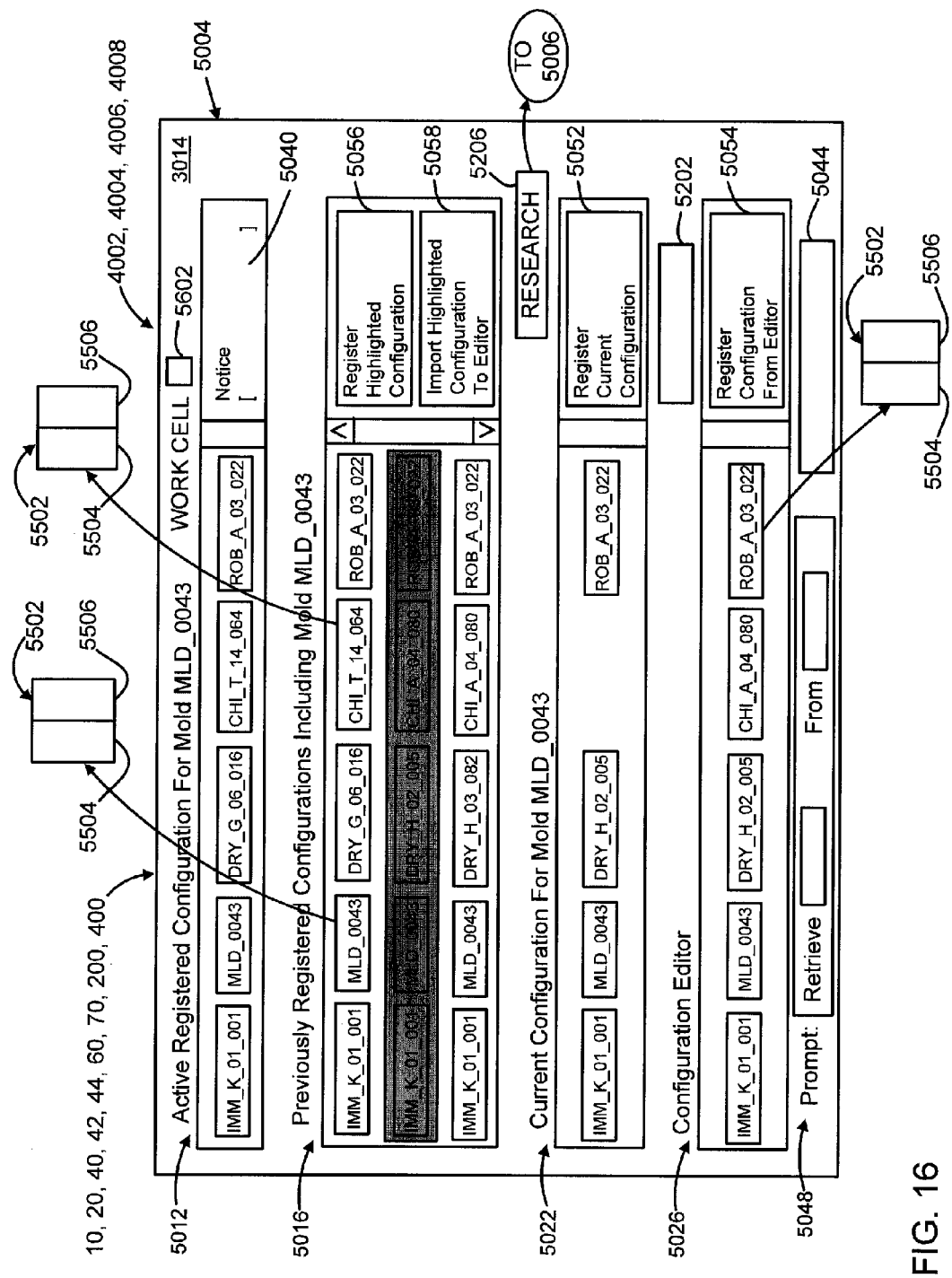
FIG. 16 is an enhanced user interface configuration for use in setting up of an injection molding assembly.

Further aspects of system 2000 in one embodiment are described with reference to FIG. 16 illustrating an enhanced setup user interface configuration 5004 for system 2000 in which contents of database 300 are utilized for simplification of setup of an injection molding assembly within a current work cell 100. With reference again to FIG. 7, there is shown a physical form view of an exemplary work cell 100 in which there is currently associated mold 10, an injection molding machine 20 and a plurality of auxiliary components including dryer 40, chiller 42, and robot 44. For purposes of discussion with reference to the enhanced user interface configuration 5004 of FIG. 16, it is assumed that a mold 10 currently located in a current work cell being subject to setup is a mold identified by the mold identifier MLD_0043. There is also provided in work cell 100 in the illustrative embodiment a workstation computer 60 in the form of a mobile laptop having user interface 4006. User interface 4006 can incorporate user interface configuration 5004 including a displayed set of menu options that can be displayed on a display 3014 of workstation computer 60. User interface configuration 5004 can be incorporated in user interface 4006 and/or a user interface of another component of system 2000 operative for communication, e.g., user interface 4002 of mold 10, user interface 4004 of injection molding machine 20, and/or user interface 4008 of mobile hand held workstation computer 70, or another user interface or otherwise associated to another component of system 2000 operative for communication, e.g., server 200 or a server of server system 500. Regarding user interface configuration 5004, all of the features described with reference to configuration 5004 can be combined with the features described with reference to configuration 5002 and all of the features described with reference to configuration 5002 can be combined with configuration 5004. For example, as in the case of configuration 5002, component identifiers can be configured as hot buttons such that actuation of an identifier hot button results in window 5502 being displayed having specification area 5504 and programming data area 5506. With software logging table 308 logging programming data updates, a present programming data can be available for any injection molding assembly component of system 2000 even where the component has not previously been associated to an injection molding assembly determined to be operational.

Aspects of enhanced user interface configuration 5004 are set forth herein in greater detail. Referring to area 5012, area 5012 can display component information (e.g., component identifiers) of a currently active registered injection molding assembly configuration associated with the mold identified by MLD_0043 (the mold currently in the work cell) if there is such an active registration. In area 5016 there can be displayed component identifiers of past registered configurations associated with the mold identified by the mold identifier MLD_0043. In area 5022 there can be displayed component information of the current configuration of the mold identified by the mold identifier MLD_0043. System 2000 can be configured so that returned in area 5022 can be component information for injection molding assembly components currently residing within work cell 100. In area 5026 there can be displayed an editing area which can be used to alter components of a configuration for registration that is designed "off-line", i.e., without reference to the components actually in a current work cell 10, and which may be regarded as an off line designed injection molding assembly configuration. In one example, area 5026 can be used to display prospective configurations being designated by an operator. System 2000 can be operative so that an operator can actuate a component identifier e.g., identifier ROB_A_03_022 within area 5026 to display programming data in a returned window 5502, and system 2000 can be further operative to allow editing of such displayed programming data. In areas 5202, 5040, 5044, and 5048 there can be displayed prompts and/or messages that indicate and which are responsive to various prevailing conditions of system 2000.

It will be seen that queries for developing information that is displayed in area 5012, area 5016, and area 5022 can readily be developed. Information displayed in area 5012 can be retrieved by querying database 300 to return component identifiers corresponding to the most recent un-cancelled registered configuration that includes the mold MLD_0043. For retrieving information for display in area 5016, database 300 can be queried to return component identifiers that are associated with each past registered configuration having mold MLD_0043 as a component. For retrieving information for display in area 5022, database 300 can be queried to return a set of component identifiers having recent time stamps that are associated to the current work cell, or alternatively, for retrieving information for display in area 5022, system 2000 can be operative in the manner described with reference to FIG. 9, for display of information in area 5022.

In accordance with user interface configuration 5004, a user interface can also be operative to display component specifications including ratings that may inform a determination of the suitability of a given component to participate in the intended injection molding process. For example, system 2000 can be operative so that actuation of component identifier results in a window 5502 as described with reference to FIG. 9 being displayed which includes displayed specifications, and displayed programming data. For display of specification and programming data, the component incorporating user interface configuration 5004, e.g., component 60 or other component incorporating user interface configuration 5004 and displaying the information can query database 300. For example, for retrieval of specification data a component for communication can query a Rating column and/or Associated Component Requirements column of a component specification table 306, which can include rating or requirement information in the form of an array. System 2000 may also be configured to restrict system 2000 subject to a determination that the ratings or requirements of a component are not within specified requirements as will be set forth herein.

Referring to the user interface configuration 5004 of FIG. 16 in further detail, a number of features and advantages are apparent. It is noted that a current active registered configuration for the mold MLD_0043 may not correspond to the configuration currently residing in the current work cell 10. For example, if the mold MLD_0043 has just been moved from another work cell, it is likely that the current registered configuration for the mold MLD_0043 has associated injection molding assembly components that currently reside at the previous work cell. Likewise if a component of the current work cell has been removed (e.g., removed for use in another injection molding process) then there will be a mismatch between the current active registered configuration and the current configuration residing in work cell 12.

Further, it can be seen that system 2000 can be operative so that differences between an active registered configuration and a current configuration can be discriminated by system 2000 to result in information being displayed that indicate the prevailing condition of system 2000 in regard to the condition of there being such a difference. For example, system 2000 can be operative so that if there is a difference between the active registered configuration and the configuration of the current work cell, there can be displayed a message, e.g., at area 5040 such as "CURRENT CONFIGURATION DOES NOT MATCH" or in area 5044 "MISMATCHED CONFIGURATION" indicating the prevailing condition of system 2000 that there is a mismatch. There can also be displayed more specific information. It has been described that database 300 can be queried to return a present location of any component of system 2000. Further, the difference discrimination can return a component identifier identifying a required component that does not correspond to the current active registered configuration. In area 5048 there can be displayed the prompt: RECOVER [COMPONENT PART IDENTIFIER] FROM [LOCATION IDENTIFIER]. An operator would thus be prompted to retrieve a specifically identified missing component from a specifically identified designated location. Conversely, system 2000 can be operative so that when an examination between an active registered configuration and a current configuration indicate that there is a match between components a positive reinforcing message can be displayed in area 5044, e.g. OK TO ACTIVATE INJECTION MOLDING.

It has been described that system 2000 can be operative so that certain processes, e.g., display of a message can be initiated responsively to a comparison between information associated with a currently active registration configuration and information of indicating an injection molding assembly configuration currently in a work cell. In another aspect, processes can be restricted responsively to a comparison between information of an active registration configuration and current configuration currently within a work cell.

Figure 17:
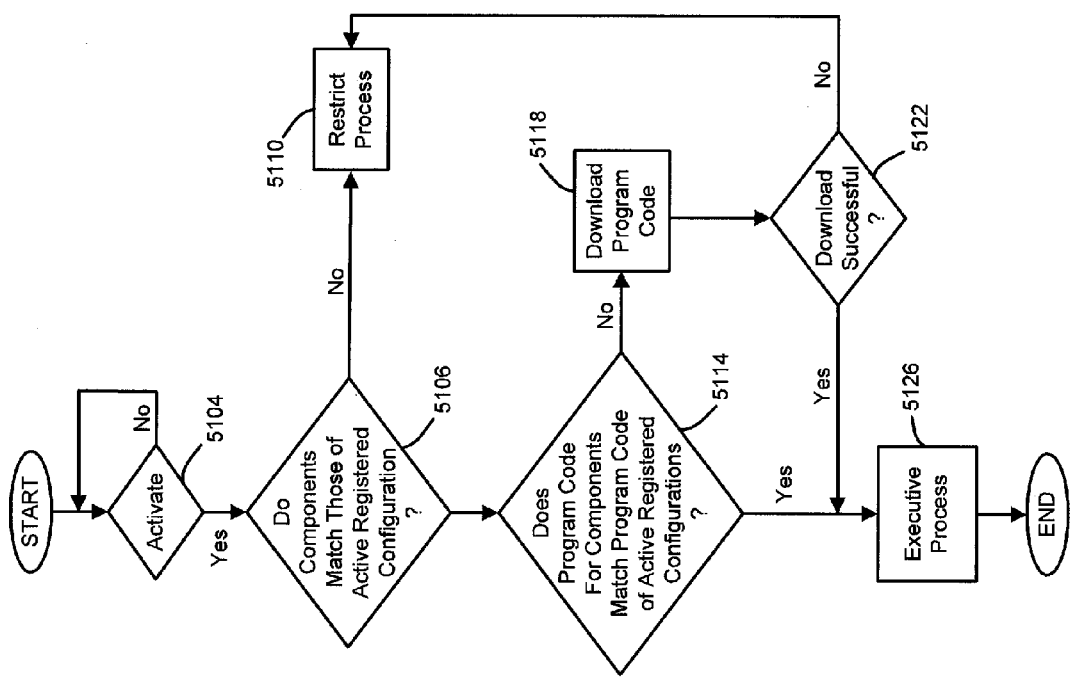
FIG. 17 is a flow diagram illustrating operation of an injection molding assembly system in one embodiment.

With reference to the flow diagram of FIG. 17, there is described a process wherein operation of a current injection molding assembly is restricted if components of a current injection molding assembly do not match those of a presently active registered injection molding assembly configuration for a current work cell. Such restriction of operation can comprise, e.g., restriction of activation of a current injection molding assembly for performance of a cycle production run. At block 5104 a command to activate a cycle of production run can be initiated, e.g., by actuation of actuator 4014. At block 5104 injection molding machine 20 can determine by appropriate query of database 300 as set forth herein whether components of a current configuration match those of an active registered configuration. If the current set of components and the components of the active registered configuration are not the same, activation of an injection molding process can be restricted at block 5110. Further at block 5114 the injection molding machine 20 can determine if programming data of the various components of the current injection molding assembly corresponds with the programming data of the active registered configuration. If not, a download process can be executed at block 5118 to download programming data into various components. If download fails (determined at block 5122) execution of the injection molding process can be restricted at block 5110. If download is successful, operation proceeds to block 5126 in which an injection molding process for performance of a cycle of production run can be permitted to be executed. With further reference to an injection molding process that can be made active by actuation of actuator 4104, an injection molding process can be run by a CPU of an injection molding machine 20. An injection molding process application that is run by a CPU of injection molding machine 20 can control such items as (a) how a mold should close, (b) cooling time, (c) opening position of mold. In performance of such process steps the injection molding machine program can read parameters that are part of the programming data of various injection molding assembly components. Also as part of an injection molding process a CPU of an injection molding machine 20 can command at certain times in the process activation or deactivation of various injection molding assembly components. In one embodiment, system 2000 can be operative so that as an alternative to execution of block 5118 (downloading of programming data if there is a mismatch between programming data of a current work cell component and programming data of the presently active registered configuration) system 2000 can be operative to display an appropriate message indicating there being a mismatch, e.g., at area 5202 of user interface configuration 5004 indicating a lack of correspondence between one or more programming data of a current work cell component and programming data of an injection molding assembly configuration determined to be operative, e.g., the presently active registered injection molding assembly configuration. An operator viewing the message can take appropriate action, e.g., editing code of the one or more components of the current work cell, registering the current work cell configuration as an operational injection molding assembly configuration, e.g., by actuation of actuator 5052 of user interface configuration 5004.

In another aspect, system 2000 can be operative so that an operator can change a currently active registered configuration for a current work cell. In one method for setting up an injection molding assembly, which may be termed an on-line setup method, an operator may physically move a variety of component articles into a work cell and then program them into configurations that are operational. Component information for such configuration can be displayed in area 5022. When an operational configuration is achieved an operator can then elect to register the current configuration. Such registration can be accomplished by actuation of e.g., actuator 4102 of user interface 4002, or actuator 5052 in the case of user interface configuration 5002 or configuration 5004.

When there is a registration of a current configuration there will be a match between the configuration of area 5022 and area 5012.

In another method for setting up an injection molding assembly, an operator can elect as an active registered configuration a previously registered configuration. It has been described that system 2000 can be operative to display in area 5016 past registered configurations for the mold MLD_0043. System 2000 can be operative so that an operator can select a past registered configuration as an active registered configuration, e.g., by highlighting a select past configuration and actuation of actuator 5056. If there is a mismatch between the newly made active registered configuration and the current configuration, prompting information can be displayed in area 5048 until an operator has retrieved the necessary components for operation of system 2000.

The on-line setup method has been described where an operator locates a plurality of components into a work cell and works with (e.g., programs), the components at the current work cell until each component is properly configured. In an off-line setup method, an operator may develop an operational configuration based not on components currently in a work cell but rather on components that may be associated to a work cell at some point in the future. Such setup methodology is highly useful, e.g., in cases where desired components of a configuration are certain to be available at some point in the future but are currently not available (e.g., as a result of being presently in use in another work cell). For facilitation of such off-line setup methodology, system 2000 can be operative so that displayed in area 5026 of user interface 5002 is an editing area. In area 5026 there can be displayed identifiers of injection molding assembly components that are selected completely at the discretion of an operator. Commonly, however a starting configuration in editing area 5026 is a past registered configuration that is imported for display into area 5026 from area 5016 upon an actuation of actuator 5058. In one common scenario a past registered configuration displayed in area 5016 may be very similar to a current configuration. For example, a past registered configuration may be very similar to the current configuration except the injection molding machine is different from the one of the present configuration but has the same manufacturer part number. In such a situation, an operator can highlight the noted past registered configuration, import it to area 5026 by actuation of actuator 5058 for editing, change the identifier of the injection molding machine so that it corresponds to the machine identifier of the current work cell, access database 300 for the programming data associated with the injection molding machine that was just changed, and download the programming data formerly associated to the prior injection molding machine to a new injection molding machine. User interface configuration 5002 can be operative so that an operator can register a configuration having component identifiers displayed in area 5026 by actuation of actuator 5054.

Referring to further aspects of system 2000, in one embodiment system 2000 can be operative to restrict an operation of an injection molding assembly responsively to a determination that injection molding assembly requirements are not satisfied. Such restriction can be indirect. For example, registration (in some embodiments registration can be a prerequisite requirement for activation of an injection molding assembly) of an injection molding assembly configuration can be restricted responsively to a determination that injection molding assembly requirements are not met. System 2000 can also restrict operation of an injection molding assembly directly by restricting activation of an injection molding assembly responsively to a determination that injection molding assembly requirements are not satisfied.

As has been described an injection molding assembly configuration registration can be responsive, e.g., to a command to register activated by an operator using a user interface of system 2000 or responsively to a process run by system 2000. Referring to the flow diagram of FIG. 18 a registration can be commenced at block 5210, e.g., responsively to an operator command or process.

At block 5206 system 2000 can determine whether injection molding assembly requirements are satisfied. In one example of such determination with reference to the physical view of FIG. 7, a workstation computer of the current work cell, e.g., workstation computer 60 or other components of system 2000 can examine requirements defining resources of system 2000 (where a process is executed by component operative for communication other than injection molding machine 20, injection molding machine 20 can include a software interface allowing external component to determine its state). For example, a workstation computer of the current work cell, e.g., workstation computer 60 or other components of system 2000 operative for communication can query component specification table 306, which as has been described can include injection molding assembly requirements in an Associated Component Requirements column as is indicated by table 306 described with reference to FIG. 12. Such requirements for a certain component can include, e.g., ratings required of components that can be associated to the certain component. For example if a row of data of table 306 is for the certain mold identified by the identifier MLD_7842, the data of the Associated Component Requirements column for that row entry, conveniently recorded in array form can include, e.g., the capacity or other ratings requirements for an injection molding machine which can be associated to the mold, a dryer to be associated to the mold, a chiller to be associated to the mold and/or a robot to be associated to the mold. Other components can have associated component requirements recorded in the Associated Component Requirements column.

System 2000 can be operative so that when registration is commenced, a workstation computer of a current work cell or another component of system 2000 operative for communication can query the Associated Component Requirements column of table 306 for associated component requirements for each component of the injection molding assembly for which registration is commenced. Further at block 5206, the querying device can then query the Ratings column of table 306 for each component for which registration is commenced and compare the returned requirements to the returned ratings.

Requirements defining resources of system 2000 can also include a global requirements list. Further at block 5206 the querying device can compare returned rating information with a global requirements list, conveniently stored at server 200. A global requirements list can store global requirements for injection molding assemblies, e.g., certain relationships between ratings of various components of an injection molding assembly. If system 2000 determines that requirements are satisfied, registration can be completed at block 5212. If system 2000 determines that requirement are not satisfied, registration can be restricted at block 5208. System 2000 can be operative so that in place of or accompanying the restriction of registration at block 5208, there is presented an indication indicating to an operator that the requirements have not been satisfied. Such indication in one example can take the form of a message displayed in area 5202, e.g., REGISTRATION DENIED, CONFIGURATION INVALID.

In some embodiments system 2000 can be operative so that a cycle of an injection molding production run for execution by a CPU of injection molding machine 20 can be permitted to be executed without a current injection molding assembly configuration of a current work cell being registered as an operational injection molding assembly. In such embodiments system 2000 can be operative so that a cycle of an injection molding production run can be restricted responsively to a determination that requirements defining resources of system 2000 indicate that requirements are not satisfied. An example system 2000 operative to restrict running of an injection molding process responsively to an examination of requirements defining resources is described with reference to the flow diagram of FIG. 19. At block 5220 a cycle of an injection molding production run can be commenced, e.g., by an operator actuation of production run cycle start actuator 4104 (FIG. 7) of an injection molding machine of a current work cell.

At block 5222 system 2000 can determine whether injection molding assembly requirements are satisfied. In one example of such determination with reference to the physical view of FIG. 7, a workstation computer of the current work cell, e.g., workstation computer 60 or other component of system 2000 operative for communication, e.g., injection molding machine 20 operative to sense the actuation of actuator 4104 can examine requirements defining resources of system 2000. For examination of requirements defining resources of system 2000, a workstation computer of the current work cell, e.g., workstation computer 60 or other component of system 2000 can query component specification table 306 as well as a global requirements list conveniently recorded at server 200. As has been described with reference to FIG. 17, component specification table 306 can include injection molding assembly requirements in an Associated Component Requirements column. Associated component requirements for a certain component can include, e.g., ratings required of components that can be associated to the certain component. For example if a row of data of table 306 is for the certain mold identified by the identifier MLD_7842, the data of the Associated Component Requirements column for that row entry, conveniently recorded in array form can include, e.g., the capacity or other ratings requirements for an injection molding machine which can be associated to the mold, a dryer to be associated to the mold, a chiller to be associated to the mold and/or a robot to be associated to the mold. Components having component types other than molds can have associated component requirements recorded in the Associated Component Requirements column.

System 2000 can be operative so that responsively to a cycle of a production run being activated, a workstation computer of a current work cell or another component of system 2000 operative for communication can query the Associated Component Requirements column of table 306 for associated component requirements for each component of the injection molding assembly for which registration is commenced. Further at block 5206, the querying device can then query the Ratings column of table 306 for each component for which registration is commenced and compare the returned requirements to the returned ratings as indicated.

Requirements defining resources of system 2000 can also include a global requirements list. Further at block 5206 the querying device can compare returned rating information with a global requirements list, conveniently stored at server 200. A global requirements list can store global requirements for injection molding assemblies, e.g., certain relationships between ratings of various components of an injection molding assembly. If system 2000 determines that requirements are satisfied, registration can be completed at block 5212. If system 2000 determines that requirement are not satisfied, registration can be restricted at block 5208. System 2000 can be operative so that in place of or accompanying the restriction of registration at block 5208, there is presented an indication indicating to an operator that the requirements have not been satisfied. Such indication in one example can take the form of a message displayed in area 5202, e.g., PROCESS RESTRICTED, CONFIGURATION INVALID. For restricting of an injection molding process at block 5226, a communication to restrict operation can be transmitted to each injection molding assembly component within a current work cell or subset of the components. It will be recalled that system 2000 can be operative to determine identification information for injection molding assembly components within a current work cell for purposes, e.g., of displaying information identifying the components in area 5022 of interface configuration 5002, or configuration 5004, and for purposes of recording information identifying the components in database 2000. System 2000 in another aspect can maintain a list correlating identifying information for various components with port addresses, OSI Layer 2, or OSI Layer 3 addresses for each component, allowing addressing for transmission to any select one of the identified components. Accordingly, utilizing identifying information system, e.g., with use of certain component operative for communication such as workstation computer 60 or another component operative for communication can selectively transmit communications to select components within a current work cell to restrict activation of the components. In one embodiment, one or more injection molding assembly components within a work cell can be responsive to an inhibit command. On receipt of an inhibit command, e.g., from workstation computer 60 or injection molding machine 20, activation of injection molding assembly components within a current work cell can be restricted. In a variation of the process described with reference to the flow diagrams of FIG. 19, blocks 5222 and 5226 can be executed prior to activation of a cycle of a production run, e.g., prior to a time that a cycle of a production run is activated in satisfaction of block 5220, e.g., by actuation of an actuator, e.g., actuator 4104.

Examples will now be set forth detailing information that can be recorded in system 2000 for which can be utilized for restricting operation of an injection molding assembly.

Figure 18:
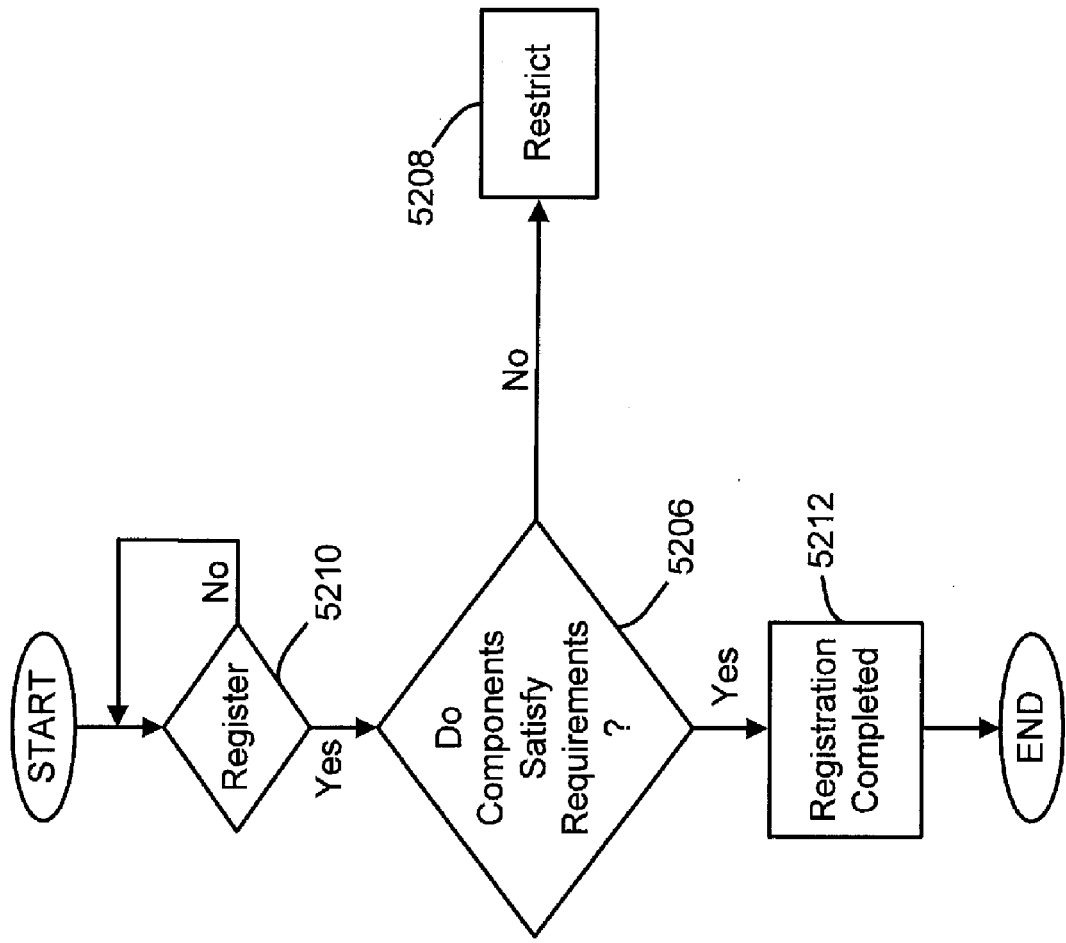
FIG. 18 is a flow diagram illustrating a process that can restrict registration of an injection molding assembly configuration.
Figure 19:
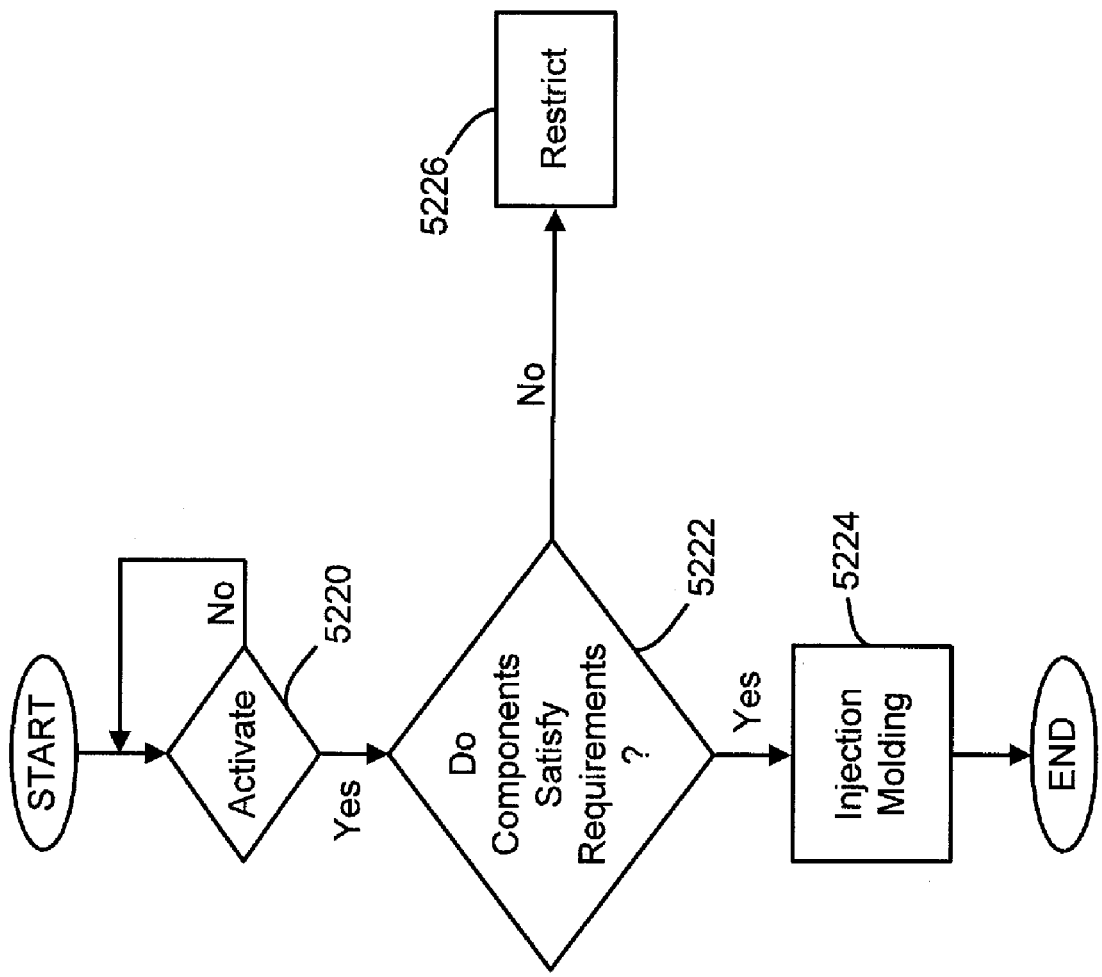
FIG. 19 is a flow diagram of a process that can restrict a cycle of an injection molding assembly production run.

In one embodiment of system 2000 referring to an example where a mold identified by the identifier MLD_7842, and a robot identified by the identifier ROB_A_03_022 are designated for use in combination in an injection molding assembly with reference again to Table 306 as set forth in FIG. 12 information recorded in the Associated Component Requirements column of table 306 may include information defining process requirements. Such process requirements may include e.g., the weight of a finished article produced by a mold, e.g., a mold identified by mold MLD_7842. In such a case a robot e.g., ROB_A_03_022 may be designated for use in combination (e.g., by a registration attempt, an activation of an injection molding assembly utilizing the components) with mold MLD_7842 may have a rated lift capacity greater than, less than, or equal to the weight of the finished article produced by mold MLD_7842. A computer of system 2000 (e.g., workstation computer 60, workstation computer 70, an injection molding assembly component where CPU or controller equipped) may query the ratings of ROB_A_03_022 in table 306 of database 300 and determine if the rated lifting capacity of the robot matches the requirements of the mold. System 2000 may make such a determination as illustrated in FIG. 18, e.g., upon registration of an injection molding assembly comprising MLD_7842 and robot ROB_A_03_022 or as illustrated in FIG. 19, e.g., upon activation of the assembly.

In another embodiment of system 2000 referring to an example where mold MLD_7842, robot ROB_A_03_022 and a chiller CHI_T_14_064 are designated for use in combination in an injection molding assembly, information recorded in the Associated Component Requirements column of table 306 may include information reflecting the cooling requirements of the mold MLD_7842. In such a case a chiller identified by the identifier CHI_T_14_064 associated with the mold may have a cooling capacity greater than, less than, or equal to the cooling requirement of the mold. System 2000 can be operative to a computer of system 2000 and may query the ratings column for chiller CHI_T_14_064 in table 306 of database 300 and determine if the rated cooling capacity of the chiller matches the requirements of the mold. System 2000 may make such a determination upon registration and/or activation of an assembly comprising mold MLD_7842 and chiller CHI_T_14_064, e.g., the assembly comprising MLD_7842, CHI_T_14_064, and ROB_A_03_022, wherein system 2000 may determine if the rated lifting capacity of robot ROB_A_03_022 and the cooling capacity of chiller CHI_T_14_064 meet the requirements of mold MLD-78-42. System 2000 may make such a determination as illustrated in FIG. 18 e.g., upon registration of an injection molding assembly including MLD_7842, chiller CHI_T_14_064 and robot ROB_A_03_022 or as illustrated in FIG. 19, e.g., upon activation of the assembly.

In another embodiment of system 2000 referring to the example where mold MLD_7842, robot ROB_A_03_022, and a chiller CHI_T_14_064, and a dryer DRY_G_06_016 are designated for use in combination in an injection molding assembly information recorded in the Associated Component Requirements column of table 306 may include information defining the drying requirements of the mold MLD_7842. In such a case a dryer DRY_G_06_016 associated with the mold may have a drying capacity greater than, less than, or equal to the drying requirement of the mold. System 2000 may query the ratings column for dryer DRY_G_06_016 in table 306 of database 300 and determine if the rated drying capacity of the dryer matches the requirements of the mold. System 2000 may make such a determination upon registration (flow diagram of FIG. 18) and/or activation (flow diagram of FIG. 19) of an assembly comprising mold MLD_7842 and dryer DRY_G_06_016, e.g., the assembly comprising MLD_7842, DRY_G_06_016, CHI_T_14_064, and ROB_A_03_022, wherein system 2000 may determine if the rated drying capacity of dryer DRY_G_06_016, the lifting capacity of robot ROB_A_03_022 and the cooling capacity of chiller CHI_T_14_064 meet the requirements of mold MLD_7842. System 2000 may make such a determination as illustrated in FIG. 18, e.g., upon registration of a injection molding assembly including MLD_7842, dryer DRY_G_06_016, chiller CHI_T_14_064 and robot ROB_A_03_ or as illustrated in FIG. 19, e.g., upon activation of the assembly.

In another embodiment of system 2000, referring to an example where mold MLD_7842, a robot ROB_A_03_022, a chiller CHI_T_14_064, a dryer DRY_G_06_016 and an injection molding machine IMM_K_01_001 are designated (e.g., by registration, activation) for use in combination in an injection molding assembly information recorded in the Associated Component Requirements column of table 306 may include information reflecting one or more process requirements of the mold MLD_7842. Said process requirements may comprise a clamping pressure e.g., the clamping pressure applied to the mold by the mold interface clamp of injection molding machine IMM_K_01_001, and the pressure, temperature, volume and type of molding material injected into the mold MLD_7842 by the injection unit of injection molding machine IMM_K_01_001. In such a case the injection molding machine IMM_K_01_001 associated with the mold MLD_7842 may have a clamping pressure greater than, less than, or equal to the a clamping pressure requirement of the mold. Further to this embodiment, mold MLD_7842 may require that the molding material be of a same or a different type than the one or more materials rated for injection molding machine IMM_K_01_001, and/or mold MLD_7842 may require an injection pressure, temperature, and/or volume that are respectively greater than, less than, or equal to the rated injection pressure, temperature, and/or volume of the injection unit of machine IMM_K_01_001. System 2000 may query the ratings column for injection molding machine IMM_K_01_001 in table 306 of database 300 and determine if the ratings of the machine match the respective requirements of the mold. System 2000 may make such a determination upon registration and/or activation of an assembly including mold MLD_7842 and machine IMM_K_01_001, e.g., the assembly comprising mold MLD_7842, chiller CHI_T_14_064, robot ROB_A_03_022, dryer DRY_G_06_016 and machine IMM_K_01_001 wherein system 2000 may determine if the rated lifting capacity of robot ROB_A_03_022, the cooling capacity of chiller CHI_T_14_064, the drying capacity of dryer DRY_G_06_016 and the ratings of machine IMM_K_01_001 meet the respective requirements of mold MLD_7842. System 2000 may make such a determination as illustrated in FIG. 18, e.g., upon registration of a injection molding assembly including MLD_7842, chiller CHI_T_14_064, robot ROB_A_03_022, and machine IMM_K_01_001 or as illustrated in FIG. 19, e.g., upon activation of the assembly.

Further to an embodiment of system 2000 referring to an example where injection molding mold MLD_7842, chiller CHI_T_14_064, robot ROB_A_03_022, dryer DRY_G_06_016 and injection molding machine IMM_K_01_001 as designated for use in combination, information recorded in the Associated Component Requirements column of table 306 may further include information designating one or more requirements of assembly components other than mold MLD_7842. In such an embodiment of system 2000 information recorded in the Associated Components Requirements column of table 306 may define required components and/or required ratings of components associated with the use of one or more components used in an injection molding assembly. Said requirements may, for example, comprise requirements of the chiller CHI_T_14_064, robot ROB_A_03_022, dryer DRY_G_06_016 and/or machine IMM_K_01_001, e.g., a drying capacity requirement associated with the chiller CHI_T_14_064 and/or a robot requirement associated with machine IMM_K_01_001. Process requirements of assembly components of system 2000, including components other than mold MLD_7842, may be designated by information available to system 2000 in table 306 of database 300, which information can be conveniently recorded in server 200 conveniently stored elsewhere, e.g., in memory, e.g., memory 3004, 3024, and/or memory 3034 co-located with mold MLD_7842 and may include information that designates rating requirements and/or other information e.g., information designating the required components used in association with mold MLD_7842 to conduct an injection molding process. System 2000 may access information available to system 2000 in table 306 of database 300 to determine if the requirements of each component in an assembly e.g., an assembly comprising mold MLD_7842, chiller CHI_T_14_064, robot ROB_A_03_022, dryer DRY_G_06_016 and machine IMM_K_01_001 of system 2000 are met. System 2000 may make such a determination as shown in FIG. 18, e.g., upon registration of the assembly and/or as shown in FIG. 19, e.g., upon activation of the assembly.

Further to an embodiment of system 2000 with reference to an example where mold MLD_7842, chiller CHI_T_14_064, robot ROB_A_03_022, dryer DRY_G_06_016 and machine IMM_K_01_001 are designated for use in combination, information available to system 2000 in table 306 of database 300 may further include information other than information defining required components and/or required component ratings. Such information may include information determining one or more actions to be taken in response to a determination by system 2000 at block 5206 or block 5222 that associate component requirements are not satisfied, e.g., information defining the form of restriction at block 5208 or block 5226 executed by system 2000 when one or more components do not meet requirements (including e.g., a form of a message presented by user interface configuration 5004 in area 5202). Such information may be logically associated within table 306 with a given key unique to a rating requirement and/or a component type e.g., in an associative data structure or linked list, where the data structure format may be text based, e.g.:

```
<requirements robotRequired="Yes" chillerRequired="Yes"
liftingCapacity="20" coolingCapacity="30" robotOver=
"allow|warn:Robot Capacity Greater Than Requirements"
robotUnder="restrict|warn:Robot Capacity Less Than Requirements"
chillerOver="allow|warn:Chiller Capacity Greater Than
Requirements" chillerUnder=" restrict|warn:Chiller Capacity Greater
Than Requirements" />
```

Alternatively, the data structure may be simply a combination of values in one or more columns of a row of table 306 as depicted in FIG. 12. In such a case, one or more rating requirements, which can be expressed in an array may be less than or greater than the associated component requirement, e.g., the lifting capacity of robot ROB_A_03_022 is 10 whereas the required lifting capacity associated with mold MLD_7842 is 20 and/or the cooling capacity of chiller CHI_T_14_064 is 50 whereas the required chilling capacity of mold MLD_7842 is 30. In such a case where the information available to system 2000 includes information defining one or more actions to be taken in response to determination 5206, system 2000 may be operative to take one or more actions responsively to the particular nature of the determination.

In an embodiment of system 2000 where the information available to system 2000 includes information defining one or more actions to be taken in response to determination 5206, an attempt to register an assembly comprising mold MLD_7842 and a robot may be denied where the mold MLD_7842 requires a lifting capacity of 20 and an attempt is made to register an assembly comprising mold MLD_7842 and a robot with a lifting capacity of 10. In such a case system 2000 may deny registration, restrict the assembly from operation and show a warning in area 5202 in user interface configuration 5004 including details, e.g., detailed information stating the nature of the rating insufficiency and identifying information and/or utilizing information of location logging table 304 location information designated the identity and/or location of available robots with lifting capacities greater than or equal to the associated requirement of mold MLD_7842. In another example where a mold MLD_7842 requires a chiller with a chilling capacity of 30 and an attempt is made to activate an assembly comprising mold MLD_7842 and a chiller with a chilling capacity of 50, system 2000 may allow activation of the assembly if all other necessary requirements are met and show a warning in user interface 4004 including details as to the nature of the over rating, i.e., excess capacity of the chiller and/or identifying information and/or location information reflecting the identity and/or location of available chillers with chilling capacities equal to the associated requirement of mold MLD_7842.

There is set forth herein a system for use in performance of injection molding operations, the system comprising an injection molding assembly comprising first and second injection molding assembly components, the first injection molding assembly component being selected from the group consisting of an injection molding machine, a mold, a dryer, chiller, and a robot, the second injection molding assembly component being of a different component type than the first injection molding assembly component and being selected from the group consisting of an injection molding machine, a mold, a dryer, chiller, and a robot; a computer implemented database 300 wherein the system is operative so that the computer implemented database records associated component requirement information for the first injection molding assembly component, the associated component requirement information defining a requirement for a component to be used in combination with the first injection molding assembly component, the computer implemented database 300 further recording for the second injection molding assembly component rating information for the second injection molding assembly component; wherein the injection molding assembly is operative to restrict operation of the injection molding assembly responsively to a comparison between the associated component requirement information and the rating information. There is also set forth herein a system for use in performance of injection molding operations, said system comprising a first injection molding assembly component being of a type selected from the group consisting of a mold, and injection molding machine, a dryer, a chiller, and robot; a computer implemented database 300 wherein the system is operative so that the computer implemented database records associated component requirement information for the injection molding assembly component, the associated component requirement information defining a requirement for a second injection molding assembly component that can be designated for use in association with the first injection molding assembly component, the second injection molding assembly component being of a type different than the first injection molding assembly component; and wherein the system is operative to utilize the computer implemented database for restricting operation of an injection molding assembly configuration including the first injection molding assembly component and the second injection molding assembly component.

Figure 20:
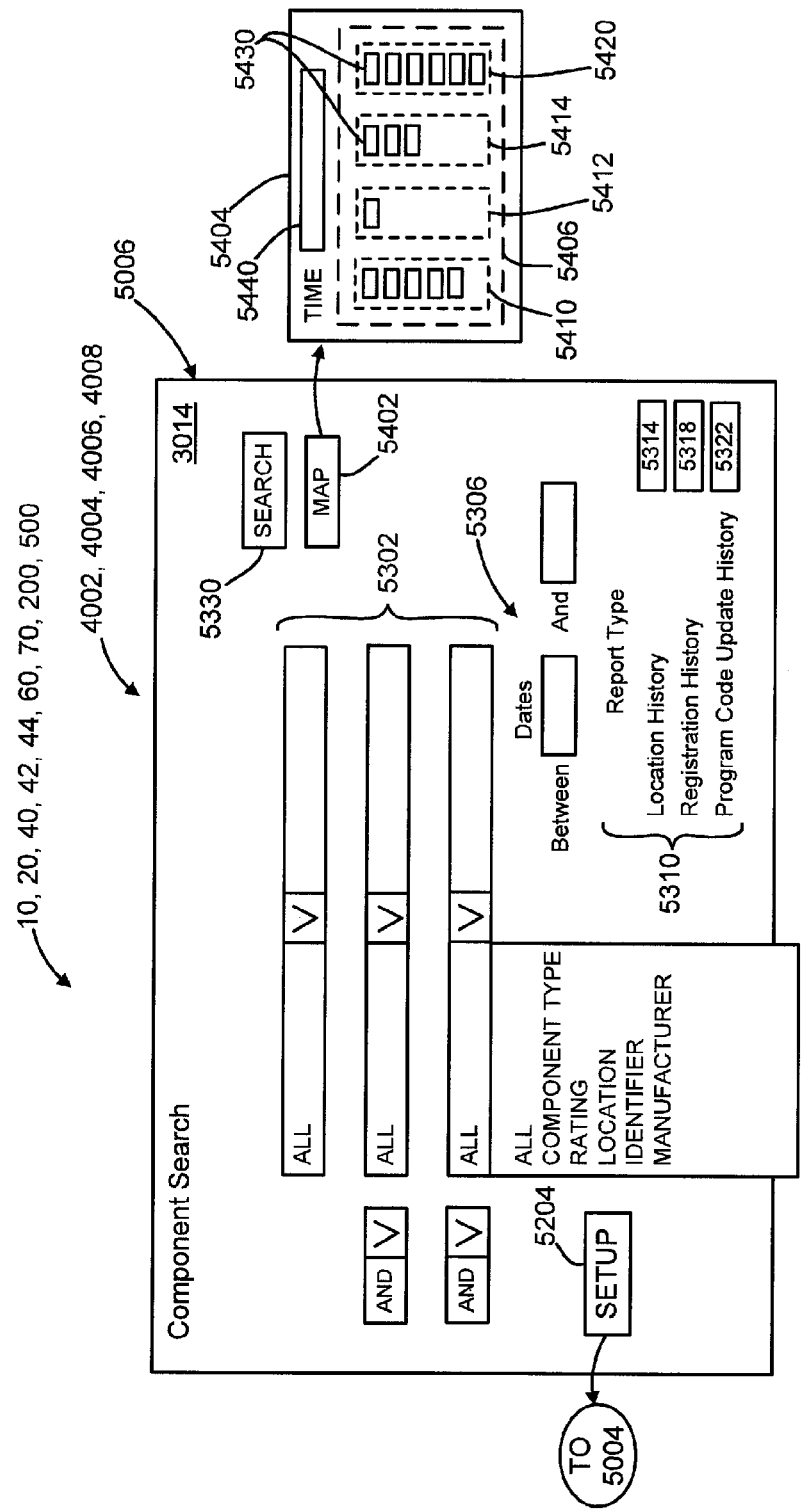
FIG. 20 is an exemplary user interface configuration for performance of component research.

Configured as described system 2000 can be utilized for performance of detailed historical research respecting components of system 2000 over time. An exemplary user interface configuration 5006 for performance of general historical research for components of system 2000 is shown in FIG. 20. User interface configuration 5006 can be incorporated in or be in association with any component of system 2000 operative for communication including mold 10 having user interface 4002, injection molding machine 20 having user interface 4004, dryer 40, chiller 42, robot 44, personal computer workstation computer 60 having user interface 4006 mobile hand-held workstation computer 70 having user interface 4008, server 200 and server 500. Regarding user interface configuration 5006, system 2000 can be operative so that configuration 5006 can be made active by actuation of displayed button actuator 5206 of configuration 5004 as shown in FIG. 16. User interface configuration 5004 can be made active by actuation of displayed button actuator 5204 as described with reference to configuration 5006 (FIG. 20). Actuator 5206 can also be incorporated as part of window 5502 in one embodiment. System 2000 can be operative so that when there is a transition from configuration 5004 to configuration 5006, component information for input into configuration 5006 is automatically populated with last viewed component information viewed with use of configuration 5004. System 2000 can be operative so that there is a display of information on a display 3014 in accordance with configuration 5004 or 5006, the elements of configuration 5004 or configuration 5006 can be commonly displayed on a common display 3014 as depicted in the views and further so that the elements can be simultaneously displayed. Further, system 2000 can be operative so that configuration 5004 and configuration 5006 are simultaneously active, e.g., provided with separate windows, and further so that the elements of system 2000 can be operative so configurations 5004 and 5006 are commonly displayed in a common display 3014 of a specified component 10, 20, 40, 42, 44, 60, 70, 200, 500.

Using area 5302 of user interface configuration 5006 as depicted in FIG. 20, an operator can designate fields and key word terms for use in querying of database 300, for return of information respecting a specified component or sample of components. Using area 5306 an operator can designate a historical time frame for a search. Using area 5310 an operator can designate a report time. By selection of a location history report type using area 5314, a report can be displayed on display 3014 indicating the migration of a specified component or component sample throughout a designated historical period with associated time stamps. A location history report for output, e.g., by display on a display 3014 of a computer incorporating configuration 5006 can include the form as shown by table 304 of FIG. 10, sorted by component ID selectively showing the data for the specified component or sample. By selection of a registration history report type using area 5318, a report can be displayed on display 3014 indicating a history of registered injection molding assembly configurations for a specified historical period which included a specified component or component sample. A registration history report for output, e.g., by display on display 3014 of the computer on which configuration 5006 is incorporated can include the form as depicted in area 5016 depicted in configuration 5002, 5004, or by table 404 (FIG. 15) sorted by the specified component or component sample. By selection of programming data update history report type using area 5322, a report can be displayed on display 3014 indicating a history of software upgrades for a specified component or component sample during a designated historical time period. Where a programming data update history report type is displayed, several identifiers for a certain component can be displayed each corresponding to a different time. Such report for output, e.g., by display on a display 3014 of a computer incorporating configuration 5006 can have the form as shown by table 308 of FIG. 13, sorted by the specified component or component sample.

An output report of one of the noted report types can include identifiers for injection molding assembly components. As is noted with reference to the highlighted report examples a report can include a plurality of identifiers for a certain component each corresponding to a different time. The various identifiers can be configured as hot buttons such that a window 5502 displaying specification data and programming data that can be displayed when an identifier is actuated. Accordingly, user interface configuration 5006 with configurations 5002, 5004 can be configured to allow access to first programming data for a component and second programming data for a component, the first programming data corresponding to a first time, the second programming data corresponding to a second time. Advantages result from the noted types of reports being displayed on a display 3014 of a component operative for communication provided by a mobile workstation computer such as workstation computer 60 or workstation computer 70. For example, the device displaying the report can easily be moved by an operator to a location adjacent and in proximity to within an injection molding assembly component to which the report relates. Accordingly, an operator can interactively review historical data regarding a component while servicing a component. There is set forth herein a system for use in performance of injection molding operations, said system comprising a component selected from the group consisting of a mold, and injection molding machine, a dryer, a chiller, and robot; a computer implemented database wherein the system is operative so that the computer implemented database records one or more of (a) a record of past locations of the component; (b) a record of associations of the component in past operational injection molding assembly configurations; and (c) a record of programming data updates of the component; and a user interface, wherein the system is operative to output responsively to activation of a command activated using the user interface a report indicating information selected from the group consisting of (i) a history of locations of the component over time; (ii) past associations of the component in operational injection molding assembly configurations; and (iii) programming data updates of the component over time.

In another aspect, system 2000 can be operative to output, e.g., display on a display 3014 a map indicating a location of each injection molding assembly component of system 2000 at a current time or at any selected previous time. Referring again to user interface configuration 5006 as shown in FIG. 20, user interface configuration 5006 can include a map actuator 5402 which, when actuated, returns window 5404 for display on a display 3014. Window 5404 can display a facility map 5406. Facility map 5406 can include a plurality of work cell designators 5410, 5412, 5414, and a storage location identifier 5420. System 2000 can be operative so that window 5404 when in a default condition displays a current facility map. Within work cell designators 5410, 5412, 5414 of facility map 5406, there can be displayed identifiers 5430 for injection molding assembly components currently within work cells represented by the respective designators 5410, 5412, 5414, and within designator 5420 there can be displayed identifiers for injection molding assembly components currently within a facility storage location. Location information for a component of system 2000 can include a work cell or storage location identifier. System 2000 can also be operative so that location information for a component of system 2000 includes coordinate (x, y) data for the component. System 2000 can incorporate a wireless LAN implemented triangulation location determination subsystem. In one embodiment, facility map 5406 can be a high level schematic facility map in which work cells storage locations and components can be represented with designators 5410, 5412, 5414, 5420, 5430 but not according to their actual sizes or shapes. In a high level schematic facility map, a component's association to a particular work cell or storage location can be represented. For output of a high level schematic facility map, work cell identifiers and storage location identifiers can be utilized. System 2000 can also be operative so that a facility map 5406 can be a detailed facility map that represents work cells, storage locations, injection molding assembly components and other features of a facility according to their true sizes, shapes, and relative positions. System 2000 can utilize coordinate location information for display of a detailed facility map in which work cells, storage locations and injection molding assembly components therein are represented according to their true size, shape, and relative positions. In another aspect of facility map 5406, system 2000 can be operative to highlight (e.g., by display of its associated identifier 5430 in a different color format or with flashing) one or more selectively identified injection molding assembly component of system 2000. System 2000 can be operative so that the selectively identified one or more component can be the most recent one or more injecting molding assembly components selectively identified by query of database 300 based on information that can be input into area 5302 utilizing user interface configuration 5006.

Window 5404 can include area 5440 for designating a time. System 2000 can be operative so that an operator can designate a past time (including date) in area 5440. System 2000 can be operative so that when a certain past time is entered in area 5440, system 2000 can utilize time stamping information of database 300 to determine a location of each injection molding assembly component at the certain past time. System 2000 can update the component identifiers displayed in location designators 5410, 5412, 5414, 5420 so that an identifier for each component as of the certain past time is displayed in the appropriate designator 5410, 5412, 5414, 5420 of facility map 5406 indicating the location of the component as of the certain past time.

There is set forth herein a system for use in performance of injection molding operations, said system for use in a facility in which injection molding assembly components can be moved between work cells and a storage location, and in which injection molding assembly components can be associated to different combinations of associated injection molding assembly components to define different injection molding assembly configurations, wherein the system is operative to determine a current location of each of a plurality of injection molding assembly components, wherein the system is operative to output a facility map indicating a current location of each of the plurality of injection molding assembly components. There is also set forth herein a system wherein the system includes a computer implemented database 300 wherein the system is operative so that the system records information indicating a migration of the plurality of injection molding assembly components over time, and wherein the system is operative to output a facility map indicating a location of each of the plurality of injection molding assembly components at an operator designated time.

System 2000 can be operative to process data of database 300 for determining an output, e.g., an output of an indicator, e.g., an electronic display in numerous aspects not set forth elsewhere. For example, it has been mentioned that for registered injection molding assembly configurations, system 2000 can increment a counter for each completed cycle and can associate the counter to a registration identifier. Because the registration identifier can be associated to each of a plurality of injection molding assembly components, a cycle count can be established for several components even though an operative aspect of a single component may be monitored.

In one aspect, system 2000 can be operative to utilize cycle count information of database 300 for determining a maintenance schedule for one or more injection molding assembly components, including auxiliary injection molding assembly components. In one example, system 2000 can determine that a component is in need of maintenance if the number of cycles participated in by the component exceeds a threshold. System 2000 can determine a cycle count for a certain component by summing the cycles of each past registered configuration which the certain component has been a part. In one embodiment, system 2000 in performing such determinations can ignore cycles prior to a time of a last maintenance a record of which can be recorded in database 300. With a maintenance schedule determined, information related to the maintenance schedule can be output. Such information can be, e.g., a message indicating a time for a next maintenance action and type of action. System 2000 can be made operative to utilize database 300 for determining a maintenance schedule with use of a program application which is conveniently run by server 200.

In another aspect, system 2000 can be operative to process data of database 300 to determine an occurrence of an event responsively to which a personal message delivery subsystem can transmit a message. The predetermined facility event can be selected from the group consisting of an injection molding assembly component requiring maintenance, a mold being associated to an operational injection molding assembly configuration, and a mold being disassociated with an operational injection molding assembly configuration. The personal message delivery subsystem can be, e.g., an e-mail delivery service hosted by a server of server system 500. For determining a maintenance schedule, system 2000 can examine cycle count data of database 300. For determining an association of a component to an operational injection molding assembly configuration, system 2000 can examine, e.g., registration table 302 of database 300. For determining a transportation of a mold from a certain work cell, system 2000 can examine data of location logging table 304.

There is set forth herein a system for use in performance of injection molding operations, said system for use in a facility in which injection molding assembly components can be moved between work cells and a storage location, and in which an injection molding assembly components can be associated to different combinations of associated injection molding assembly components to define different injection molding assembly configurations, the system comprising a computer implemented database at least one of first data indicating a migration of injection molding assembly components over time, second data indicating operational injection molding assembly configurations, and third data indicating a number of production run cycles executed by operational injection molding assembly configurations; an indicator; wherein the system is operative to utilize one or more of the first data, second data and third data recorded in the computer implemented database for determining an output of the indicator.

It has been described that database 300 including numerous tables such as tables 302, 304, 306, 308 can be conveniently co-located at a location of central server 200 which can be in network communication and accessible with use of each component of system 2000 operative for communication. In another embodiment, contents of database 300 can be located at a memory of mold 10, e.g., one or more of memory 3004, memory 3024, and/or memory 3034. In one embodiment content of database 300 can be transmitted to a memory of mold 10 by way of replicating content of database 300 where database 300 is included at a central location such as in server 200. In another embodiment, a memory of mold 10 can be an original location of database 300 and content of database 300 can be transmitted to memory 3004 of mold 10 as part of an original reporting of database information to database 300. Thus, in one embodiment a memory physically and logically associated to mold 10 can store component information of components of past injection molding assembly configurations which the particular mold was a part of. Included in such information can be programming data for each of the various components within each of the various configurations, which as has been described, can be configurations designated as being operational within database 300. Also included in such information can be requirements information of component specification table 306, including information of Associated Component Requirements column therein. Providing content of database 300 within a memory of mold 10 provides certain advantages. For example, there is assured reliable network access to the information. In spite of widespread network failure of system 2000, components operative for communication within a particular work cell in which the mold is presently located may nevertheless access the information. Also, if and when the mold is transported to a new facility external to facility 1000 which is not in network communication with the components of facility 1000, the mold is furnished with robust history data which can be used by operators in setting up the mold at the new facility. An operator can download component programming data residing in mold 10 into components at the new facility for reprogramming thereof. In such an embodiment moving the mold from one facility to another essentially transfers data from one facility network to another in batch mode. A method can be carried out for use in performance of injection molding operations, the method comprising the steps of associating a certain mold with a first injection molding assembly, the first injection molding assembly having a first injection molding machine and first auxiliary component of a first type, the mold having a physically associated memory, the first auxiliary component of the first type having certain programming data; transmitting the certain programming data of the first auxiliary component into the physically associated memory of the certain mold; associating the certain mold into a second injection molding assembly, the second injection molding assembly being defined by the certain mold, an injection molding machine and a second auxiliary component of the first type; transmitting the certain programming data from the physically associated memory of the certain mold; receiving the certain programming data at the second auxiliary component; and operating the second injection molding assembly component so that the second auxiliary component is run in accordance with the certain programming data. There is set forth herein a system for use in performance of injection molding operations, the system comprising a mold; a computer implemented database records associated component requirement information for the mold, the associated component requirement information defining a requirement for an injection molding assembly component that can be designated for use in association with the mold, the injection molding assembly component being of a type selected from the group consisting of an injection molding machine, dryer, chiller, and robot; wherein the system is operative to utilize the computer implemented database for restricting operation of an injection molding assembly configuration including the mold and the injection molding assembly component; and wherein the associated component requirement information includes information recorded on a memory physically associated to the mold.

Regarding injection molding machine 20, injection molding machine 20 can include a hopper, an injection unit, a mold interface clamp, and a controller. In one embodiment of injection molding machine 20, a hopper may store and dispense molding material, an injection unit may receive, break down, melt, and inject molding material into a mold, a mold interface clamp may mount, open and close a mold, and a controller may regulate one or more operations of the machine. Injection molding machine 20 in one embodiment can be operative to regulate the pressure, temperature and volume of molding material injected by the injection unit into a mold 10 mounted to the mold interface clamp. Furthermore, injection molding machine 20 can be operative to regulate the timing of opening and closing of the mold 10 mounted to the mold interface clamp. Injection molding machine 20 can also be operative to regulate an open position of mold and can be operative to require a motion profile which can include velocity and acceleration. In addition, injection molding machine 20 can be operative to control the closing pressure applied to the mold by the mold interface clamp in the closed state and the rate molding material is injected into the closed mold by the injection unit in the closed state. Examples of commercially available injection molding machines include the VICTORY series of machines manufactured by Engel, e.g., Victory SPEX 50 and e-Victory 120 machines.

Regarding mold 10, mold 10 can include one or more cavity, one or more sprue, one or more vents, one or more ejection pins, one or more hot or cold runners comprising a main channel, one or more nozzles, and optionally one or more branch channels, and optionally a controller. In one embodiment of mold 10 the sprue may receive molding material from an injection unit, a channel may convey the molten molding material from the sprue to the cavity, the cavity may receive the molding material in the form of a fitted part, and one or more vents may permit air within the cavity to escape as the molding material is received by the cavity. The channel conveying the molten molding material from the sprue to the cavity may contain one or more gates for controlling material flow and one or more branches for conducting material to one or more parts of the cavity. Furthermore each channel may be heated, i.e., a hot runner or unheated i.e., a cold runner. The controller may also be operative to maintain a temperature in the main channel and/or one or more branch channels that is/are a hot runner. Hot runners for use with molds are available from Mold-Masters Limited, 233 Armstrong Avenue, Georgetown, ON, Canada, L7G 4X5. Mold 10 may be further configured to conduct a coolant into one or more chambers or pipes with one or more openings for receiving or distributing a coolant in thermal contact with the cavity. Mold 10 in one embodiment can be operative to receive molding material from an injection unit, and conduct such material to a cavity in the form of a fitted part. Mold 10 may be further operative control the flow and temperature of said molding material as it is conducted from the sprue to the one or more portions of the cavity and to cool the material as it is received and formed within the cavity.

Regarding dryer 40, dryer 40 can include a hopper, a canister, a heater, a blower, a vacuum, and one or more valves. In one embodiment of dryer 40 the hopper may receive injection molding material and convey such material into the canister where the material is heated and optionally exposed to a vacuum to remove moisture associated with the material before the material exits the system into the hopper or injection unit of an associated injection molding machine. In another embodiment the heater heats air, removing moisture from the air and subsequently blows the air into the hopper thus removing moisture associated with molding material in the hopper. In another embodiment of dryer 40, dryer 40 may be configured to remove condensed moisture from the mold or to remove moisture from the air in the vicinity of the mold. Dryer 40 in one embodiment can be operative to remove moisture from molding material prior to the material entering the injection unit and to remove moisture from the air in the vicinity of the mold. Examples of commercially available dryers for use with system 2000 are the model LPD-30 manufactured by Maguire Products, Inc. of Aston, Pa. and the model APD-4 manufactured by DRI-AIR Industries, Inc. of East Windsor, Conn.

Regarding chiller 42, chiller 42 can include one or more nozzles, a heat exchanger, and a pump. In one embodiment of chiller 42 one or more nozzles may be connected to a mold forming a circuit through which a coolant, e.g., air, water. Steam is pumped through the mold and heat transferred from the mold cavity to the coolant is removed from the mold. Chiller 42 may be portable or stationary and may serve one or more molds. In one embodiment of chiller 42 coolant entering the chiller is passed through a heat exchanger in thermal contact with an external environment, e.g., a bath at a lower temperature. Chiller 42 may be operative to compress the coolant prior to passing it through the heat exchanger. Chiller 42 in one embodiment can be operative to remove heat from one or more mold cavities at a controlled rate. Examples of commercially available chillers for use with system 2000 are model ACP-3 Air Cooled Portable Chiller manufactured by 1st Choice Portable Chillers, Inc. of Markham, Ontario and model SIC-WC-3 Water Cooled Portable Chiller manufactured by Shini USA of Willoughby, Ohio.

Regarding robot 44, robot 44 can include a base, an arm comprising one or more linkages, one or more actuators, and an end-of-arm tool. In one embodiment of Robot 44 each linkage may include one or more joints connected together by intervening links. Each joint may include an actuator, which may be a servo, motor or fluid driven piston operative to rotate the associated links relative to the joint axis. In one embodiment of Robot 44 the rotation of each joint may be controlled continuously or at intervals by a robot controller. Robot 44 in one embodiment can be operative to position the end-of-arm tool at a series of particular x,y,z coordinates relative to the base at particular intervals of time or in response to particular signals and to perform one or more functions of the end-of-arm tool at each position at particular times and in response to particular signals. Robot 44 in one embodiment may be operative to remove molded items from a mold 10 to another location, e.g., a conveyer, or bin. Examples of commercially available robots for use with system 2000 are the TXplastics40 model manufactured by Staubli Multi-Contact USA of Santa Rosa, Calif. and the VIPER AS 211/214 model manufactured by Ventax Robot Inc., of Ayr, Ontario.

Figure 21:
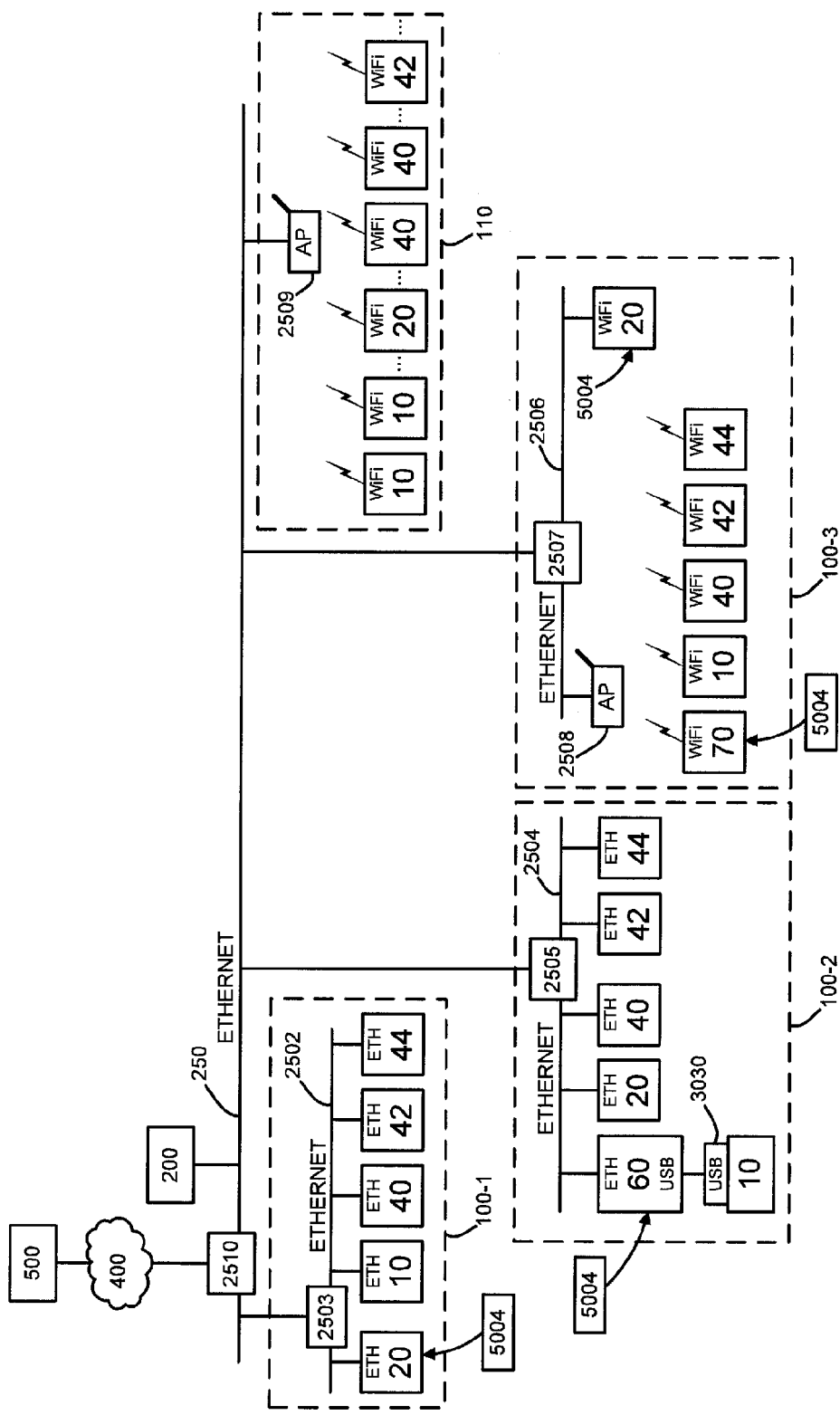
FIG. 21 is a schematic diagram of a system for use in performance of injection molding operations illustrating network hardware thereof in one exemplary embodiment.

Referring to FIG. 21, there is shown a schematic diagram of system 2000 illustrating network hardware thereof in one exemplary embodiment. As illustrated in the example of FIG. 21, communication hardware and communication protocols need not be established similarly between work cells 100-1, 100-2, 100-3. In the example of FIG. 21, a discrete Ethernet LAN each including a respective Ethernet bus 2502, 2504, 2506, is associated to each respective work cell 100-1, 100-2, 100-3. The respective LANs can be logically separated from facility Ethernet backbone 250 with use of respective routers 2503, 2505, 2507. Router 2510 connected to facility Ethernet backbone 250 can route data packets between network 400 and backbone 250. Further referring to the example of FIG. 21, discrete wireless IEEE 802.11 LANs having respective access points 2508, 2509 are associated to work cell 100-3 and storage location 110. For work cells 100-1, 100-2 and storage location 110, a location of an injection molding assembly component can be determined based on its OSI Layer 2 network association to the single LAN associated to the work cell or storage location. Since both of an Ethernet LAN and wireless LAN are associated to work cell 100-3, a location of a component in work cell 100-3 can be based on its association with either of the Ethernet LAN or wireless LAN associated to the work cell 100-3. Regarding work cell 100-1, each of the injection molding assembly components 10, 20, 40, 42, 44 are shown as being wireline connected to Ethernet bus 2502. Regarding injection molding machine 20 within work cell 100-1, injection molding machine 20 of work cell 100-1 incorporates user interface configuration 5004. Routers 2503, 2505, 2507, 2510 and access points 2508, 2509 can be configured to include the elements within border 3000 described with reference to FIG. 4.

Regarding work cell 100-2, injection molding assembly components 10, 40, 42, 44 and workstation computer 60, (incorporating user interface configuration 5004) are wireline connected to Ethernet bus 2504. Mold 10 of work cell 100-2 is not directly connected to Ethernet bus 2504, but rather includes memory drive unit 3030 provided in the specific example by a USB memory drive that can be coupled to a USB interface of workstation computer 60 by way of a USB cable. Memory drive unit 3030 can be included in a modular housing attached to a housing of mold 10 and can be physically associated to mold 10 and can be regarded as being included as part of mold 10. By such arrangement workstation computer 60 can be in communication with mold 10 of work cell 100-2 by way of a system hardware communication protocol.

Regarding work cell 100-3, injection molding assembly components 10, 20, 40, 42, 44 as well as workstation computer 70 can be in communication with IEEE 802.11 access point 2508 and injection molding assembly component 20 can be wireline connected to Ethernet bus 2506. User interface configuration 5004 is shown as being incorporated in mold 10 and workstation computer 70. For resolution of a location of an injection molding assembly component within work cell 100-3, system 2000 can employ triangulation based location determination technologies to determine locations of system components located in work cell 100-3. Determined location information can be in the form of coordinate values which can be resolved into a work cell or storage location identifiers. Triangulation based location determination subsystems are available for use in IEEE 802.11 networks. System 2000 can incorporate, e.g., The Intel Precision Location Technology (PLT) available from Intel Corporation or the Ehahau Positioning Engine (EPE) available from Ehahau, Inc. Also, for providing location information, components of system 2000 can include RFID tags encoding component identifiers, and a computer within or proximate work cell 100-3, e.g., access point 2508 or router 2507 can have the elements as shown within dashed border 3000 of FIG. 4 can include an RFID reader unit 3010 (FIG. 4) with sensitivity to discriminate components that have been introduced into work cell 100-3.

Regarding storage location 110, injection molding assembly components 10, 10, 20, 40, 40, 42 within storage location 110 can be in communication with IEEE 802.11 access point. For resolution of a location of an injection molding assembly component within storage location 110, system 2000 can employ a wireless LAN implemented triangulation based location detection subsystem for determination of locations of components within storage location 110. Also, for example, components of system 2000 can include RFID tags encoding component identifiers, and a computer within or proximate a storage location 110, e.g., access point 2509 can include an RFID reader unit 3010 (FIG. 4) with sensitivity to discriminate components that have been introduced into storage location 110. In one embodiment, location determination can be carried out with use of RFID tag reading (an RFID reader can be disposed in or proximate a designated location, and a component's presence in the designated location can be determined based on its capacity to be read) without the determination also being based on an association to an OSI Layer 2 Network.

A small sample of systems methods and apparatus that are described herein is as follows:

A1. A system for use in performance of injection molding operations, the system comprising:

a mold that can be associated with different components to define a plurality of different injection molding assembly configurations, each of the plurality of different injection molding configurations being defined by an association of components with the mold at a given time;

a computer implemented database, wherein the system is operative so that the computer implemented database records information respecting one or more operational injection molding assembly configuration that includes the mold; and wherein the system is operative to display information respecting a past operational injection molding assembly configuration that includes the mold.

A2. The system of A1, wherein the system is operative to determine information respecting a current injection molding assembly configuration that is partially defined by the mold, and wherein the system is operative to simultaneously display with said information respecting a past operational injection molding assembly information respecting a current injection molding assembly configuration.

A3. The system of A1, wherein the system is operative to discriminate whether the current injection molding assembly configuration matches a certain past operational injection molding assembly configuration, and wherein the system is further operative to display a message responsively to the discrimination.

A4. The system of A1, wherein the system is operative so that information respecting an operational injection molding assembly configuration is recorded responsively to a monitoring process in which a cycle of a production run is monitored.

A5. The system of A1, wherein the system includes a mobile workstation computer for display of the information respecting the past injection molding assembly configuration.

A6. The system of A1, wherein the displayed information respecting the past operational injection molding assembly configuration is in the form of displayed identifiers for components of the past injection molding assembly configuration.

A7. The system of A1, wherein the information recorded respecting operational injection molding assembly configurations includes programming data for a plurality of components of at least one past operational injection molding assembly configuration.

A8. The system of A1, wherein the information recorded respecting operational injection molding assembly configurations includes component identifiers for a plurality of components of at least one past operational injection molding assembly configuration.

A9. The system of A1, wherein the system is operative so that the computer implemented database records first information for the past operational injection molding assembly configuration, and wherein the information which the system is operative to display respecting the past operational injection molding assembly configuration is a subset of the first information.

A10. The system of A1, wherein the system is operative to display an indicator of a current location of a certain injection molding assembly component.

A11. The system of A1, wherein the system is operative to display programming data of an injection molding assembly component of the past operational injection molding assembly configuration.

A12. The system of A1, wherein the system is operative to determine a current location of a plurality of injection molding assembly components, and wherein the system is further operative to display a facility map indicating a current location of the plurality of injection molding assembly components.

A13. The system of A1, wherein the information respecting a past operative injection molding assembly configuration which the system is operative to display is displayed in the form of identifiers for a plurality of components of the past operational injection molding assembly.

A14. The system of A13, wherein one or more of the identifiers is configured as a hot button for access to specification data.

B1. A system for use in performance of injection molding operations, the system comprising:

first and second injection molding assembly components currently disposed in a common work cell, wherein each of the first and second injection molding assembly components is selected from the group consisting of a mold, an injection molding machine, a dryer, a chiller and a robot, wherein the first and second injection molding assembly are of different injection molding assembly component types;

a user interface having a display, wherein the system is operative so the user interface displays information respecting at least one of the first and second injection molding assembly components in the current work cell;

wherein the system is further characterized by at least one (a) the system being operative to determine identification information for at least one of the first and second injection molding assembly components for display of information identifying at least one of the first and second injection molding assembly components by the display, and (b) the system further including a computer implemented database and being operative so that the computer implemented database records information respecting injection molding assembly configurations determined to be operational which include the first injection molding assembly configuration for use by the system in displaying on the display identification information for a plurality of components of an injection molding assembly configuration that has been determined to be operational and which includes the first injection molding assembly component.

B2. The system of B1, wherein the user interface is incorporated on a first computer disposed in the common work cell and wherein the system further includes a supplementary user interface having a display, wherein the system is operative so that the supplementary user interface displays information respecting at least one of the first and second injection molding assembly components, the supplementary user interface being disposed at a location external to the common work cell.

B3. The system of B1, wherein the user interface is disposed within the common work cell.

B4. The system of B1, wherein the user interface is disposed within a facility that incorporates the common work cell but is disposed externally to the current work cell.

B5. The system of B1, wherein the user interface is disposed remote from a facility that incorporates the common work cell.

B6. The system of claim B1, wherein the first injection molding assembly component is a mold.

B7. The system of B1, wherein the system is characterized by the system being operative to determine identification information for at least one of the first and second injection molding assembly components for display of information identifying at least one of the first and second injection molding assembly components by the display.

B8. The system of B1, wherein the system is characterized by the system further including a computer implemented database and being operative so that the computer implemented database records information respecting injection molding assembly configurations determined to be operational which include the first injection molding assembly configuration for use by the system in displaying on the display identification information for a plurality of components of an injection molding assembly configuration that has been determined to be operational and which includes the first injection molding assembly component.

B9. The system of B1, wherein the system is characterized by (a) the system being operative to determine identification information for at least one of the first and second injection molding assembly components for display of information identifying at least one of the first and second injection molding assembly components by the display, and (b) the system further including a computer implemented database and being operative so that the computer implemented database records information respecting injection molding assembly configurations determined to be operational which include the first injection molding assembly configuration for use by the system in displaying on the display identification information for a plurality of components of an injection molding assembly configuration that has been determined to be operational and which includes the first injection molding assembly component.

C1. A system for use in performance of injection molding operations, the system comprising:

a plurality of injection molding assembly components disposed in a common work cell during a current operating state, wherein first and second components of the plurality of injection molding assembly components are of different component types and wherein each of the first and second components of the plurality of injection molding assembly components are components of types selected from the group consisting of a mold, and injection molding machine, a dryer, chiller, and a robot;

wherein the system is operative to one or more of (a) record in a computer implemented database identifying information for the first and second components; and (b) display identifying information for the first and second components so that the system presents information respecting identification of components currently within the work cell.

C2. The system of C1, wherein the system is operative to record in the computer implemented database identifying information for the first and second components.

C3. The system of C1, wherein the system is operative to record in the computer implemented database identifying information for the first and second components together with a time stamp.

C4. The system of C1, wherein one or more of the identifiers is configured as a hot button for access to programming data.

C5. The system of claim C1, wherein the system is operative to display identifying information for the first and second components.

D1. A system for use in performance of injection molding operations, the system comprising:

a plurality of components including first and second injection molding assembly components, the first and second injection molding assembly components being disposed in a common work cell, the first injection molding assembly component being selected from the group consisting of a mold and an injection molding machine, the second injection molding assembly component being an auxiliary injection molding assembly of an injection molding assembly type selected from the group consisting of a dryer, chiller, and robot;

wherein the system is configured so that the second injection molding assembly component is operative to receive at least one communication transmitted by one or more of the plurality of components;

wherein the system is configured so that the second injection molding assembly component is operative to transmit one or more of identification information and programming data responsively to receipt of one or more communications transmitted by one or more of the plurality of components.

D2. The system of D1, wherein the system is configured so that the second injection molding assembly component is operative to transmit identification information and programming data responsively to receipt of one or more communications transmitted by one or more of the plurality of components, the identification information for recording in a computer implemented database.

D3. The system of D1, wherein the system is configured so that the second injection molding assembly component is operative to transmit identification information and programming data responsively to receipt of one or more communications transmitted by one or more of the plurality of components, the system being operative to record the identification information and the programming data in a computer implemented database with respective time stamps.

D4. The system of D1, wherein the system is configured so that the second injection molding assembly component is operative to restrict its operation in response to receipt of a communication transmitted by one of the plurality of components for restricting operation of the second injection molding assembly component.

D5. The system of D1, wherein the at least one communication transmitted by one or more of the plurality of components is transmitted by a mobile workstation computer.

D6. The system of D1, wherein the at least one communication transmitted by one or more of the plurality of components is transmitted by the first injection molding assembly component.

E1. A system for use in performance of injection molding operations, the system comprising:

a plurality of components including first and second injection molding assembly components, the first and second injection molding assembly components being disposed in a common work cell, the first injection molding assembly component being selected from the group consisting of a mold and an injection molding machine, the second injection molding assembly component being an auxiliary injection molding assembly of an injection molding assembly type selected from the group consisting of a dryer, chiller, and robot;

wherein the system is configured so that the first and second injection molding assembly components are operative for communication with one another.

E2. The system of E1, wherein the plurality of components includes a server external to each of the first and second injection molding assembly components.

E3. The system of E1, wherein the plurality of components includes a remote server external to each of the first and second injection molding assembly components.

E4. The system of E1, wherein the system includes a LAN logically associated to the work cell.

E5. The system of E1, wherein the system is operative to determine a location of the second injection molding assembly component.

E6. The system of E1 wherein a component of the plurality of components is operative to transmit a communication to the second injection molding assembly component, the communication determining operation of the second injection molding assembly component.

E7. The system of E6, wherein the communication is a command to restrict operation of the second injection molding assembly component.

E8. The system of E6, wherein the system includes a computer implemented database including requirement information for the first injection molding assembly component, the requirement information defining a requirement for a candidate injection molding assembly component that can be designated for use in association with the first injection molding assembly component, and wherein the system is operative to transmit the communication responsively to the requirement information.

E9. The system of E1, wherein the plurality of components are disposed in a common OSI Layer 3 network.

E10. The system of E1, wherein the first and second injection molding assembly components are disposed in a common OSI Layer 2 network.

E11. The system of E1, wherein the first and second injection molding assembly components are operative for communication with one another with use of one or more of (a) network interface devices disposed on each of the first injection molding assembly components and second injection molding assembly component; (b) a peripheral device communication interface device disposed on the first injection molding assembly component and a device for communication with the peripheral device communication interface disposed on the second injection molding assembly component; and (c) an RFID reader unit disposed on the first injection molding assembly component and an RFID tag disposed on the second injection molding assembly component.

F1. A system for use in performance of injection molding operations, the system comprising:

a plurality of components including first and second injection molding assembly components, the first and second injection molding assembly components being disposed in a common work cell, the first injection molding assembly component being selected from the group consisting of a mold and an injection molding machine, the second injection molding assembly component being an auxiliary injection molding assembly component of an injection molding assembly component type selected from the group consisting of a dryer, chiller, and robot;

wherein the system is operative to determine identification information for the second injection molding assembly component; and wherein the system is operative to utilize the identification information for one or more of (a) display of information relating to the second injection molding assembly component on a user interface display, (b) transmission of a communication to the second injection molding assembly component, and (c) recordation of information identifying the second injection molding assembly component in a database.

F2. The system of F1, wherein the system is operative to utilize the identification information for recordation of information identifying the second injection molding assembly component in the database with a time stamp.

F3. The system of F1, wherein the system is operative to utilize the identification information for display of information relating to the second injection molding assembly component on a user interface display and for recordation of identification information in a database.

F4. The system of F1, wherein the user interface display is located on a device external to the work cell.

G1. A system for use in performance of injection molding operations, the system comprising:

an injection molding assembly disposed in a work cell including a first injection molding assembly component and a second injection molding assembly component, the first and second injection molding assembly components being of different component types and each being of a type selected from the group consisting of a mold, an injection molding machine, a dryer, chiller, and robot, wherein the system is operative to determine identifiers for the first and second injection molding assembly components;

a user interface operative to display identifiers for each of the first and second injection molding assembly components and providing access to one or more of programming data and specification data for each of the first and second injection molding assembly components.

G2. The system of G1 wherein the user interface is operative to simultaneously display identifiers for each of the first and second injection molding assembly components.

G3. The system of G1, wherein the first injection molding assembly component is an auxiliary injection molding assembly selected from the group consisting of a dryer chiller and robot.

G4. The system of G1, wherein the user interface is located in the work cell.

G5. The system of G1, wherein the user interface is located external to the work cell.

G6. The system of G1, wherein the user interface is located external to a facility comprising the work cell.

H1. A system for use in performance of injection molding operations, said system comprising:

an injection molding assembly component being of a type selected from the group consisting of a mold, an injection molding machine, a dryer, a chiller, and robot;

a computer implemented database, wherein the system is operative so that the computer implemented database records programming data for the injection molding assembly component responsively to an occurrence of a predetermined event, wherein the system is operative so that the computer implemented database records first programming data and second programming data for the injection molding assembly component, the first programming data being programming data determining operation of the injection molding assembly component at a first time, the second programming data being programming data determining operation of the injection molding assembly at a second time different from the first time;

wherein system is operative to allow access to the first programming data and the second programming data.

H2. The system of H1, wherein the predetermined event is the injection molding assembly component being determined to be associated to an operational injection molding assembly configuration.

H3. The system of H1, wherein the predetermined event is the injection molding assembly component being subject to a programming data update.

H4. The system of H1, wherein the system for allowing access to the first programming data and the second programming data allows an operator to view the first programming data and the second programming data.

H5. The system of H1, wherein the system for allowing access to the first programming data and the second programming data allows an operator to initiate a command responsively which to the system downloads a selected one of the first programming data and second programming data to a selected injection molding assembly component.

I1. A system for use in performance of injection molding operations, the system comprising:

a mold that can be associated with a plurality of different components to define a plurality of different injection molding assembly configurations, each of the plurality of different injection molding configurations being defined by an association of components with the mold at a given time;

a computer implemented database, wherein the system is operative so that the computer implemented database records information respecting a past operational injection molding assembly configuration that includes the mold, the past operational injection molding assembly including a first auxiliary component of the first type, and the information including certain programming data for the first auxiliary component;

wherein the system is operative for execution of a cycle of a production run using a current injection molding assembly configuration that includes the mold and that includes a configuration other than the past operational injection molding assembly configuration, the current injection molding assembly configuration including a second auxiliary component of the first type; and wherein the system is operative for transmission of the certain programming data from the database to the second auxiliary component.

I2. The system of I1, wherein the system is operative to transmit the certain programming data from the database to the second auxiliary component responsively to initiation of a command initiated by an operator.

J1. A system for use in performance of injection molding operations, said system comprising:

a first component for use in an injection molding assembly selected from the group consisting of a mold, injection molding machine, dryer, chiller, and robot;

a computer implemented database, wherein the system is operative so that the computer implemented database records first programming data for the first component and second programming data for the first component, the first programming data being programming data for determining operation of the first component during a first time, the second programming data being programming data for determining operation of the component during a second time subsequent to the second time;

a second component being of a common component type relative to the first component; and a user interface, wherein the system is operative so that responsively to a command activated using the user interface, a selected one of the first programming data or second programming data is transmitted to the second component.

J2. The system of J1, wherein the user interface displays a first identifier for the first component corresponding to a first injection molding assembly configuration association of the first component and a second identifier for the first component corresponding a second injection molding assembly configuration association of the first component, the user interface further being operative to display an identifier for the second component, wherein the system is further operative to that the command is activated to result in the first programming data being transmitted to the second component responsively to a highlighting of the first identifier of the first component and the identifier of the second component.

J3. The system of J1, wherein the system is operative so the first programming data is recorded responsively to a determination that the first component is associated to an operational injection molding assembly configuration.

J4. The system of J1, wherein the system includes a computer implemented database external to the first component and the second component for storing the first programming data and the second programming data.

K1. A system for use in performance of injection molding operations, said system comprising:

a first component for use in an injection molding assembly selected from the group consisting of a mold, injection molding machine, dryer, chiller, and robot;

a computer implemented database wherein the system is operative so that the computer implemented database records first programming data for the first component and second programming data for the first component, the first programming data being programming data for determining operation of the first component during a first time, the second programming data being programming data for determining operation of the component during a second time subsequent to the first time; and wherein the system is operative for display of the first programming data and the second programming data.

K2. The system of K1, wherein the system is operative to display on a common display first and second identifiers for the first component, wherein the system is further operative so that actuation of the first identifier allows access to the first programming data, wherein the system is further operative so that actuation of the second identifier allows access to the second programming data.

L1. A system for use in performance of injection molding assembly operations, the system comprising:

a computer implemented database having recorded therein first information relating to an injection molding assembly configuration determined to be operational, the first information including programming data for at least one injection molding assembly component of the injection molding assembly configuration determined to be operational;

wherein the system is operative to determine second information relating to an injection molding assembly of a current work cell, the second information including programming data of at least one injection molding assembly component of the current work cell;

wherein the system is further operative for comparing programming data of the first information to the programming data of the second information, and wherein the system is further operative to determine a process control responsively to the comparing.

L2. The system of L1, wherein the process control is an output of an indicator indicating a lack of correspondence between programming data of the injection molding assembly configuration determined to be operational and the injection molding assembly of the current work cell.

L3. The system of L1, wherein the process control is downloading of programming data recorded in the computer implemented database to a component of the injection molding assembly of the current work cell.

M1. A system for use in performance of injection molding operations, the system comprising:

an injection molding assembly comprising first and second injection molding assembly components, the first injection molding assembly component being selected from the group consisting of an injection molding machine, a mold, a dryer, chiller, and a robot, the second injection molding assembly component being of a different component type than the first injection molding assembly component and being selected from the group consisting of an injection molding machine, a mold, a dryer, chiller, and a robot;

a computer implemented database wherein the system is operative so that the computer implemented database records associated component requirement information for the first injection molding assembly component, the associated component requirement information defining a requirement for a component to be used in combination with the first injection molding assembly component, the computer implemented database further recording for the second injection molding assembly component rating information for the second injection molding assembly component;

wherein the injection molding assembly is operative to restrict operation of the injection molding assembly responsively to a comparison between the associated component requirement information and the rating information.

M2. The system of M1, wherein the requirement information and the rating information is recorded externally to the first injection molding assembly component and the second injection molding assembly component.

M3. The system of M1, wherein the injection molding assembly is operative to restrict operation of the injection molding assembly by restricting registration of the injection molding assembly as an operational injection molding assembly.

M4. The system of M1, wherein the injection molding assembly is operative to restrict operation of the injection molding assembly by restricting performance of a cycle of a production run utilizing the injection molding assembly.

M5. The system of M1, wherein the first injection molding assembly component is a mold and wherein the second injection molding assembly component is selected from the group consisting of an injection molding machine, chiller, dryer, and robot.

M6. The system of M1, wherein the first injection molding assembly component is a mold, and wherein the requirement information is recorded at the mold.

N1. A system for use in performance of injection molding operations, said system comprising:

a first injection molding assembly component being of a type selected from the group consisting of a mold, and injection molding machine, a dryer, a chiller, and robot;

a computer implemented database, wherein the system is operative so that the computer implemented database records associated component requirement information for the injection molding assembly component, the associated component requirement information defining a requirement for a second injection molding assembly component that can be designated for use in association with the first injection molding assembly component, the second injection molding assembly component being of a type different than the first injection molding assembly component; and wherein the system is operative to utilize the computer implemented database for restricting operation of an injection molding assembly configuration including the first injection molding assembly component and the second injection molding assembly component.

O1. A method for use in performance of injection molding operations, the method comprising the steps of:

associating a certain mold with a first injection molding assembly, the first injection molding assembly having a first injection molding machine and first auxiliary component of a first type, the mold having a physically associated memory, the first auxiliary component of the first type having certain programming data;

transmitting the certain programming data of the first auxiliary component into the physically associated memory of the certain mold;

associating the certain mold into a second injection molding assembly, the second injection molding assembly being defined by the certain mold, an injection molding machine and a second auxiliary component of the first type;

transmitting the certain programming data from the physically associated memory of the certain mold;

receiving the certain programming data at the second auxiliary component; and operating the second injection molding assembly component so that the second auxiliary component is operated in accordance with the certain programming data.

O2. The method of O1, wherein the first and second injection molding assemblies are defined at different work cells.

O3. The method of O1, wherein the first and second injection molding assemblies are defined at different injection molding assembly facilities.

P1. A system for use in performance of injection molding operations, said system comprising:

a mold;

a computer implemented database, wherein the system is operative so that the computer implemented database records associated component requirement information for the mold, the associated component restriction information defining a requirement for an injection molding assembly component that can be designated for use in association with the mold, the injection molding assembly component being of a type selected from the group consisting of an injection molding machine, dryer, chiller and robot;

wherein the system is operative to utilize the computer implemented database for restricting operation of an injection molding assembly configuration including the mold and the injection molding assembly component; and wherein the associated component requirement information includes information recorded on a memory physically associated to the mold.

Q1. A method for recording a number of cycles participated in by an auxiliary injection molding assembly component, the auxiliary injection molding assembly component selected from the group consisting of a dryer, chiller, and robot, the method including the steps of:

assigning an identifier to an operational injection molding assembly that includes a mold, an injection molding machine and the auxiliary injection molding assembly component;

monitoring an output of the mold;

incrementing a counter associated with the identifier each time the monitoring indicates a completion of a cycle.

R1. A system for use in performance of injection molding operations an injection molding assembly comprising an injection molding machine, a mold and an auxiliary injection molding assembly component selected from the group consisting of a dryer chiller and a robot;

wherein the system is operative to assign an identifier to the injection molding assembly responsively to a determination that injection molding assembly is operational;

wherein the system is further operative for monitoring performance of the injection molding assembly;

wherein the system is further operative to update a counter associated to the identifier responsively a monitoring indicating that a cycle has been completed.

R2. The system of R1, wherein the system is operative to utilize the count of the counter to determine a maintenance schedule of a certain injection molding assembly component.

R3. The system of R1, wherein the certain injection molding assembly component is an auxiliary injection molding assembly component selected from the group consisting of a dryer, chiller, and robot.

S1. A system for use in performance of injection molding operations, said system comprising:

a component selected from the group consisting of a mold, and injection molding machine, a dryer, a chiller, and robot;

a computer implemented database, wherein the system is operative so that the computer implemented database records one or more of (a) a record of past locations of the component; (b) a record of associations of the component in past operational injection molding assembly configurations; and (c) a record of programming data updates of the component; and a user interface, wherein the system is operative to output responsively to activation of a command activated using the user interface a report indicating information selected from the group consisting of (i) a history of locations of the component over time; (ii) past associations of the component in operational injection molding assembly configurations; and (iii) programming data updates of the component over time.

S2. The system of S1, wherein the system is operative so that the computer implemented database records at least two of (a) a record of past locations of the component; (b) a record of associations of the component in past operational injection molding assembly configurations; and (c) a record of programming data updates of the component, and wherein the system is operative to output responsively to activation of respective commands activated using the user interface a report indicating at least two of: (i) a history of locations of the component over time; (ii) past associations of the component in operational injection molding assembly configurations; and (iii) programming data updates of the component over time.

S3. The system of S1, wherein the system is operative so that the computer implemented database records each of (a) a record of past locations of the component; (b) a record of associations of the component in past operational injection molding assembly configurations; and (c) a record of programming data updates of the component, and wherein the system is operative to output responsively to activation of respective commands activated using the user interface reports indicating each of: (i) a history of locations of the component over time; (ii) past associations of the component in operational injection molding assembly configurations; and (iii) programming data updates of the component over time.

S4. The system S1, wherein the system includes first and second work cells and a mobile workstation computer transportable between the first and second work cells, wherein the system is operative to output the report by display of the report on the mobile workstation computer.

S5. The system S1, wherein the system includes first and second work cells and a hand held mobile workstation computer transportable between the first and second work cells, wherein the system is operative to output the report by display of the report on the hand held mobile workstation computer.

S6. The system of S1, wherein the system is operative to output a facility map indicating a location of injection molding assembly components within a facility at one of a current time or operator designated past time.

T1. A system for use in performance of injection molding operations, said system for use in a facility in which injection molding assembly components can be moved between work cells and a storage location, and in which an injection molding assembly component can be associated to different combinations of associated injection molding assembly components to define different injection molding assembly configurations, the system comprising:

first and second injection molding assembly components, each being of a component type selected from the group consisting of a mold, injection molding machine, dryer, chiller, and robot;

wherein the system is operative to determine a current location of each of the first and second injection molding assembly components, wherein the system is operative to output a facility map indicating a current location of each of the first and second injection molding assembly components.

T2. The system of T1, wherein the system includes a computer implemented database that records information indicating a migration of the first and second injection molding assembly components over time, and wherein the system is operative to output a facility map indicating a location of each of the plurality of injection molding assembly components at an operator designated time.

T3. The system of T1, wherein the facility map included designators for a plurality of work cells and an indicator for an injection molding assembly component within at least one work cell.

U1. A system for use in performance of injection molding operations, the system comprising:

first and second injection molding assembly components, each of the first and second injection molding assembly components being selected from the group consisting of a mold, an injection molding machine, dryer, chiller, and robot;

a computer implemented database;

wherein the system is operative to determine information indicating a current location for the first injection molding assembly component;

wherein the system is operative to determine information indicating a current location for the second injection molding assembly component;

wherein the system is operative to record in the computer implemented database information indicating a current location of the first component at a plurality of points in time so that the computer implemented database records a history of locations of the first injection molding assembly component;

wherein the system is further operative to record in the computer implemented database information indicating a current location of the second component at a plurality of points in time so that the computer implemented database records a history of locations of the first injection molding assembly component.

U2. The system of U1, wherein the system includes a user interface allowing an operator to select for output location information for either of the first component or the second component.

U3. The system of U2, wherein the a user interface is incorporated in a mobile workstation computer so that the workstation computer can be transported between a current location of the first injection molding assembly component and a current location of the second injection molding assembly component.

U4. The system of U1, wherein the first and second injection molding assembly components are of first and second injection molding assembly component types.

U5. The system of U1, wherein the first injection molding assembly component is a component type selected from the group consisting of a mold and an injection molding machine, and wherein the second injection molding assembly component is selected from the group consisting of a dryer, chiller and a robot.

U6. The system of U1, wherein the first and second injection molding assembly components are operative to be utilized in each of a common injection molding assembly or in separate injection molding assemblies.

U7. The system of U1, wherein the system is configured so that for recording information in the computer implemented database indicating a current location of the first injection molding assembly component, the system is operative to record a work cell identifier indicating a certain work cell of an injection molding facility.

U8. The system of U1, wherein the system is configured so that for recording information in the computer implemented database indicating a current location of the first injection molding assembly component, the system is operative to record a storage location identifier indicating that the first injection molding assembly component is currently in storage.

U9. The system of U1, wherein the system is operative to utilize a wireless LAN implemented triangulation based location determination subsystem for determining a current location of the first injection molding assembly component.

U10. The system of U1, wherein the system for determining a current location for the first injection molding assembly component includes an RFID tag on the first injection molding assembly component, and an RFID reader unit for reading of the RFID tag disposed in or in proximity with one or more of a work cell and a storage location of an injection molding facility.

V1. A system for use in performance of injection molding operations, said system for use in a facility in which injection molding assembly components can be moved between work cells and a storage location, and in which an injection molding assembly components can be associated to different combinations of associated injection molding assembly components to define different injection molding assembly configurations, the system comprising:
  a computer implemented database wherein the system is operative so that the system records at least one of first data indicating a migration of injection molding assembly components over time, second data indicating operational injection molding assembly configurations, and third data indicating a number of production run cycles executed by operational injection molding assembly configurations;
  an indicator;
  wherein the system is operative to utilize one or more of the first data, second data, and third data recorded in the computer implemented database for determining an output of the indicator.

V2. The system of V1, wherein the indicator is provided by an electronic display, wherein the computer implemented application utilized the third data for determining a maintenance schedule for an injection molding assembly component, and wherein the output includes information related to the maintenance schedule.

V3. The system of V1, wherein the indicator is provided by an electronic display, wherein the system is operative to utilize the third data for determining a maintenance schedule for an auxiliary injection molding assembly component, and wherein the output includes information related to the maintenance schedule for the auxiliary injection molding assembly component.

V4. The system of V1, wherein the indicator is provided by an electronic display, wherein the system is operative to utilize the third data for determining a maintenance schedule for a plurality of injection molding assembly components, and wherein the output includes information related to the maintenance schedule for the plurality of injection molding assembly components.

V5. The system of V1, wherein the indicator is provided by a personal message delivery subsystem, wherein the system is operative to utilize one or more of the first data, second data, and third data for determining an occurrence of a predetermined event and wherein the output includes information related to the predetermined event.

V6. The system of V5, wherein the predetermined event is selected from the group consisting of an injection molding assembly component requiring maintenance, a mold being associated to an operational injection molding assembly configuration, and a mold being transported from a certain work cell.

W1. A system for use in performance of injection molding operations, the system comprising:
  a computer implemented database having recorded therein information defining an injection molding assembly configuration determined to be operational, the information including identifying information for a plurality of injection molding assembly components of the configuration;
  wherein the system is operative to determine information indicating a current location of a component of the injection molding assembly configuration determined to be operational; and
  wherein the system is further operative to output the information indicating a current location of the component.

W2. The system of W1, wherein the system is operative to determine that the injection molding assembly configuration is operational responsively to a monitoring of a production run cycle.

W3. The system of 1, wherein the system is operative to determine that the injection molding assembly configuration is operational responsively to an operator input command input to designate the injection molding assembly configuration as being operational.

X1. A system for use in performance of injection molding operations, the system comprising:
  a user interface allowing an operator to selectively output information respecting an injection molding assembly component, the injection moldings assembly component being selected from the group consisting of a mold, and injection molding machine, a dryer a chiller and a robot;
  wherein the system is operative to determine information indicating a current location of the injection molding assembly component;
  wherein the system is further operative to output the information indicating a current location of the injection molding assembly component.

X2. The system of X1, wherein the system is operative to output a facility map in which a current location of the injection molding assembly component is highlighted.

X3. The system of X1, wherein the user interface is incorporated in a mobile workstation computer that is transportable between work cells of an injection molding facility.

Y1. A system for use in performance of injection molding assembly operations, system comprising:
  a computer implemented database having recorded therein first information relating to an injection molding assembly configuration determined to be operational, the first information including component identifying information of at least one injection molding assembly component of the injection molding assembly configuration determined to be operational;
  wherein the system is operative to determine second information relating to an injection molding assembly of a current work cell, the second information including component identifying information of at least one injection molding assembly component of the current work cell;
  wherein the system is further operative for comparing component identifying information of the first information to component identifying information of the second information, and wherein the system is further operative to determine a process control responsively to the comparing.

Y2. The system of Y1, wherein the process control is an output of an indicator indicating a lack of correspondence between component identifying information of the injection molding assembly configuration determined to be operational and the injection molding assembly of the current work cell.

Y3. The system of Y2, wherein the system is configured to be operative to determine a current location of an injection molding assembly component, and wherein the indicator includes an indication of a current location of an injection molding assembly component.

Y4. The system of Y3, wherein the system for determining a current location of an injection molding assembly component utilizes a wireless LAN implemented triangulation based location determination subsystem.

Y5. The system of Y1, wherein the system for determining a current location of an injection molding assembly component utilizes the component's current OSI Layer 2 network association.

Y6. The system of Y1, wherein the system for determining a current location of an injection molding assembly component includes an RFID tag disposed on the component and utilizes an output of an RFID reader unit disposed at or in proximity with a work cell for reading of RFID tags in proximity thereto.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been described, it will be understood that features and aspects that have been described with reference to each particular embodiment can be used with each remaining particularly described embodiment.

What is claimed is:

1. A system for use in performance of injection molding operations, said system for use in a facility in which injection molding assembly components can be moved between work cells and a storage location, and in which an injection molding assembly component can be associated to different combinations of associated injection molding assembly components to define different injection molding assembly configurations, the system comprising:
    first and second injection molding assembly components, each being of a component type selected from the group consisting of a mold, injection molding machine, dryer, chiller, and robot;
    wherein the system is operative to determine a current location of each of the first and second injection molding assembly components,
    wherein the system is operative to output a facility map indicating a current location of each of the first and second injection molding assembly components.

2. The system of claim 1, wherein the system includes a computer implemented database that records information indicating a migration of the first and second injection molding assembly components over time, and wherein the system is operative to output a facility map indicating a location of each of a plurality of injection molding assembly components at an operator designated time.

3. The system of claim 1, wherein the facility map includes designators for a plurality of work cells and an indicator for an injection molding assembly component within at least one work cell.

4. A system for use in performance of injection molding operations, the system comprising:
    a computer implemented database having recorded therein information defining an injection molding assembly configuration determined to be operational, the information including identifying information for a plurality of injection molding assembly components of the configuration;
    wherein the system is operative to determine information indicating a current location of a component of the injection molding assembly configuration determined to be operational, the component being of a component type selected from the group consisting of a mold, injection molding machine, dryer, chiller, and robot; and
    wherein the system is further operative to output the information indicating a current location of the component.

5. The system of claim 4, wherein the system is operative to determine that the injection molding assembly configuration is operational responsively to a monitoring of a production run cycle.

6. The system of claim 4, wherein the system is operative to determine that the injection molding assembly configuration is operational responsively to an operator input command input to designate the injection molding assembly configuration as being operational.

7. A system for use in performance of injection molding operations, the system comprising:
    a user interface allowing an operator to selectively output information respecting an injection molding assembly component, the injection molding assembly component being selected from the group consisting of a mold, an injection molding machine, a dryer a chiller and a robot;
    wherein the system is operative to determine information indicating a current location of the injection molding assembly component;
    wherein the system is further operative to output the information indicating a current location of the injection molding assembly component.

8. The system of claim 7, wherein the system is operative to output a facility map in which a current location of the injection molding assembly component is highlighted.

9. The system of claim 7, wherein the user interface is incorporated in a mobile workstation computer that is transportable between work cells of an injection molding facility.

* * * * *